US006585518B1

United States Patent
Jenkins et al.

(10) Patent No.: US 6,585,518 B1
(45) Date of Patent: Jul. 1, 2003

(54) ADAPTIVE MOTIVATION FOR COMPUTER-ASSISTED TRAINING SYSTEM

(75) Inventors: William M. Jenkins, Pacifica, CA (US); Bret E. Peterson, Lafayette, CA (US); Steven Miller, Pacifica, CA (US); Michael M. Merzenich, San Francisco, CA (US); Paula Tallal, Lumberville, PA (US)

(73) Assignee: Scientific Learning Corp., Oakland, CA (US)

( * ) Notice: Subject to any disclaimer, the term of this patent is extended or adjusted under 35 U.S.C. 154(b) by 0 days.

(21) Appl. No.: 09/553,239

(22) Filed: Apr. 19, 2000

Related U.S. Application Data

(63) Continuation of application No. 09/012,809, filed on Jan. 23, 1998.

(51) Int. Cl.[7] .............................. G09B 19/00; G09B 7/00
(52) U.S. Cl. ........................ 434/236; 434/335; 434/362
(58) Field of Search ................................ 434/236, 322, 434/323, 327, 335, 353, 354, 362; 463/25, 30, 31, 33; 345/772

(56) References Cited

U.S. PATENT DOCUMENTS

| | | | | |
|---|---|---|---|---|
| 5,149,084 A | * | 9/1992 | Dalebout et al. | 273/440 |
| 5,649,826 A | | 7/1997 | West et al. | 434/157 |
| 5,727,950 A | | 3/1998 | Cook et al. | 434/350 |
| 5,743,746 A | | 4/1998 | Ho et al. | 434/332 |
| 5,751,953 A | | 5/1998 | Shiels et al. | 395/200.09 |
| 5,762,503 A | * | 6/1998 | Hoo et al. | 434/237 |
| 5,813,863 A | | 9/1998 | Sloane et al. | 434/236 |
| 5,913,310 A | | 6/1999 | Brown | 128/897 |
| 5,940,801 A | | 8/1999 | Brown | 705/2 |
| 5,953,010 A | * | 9/1999 | Kampe et al. | 345/772 |
| 6,024,572 A | * | 2/2000 | Weyer | 434/169 |
| 6,100,887 A | * | 8/2000 | Bormann et al. | 345/764 |
| 6,184,881 B1 | * | 2/2001 | Medl | 345/772 |

OTHER PUBLICATIONS

Glassner, "Some Thoughts on Game Design," May 1997, from http://www.research.microsoft.com/glassner/work/talks/games.htm.

* cited by examiner

*Primary Examiner*—John Edmund Rovnak
(74) *Attorney, Agent, or Firm*—James D. Ivey

(57) ABSTRACT

Computer implemented training exercises present stimuli to a user and receive responses by the user to the stimuli. The stimuli are specifically selected to challenge and improve a cognitive ability of the user, e.g., the ability to perceive and understand spoken language. As a result, the stimuli cannot be changed or adapted to motivate the user through entertainment. Motivation is therefore provided by periodic reward animations which include persistent plots and characters. Progress indicators represent progress toward reward animations and represent such progression with smooth, entertaining progress animations. Randomly appearing animations and variations in rewards and immediate feedback add to the surprise and curiosity of the user and motivate further correct responses to see further random animations and variations. Progress indicators also represent a relation between the number of steps taking toward completion of a task and a maximum number of steps which should be needed to complete the task. Context is changed at achievement milestones to indicate progress to the user.

9 Claims, 83 Drawing Sheets

ADAPTIVE MOTIVATION FOR COMPUTER-ASSISTED TRAINING SYSTEM

This is a continuation of U.S. patent application Ser. No. 09/012,809 filed Jan. 23, 1998.

CROSS REFERENCE TO RELATED APPLICATIONS

This application is related to co-pending (1) U.S. patent application Ser. No. 08/995,964, entitled "Remote Computer-Assisted Compliance Monitoring System," filed Dec. 22, 1997 (hereinafter "the Compliance Monitoring Application"), (2) U.S. patent application Ser. No. 08/995,497, entitled "Migration Mechanism for User Data from One Client Computer System to Another," filed Dec. 22, 1997 (hereinafter "the Migration Application"), and (3) U.S. Pat. No. 5,927,988 by William M. Jenkins et al. and entitled "Method and Device for Training of Sensory Perceptual System in LLI Subjects" (hereinafter "the Training Patent") which are all incorporated herein by reference in their entirety for all purposes.

FIELD OF THE INVENTION

The present invention relates to computer-assisted training systems and, in particular, to a particularly effective mechanism by which a user of the training system is motivated to continue with a training program.

BACKGROUND OF THE INVENTION

For some years now, many attempts have been made to harness the popularity and nearly addictive properties of computer and video training exercises for the purpose of training and education. Since arcade and home style video training exercises are generally controlled by one form or another of an electronic computer, all such training exercises, including those played using a general purpose computer, are referred to herein as computer training exercises. Computer training exercises have the advantage that the challenge itself is interesting to the user. For example, if the user is challenged to use user input devices to shoot and kill space aliens, the act of shooting and killing the space aliens is, for certain users, fun per se. In general, computer training exercises present a simulated threat to the user and give the user a simulated defense or weapon to overcome the simulated threat. Such tends to challenge the competitive spirit of the user and motivate the user to overcome the simulated threat.

Other computer training exercises simulate a direct competition between the user and a simulated or actual opponent. Such training exercises include racing and fighting training exercises in which the user respectively controls a vehicle to race an opponent's vehicle through a race course or controls a fighting character to fight an opposing fighting character using user input devices. The opposing vehicle or fighting character can be controlled by the computer or by another user. These training exercises also challenge the competitive spirit of the user and motivate the user to out-perform the simulated or actual opponent.

Training programs typically include repetitive exercises to improve certain skills or cognitive abilities of the user. Some computer-based training programs use the simulated threat paradigm of computer training exercises to motivate the user to perform such repetitive training exercises. For example, the PalmPilot digital personal organizer available from US Robotics, Inc. of Skokie, Ill., includes a training process which teaches the user to use a special alphabet that the PalmPilot digital personal organizer can recognize through a touch-sensitive pad. In this training exercise, letters and numbers move down the screen, apparently at the user, to form a simulated threat. In response the user can simulate destruction of the threatening letters and numbers by writing the threatening letters and numbers using the touch-sensitive pad. By presenting the user with a simulated threat and incorporating a training exercise into a simulated defense or weapon, the user can be motivated to perform the training exercise repeatedly. Such a training program can be relatively effective if the training exercise is readily adaptable to a simulated defense or weapon and the skills improved by the training exercise are relatively simple.

Certain training exercises do not lend themselves as readily to the threat/defense training exercise paradigm described above. For example, some training exercises are not so readily adapted to a simulated defense or weapon. An example of such a training exercise is the recognition of a language phoneme by the user, e.g., distinguishing "shu" from "chu." In addition, some training programs are so long, e.g., more than one hour per day for several weeks, that even the threat/defense training exercise paradigm loses its motivation efficacy.

A particularly helpful computer-based training program is described in the above-referenced patent applications and patent and further in the Training Patent. The described training program involves student participation for more than one hour per day, at least five (5) days per week, for eight (8) weeks. Such a program is long and maintaining interest and motivation in the various training exercises over such a long program is of particular importance. Exacerbating the problem is the fact that the users of the described computer-based training program are children. In addition, the objects of the training exercise are language-oriented in nature and therefore do not lend themselves to simulated weapons actuation as compared to relatively simple motor skills, e.g., typing, which are more relatively readily adaptable to simulated weapons actuation. What is therefore needed is a system for maintaining interest and motivation in the training exercises over the entire training program.

SUMMARY OF THE INVENTION

In accordance with the present invention, motivation mechanisms which are independent of stimuli of training exercises to which the user is to respond motivate the user to respond correctly and quickly to the stimuli. The stimuli of the training exercises are specifically selected and designed to challenge and improve a cognitive ability of the user. As a result, the manner in which the stimuli can be adapted to create and maintain interest of the user in the training exercises is significantly limited. Therefore, the motivation mechanisms of the training exercises therefore take on added importance.

The user is periodically rewarded with a reward animation for correctly responding to a predetermined number of stimuli. The reward animation includes humor and surprise to give the reward animation entertainment and inherent value to the user such that the user is motivated to earn another reward animation. In addition, the reward animations have consistent and persistent plots and characters which are spread over several reward animations. Specifically, two or more component reward animations can be part of a larger, composite reward animation with a consistent plot. As the user earns one or more early ones of the component reward animations, the user is intrigued and curious as to the subsequent happenings in the consistent plot of the composite reward animation. Such intrigue and curiosity motivates the user to earn further reward animations.

In addition, the likeness and personality of characters of one reward animation, either individual or composite, persists and appears in other reward animations with unrelated plots. As a result, the user develops familiarity with such characters and the enjoyment of reward animations is enhanced. Furthermore, if the character previously appeared in a composite reward animation, the user anticipates that the current reward animation is a component reward animation of a composite reward animation and becomes eager to earn subsequent component reward animations of the current composite animation. The persistent, consistent plots and characters which span multiple reward animations add significantly to the reward value of such reward animations to the user above and beyond surprise and humor.

Constant rate reinforcement such as immediate positive feedback and periodic reward animations is augmented by variable rate reinforcement in the form of randomly appearing reward animations or random variations in the immediate positive feedback. For example, the immediate positive feedback presented for each correct response to stimuli of a training exercise can be the lighting of a previously unlit torch and an animated flame which flickers until a reward animation is earned. The random variations of the variable rate reinforcement can be the substitution for a flickering animated flame with bouquet of flowers, a cup of hot chocolate, an apple, or a birthday cake on the torch. The randomly appearing animation can be the animation of an otherwise still character or object of the scene in which the training exercise presents stimuli to the user.

The randomness with which the animation or variations appear add surprise and curiosity to the user's experience in using the training exercise. Such motivates the user to earn additional random animations and variations. However, the user has no idea when the next animation or variation will occur—it could happen after any correct response to stimuli of the training exercise. That possibility motivates the user to provide as many correct responses as possible as quickly as possible to see as many random animations and variations as possible.

Random animations and variations appearing in response to approximately 3% of the user's correct responses to training exercise stimuli generally provides good motivation to the user. Excessive frequency, e.g., greater than 10% of the time, results in the random animations and variations becoming commonplace and too easily earned to provide maximum motivation to the user. In addition, insufficient frequency, e.g., less than 1% of the time, results in excessive rarity of the random animations and variations such that the user fails to believe that increased frequency of correct responses to stimuli will have an appreciable likelihood of earning a random animation or variation.

In some training exercises, the user is required to complete a task in order to earn a reward animation rather than responding correctly to a number of stimuli of the training exercises. In such training exercises, progress indicators cannot predict the relative progress to a reward animation since the training exercise cannot determine how many steps the user will require to complete the task. For example, the user can be required to identify matching pairs of phonemes associated with blocks displayed in a grid. If the user has particularly good memory capacity and particularly good phoneme recognition skills, the user can identify all matching pairs of phonemes in relatively few steps. However, if the user has relatively poor memory and/or relatively poor phoneme recognition skills, the user can require many more steps to correctly identify all matching pairs of phonemes.

To indicate progress toward completion of the task, the training exercise determines a maximum number of steps within which the user should be able to complete the task, e.g., to identify all matching pairs of phonemes. As the user takes a step toward completion of the task, the progress indicator represents a step toward the maximum number of steps determined by the training exercise. If the user completes the task, e.g., identifies all matching pairs of phonemes, in fewer steps than the determined maximum number of steps, bonus points are awarded to the user for each step less than the determined maximum which the user required to complete the task. In other words, the faster the user completes the task, the more bonus points awarded to the user. If the user fails to complete the task in fewer steps than the determined maximum, the progress indicator indicates that the task should be complete and no bonus points are awarded to the user. Thus, the user is motivated to out perform the determined maximum number of steps the user should require to complete the task.

The determined maximum number of steps can be determined empirically. In the example in which the task is identification of matching pairs of phonemes, a simulated user with an estimated memory makes random attempts to identify matching pairs of phonemes and the number of steps required for the simulated user to correctly identify all matching pairs of phonemes is recorded. The determined maximum number of steps is the mean number of steps required by multiple trials of the simulated user plus one standard deviation of the number of steps required by the trials.

These motivation mechanisms provide the user with significant motivation notwithstanding limitations in the nature and adaptation of stimuli presented to the user by various training exercises.

DETAILED DESCRIPTION

Figure 1:
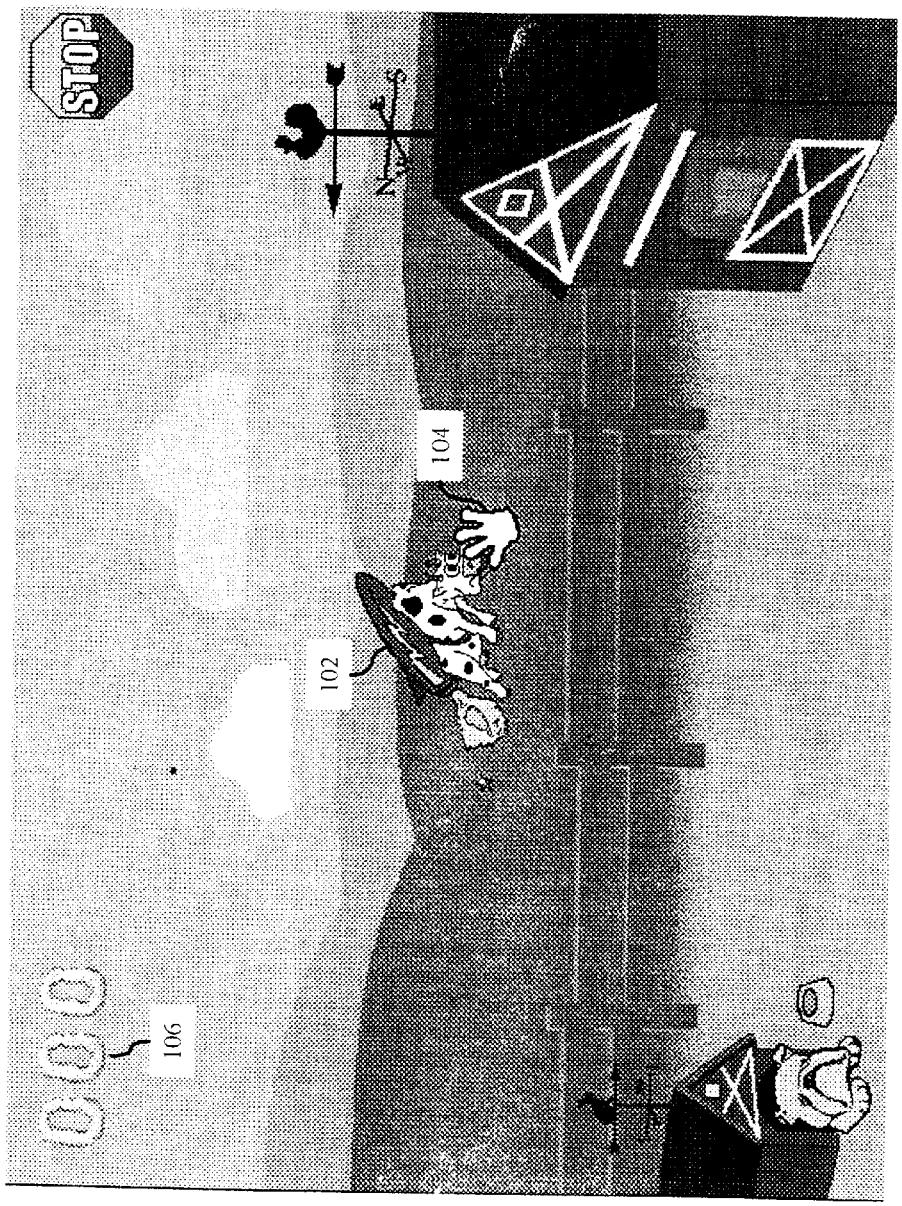
FIGS. 1–80 are screen views of computer-implemented training exercises in accordance with the present invention.

In accordance with the present invention, a number of training exercises use motivation mechanisms independent of the training stimuli presented to the user to motivate the user to continue with extended use of the training exercises and to user the training exercises to the full extent of the user. The stimuli of each of the training exercises is specifically selected to challenge and improve a cognitive ability of the user and therefore is limited in the ways the stimuli can be changed to create and maintain user interest in the training exercises. Accordingly, the motivation mechanisms of the present invention are of particular importance in such training exercises.

The Training Exercises

The motivation systems of the present invention are implemented, in this illustrative embodiment, in a training process which includes a number of training exercises designed to improve the language comprehension of language learning impaired (LLI) individuals. Appreciation of the motivation systems according to the present invention is facilitated by a brief discussion of each of the training exercises of the training process. In each of the training exercises described below, the stimuli presented to the user are designed primarily to improve a cognitive ability of the user, specifically, the ability to perceive and understand spoken language.

The requirement that the stimuli challenge and improve a cognitive ability of the user inherently restricts the stimuli. As a result, adaptation of the stimuli themselves during extended use of the training exercises by the user to help maintain interest of the user in the training exercises is very restricted. In general, the stimuli are adapted only to further challenge and improve the cognitive ability of the user as the user's cognitive abilities improve. However, the stimuli appear the same to the user over time and the user can become quite bored with the stimuli and may approach the stimuli with ambivalence and indifference.

By comparison, the primary purpose of any stimuli presented to a user of a computer training exercise is entertainment. Any improvement in a cognitive ability of the user, perhaps hand-eye coordination in control simulated defenses and/or weapons using user input devices, is merely incidental. In addition, the stimuli of computer training exercises, in the form of simulated threats or opponents, can change dramatically over time to maintain the user's interest in the computer training exercises. For example, space aliens, which are unarmed at lowers levels of play, can be given simulated laser-firing weapons at higher levels to further challenge and entertain a user. Thus, the stimuli of computer training exercises can change considerably to maintain user interest in such computer training exercises since the stimuli are not restricted to improving a particular cognitive ability of the user.

Old MacDonald's Flying Farm

FIGS. 1–16 are screen views of a training exercise called "Old MacDonald's Flying Farm" which is used to improve language comprehension of LLI users. Old MacDonald's Flying Farm is a limited hold reaction time procedure test in which a flying object 102 (FIG. 1) flies around until the user grabs flying object 102 using a cursor 104. Flying object 102 is shown as so grabbed in FIG. 2. The user grabs flying object 102 with cursor 104 using conventional drag-and-drop user interface techniques involving physical manipulation of a user input device in a manner described more completely below.

Figure 3:
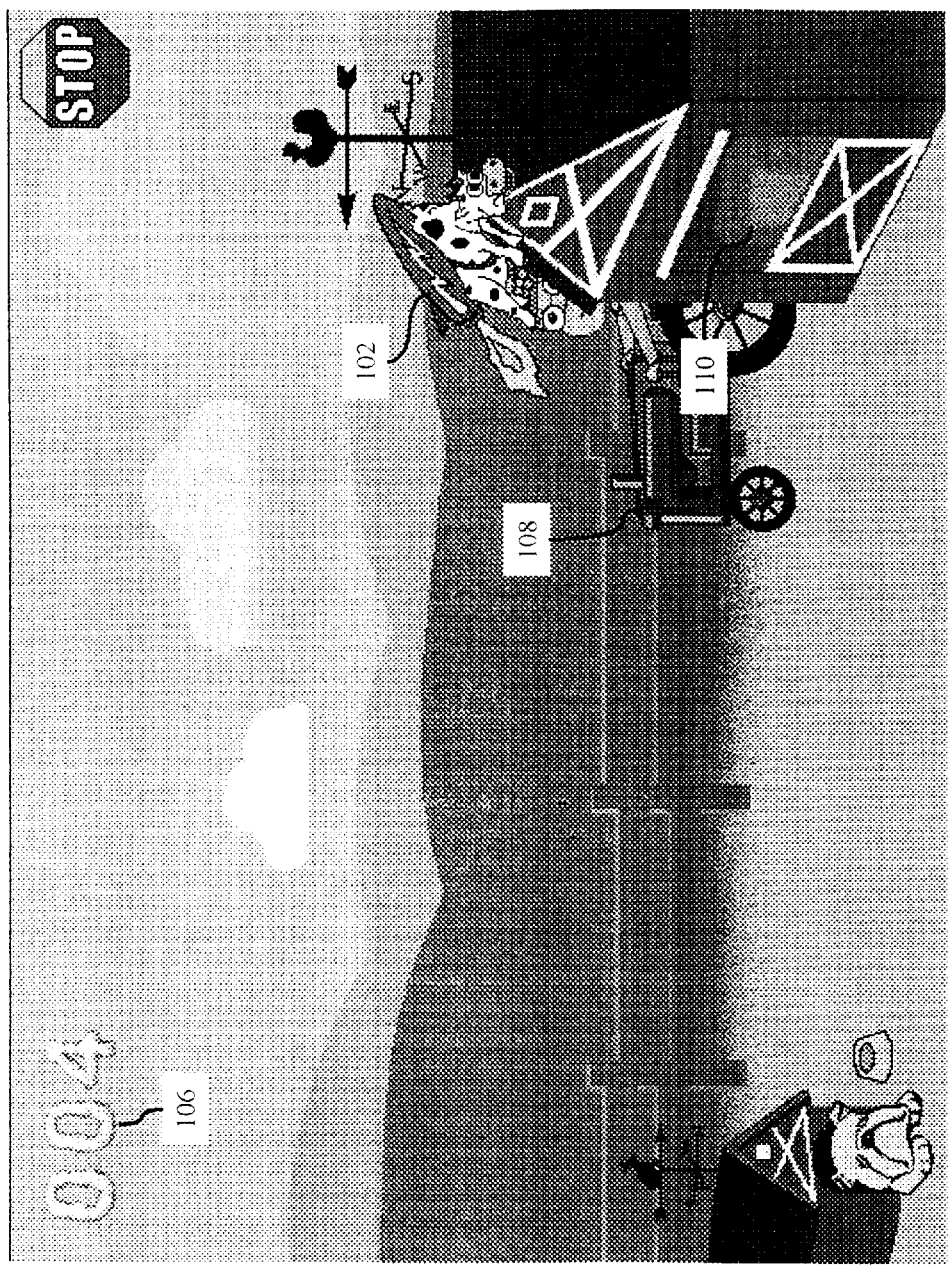
Figure 4:
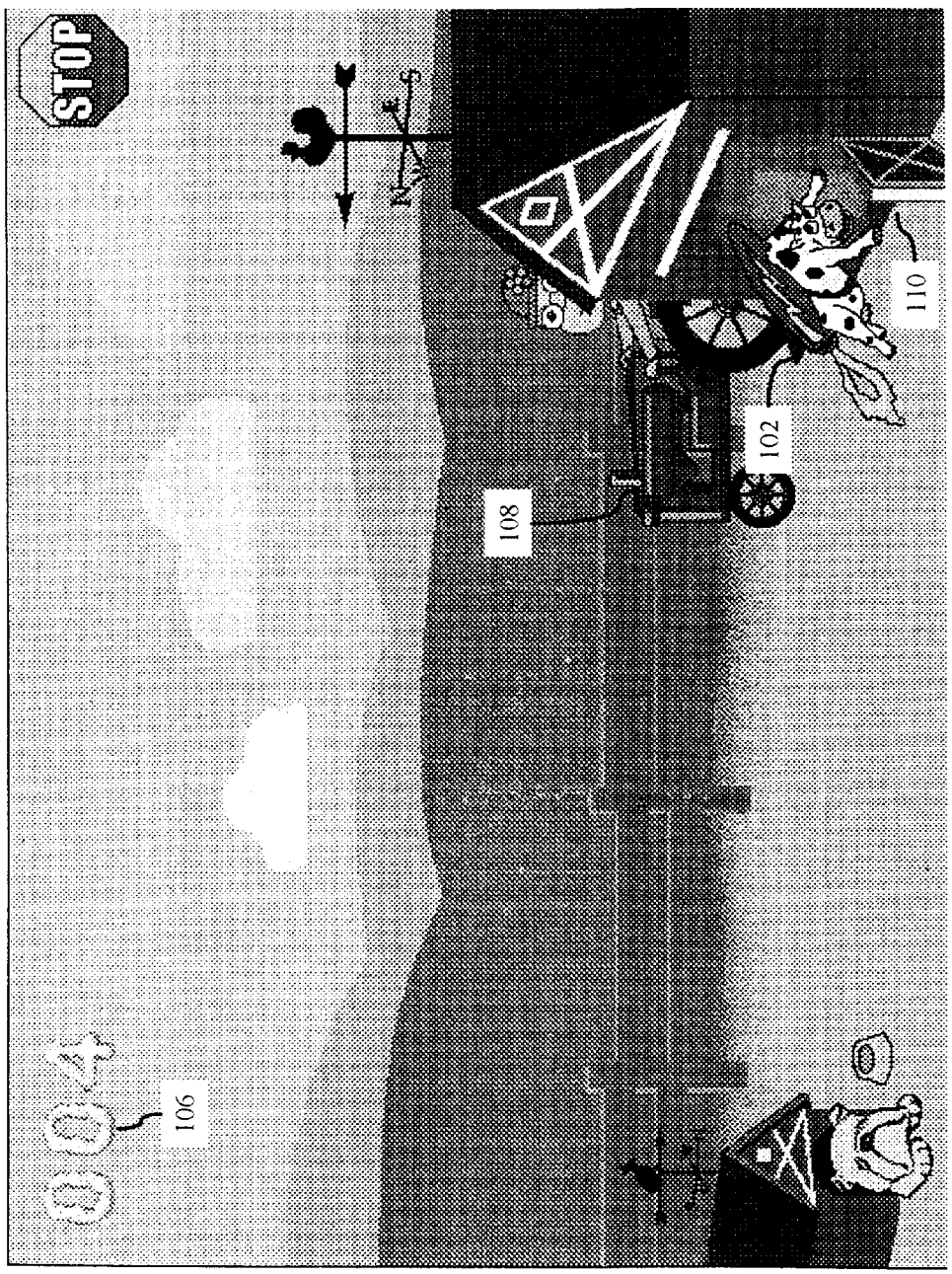

The user holds flying object 102 while a phoneme is repeatedly played for the user. For example, the audible sound, "si," can be repeated through a computer sound card and loudspeaker as described more completely below. At some point, a similar but distinct phoneme, e.g., "sti," is substituted for the repeated phoneme. The user is expected to recognize the substituted phoneme as distinct and so indicate by releasing flying object 102. If the user releases flying object 102 prior to substitution of the distinct phoneme or fails to release flying object 102 within a predetermined period of time following substitution of the distinct phoneme, the user's response is characterized as incorrect, and flying object 102 is shown, through computer animation, to fly away as shown in FIG. 3. Conversely, if the user releases flying object 102 within the predetermined period of time following substitution of the distinct phoneme, the user's response is characterized as correct and flying object 102 is shown, through computer animation, to fly into a home 110 as shown in FIG. 4.

Thus, Old MacDonald's Flying Farm trains the user to recognize distinctions between similar but distinct phonemes, such as (i) "si" and "sti" and (ii) "chu" and "shu." The stimuli of Old MacDonald's Flying Farm, i.e., the similar but distinct phonemes, are selected to challenge, and therefore improve, a cognitive ability of the user, namely, to perceive subtle distinctions between similar but distinct phonemes. The phonemes themselves have no real entertainment value in and of themselves for the user. Instead, entertainment value is built into the context surrounding the stimuli, namely, an animated flying farm animal which many users find to be humorous. In addition, a sense of order motivates the user to coax the flying farm animal into a home, e.g., home 110 which is a barn in which the cows belongs from the perception of the user. Similarly, the flying chick of flying object 202 (FIG. 15) belongs under a mother hen, e.g., home 210.

Circus Sequence

FIGS. 17–34 are screen views of a training exercise called "Circus Sequence" which is used to improve language comprehension of LLI users. Circus Sequence trains a user to distinguish frequency sweeps, i.e., audible sounds with simple tones sweeping continuously through a range of frequencies. In particular, the user is trained to distinguish between two frequency sweeps covering the same frequency spectrum, one sweeping from low to high frequency and the other sweeping from high to low frequency. The former is called an up sweep and the latter is called a down sweep. The duration of the frequency sweeps and the inter-stimuli interval (ISI), i.e., pause between frequency sweeps, are adjusted according to the ability of the user to distinguish the frequency sweeps as measured in previous play of Circus Sequence by the user.

Figure 17:
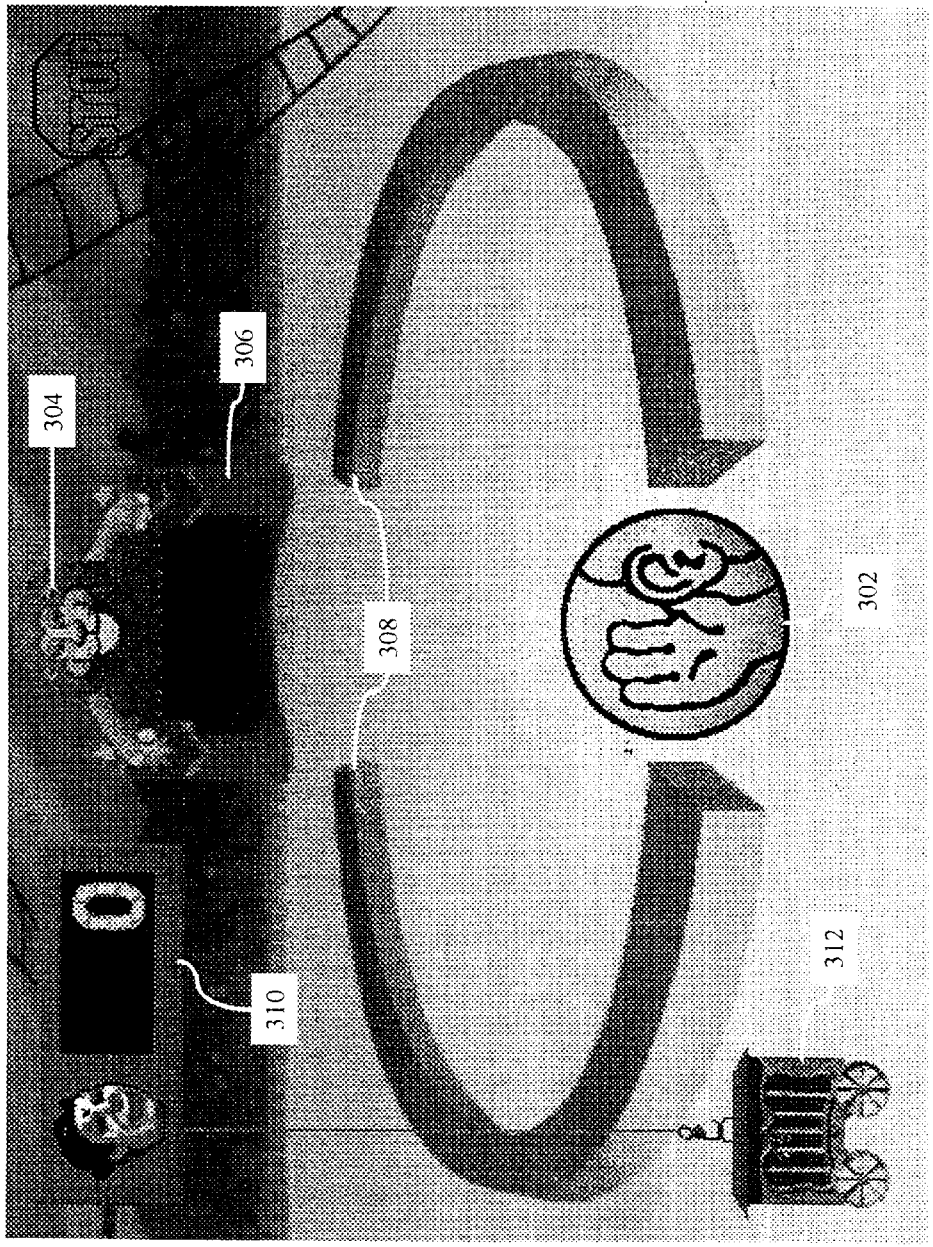
Figure 18:
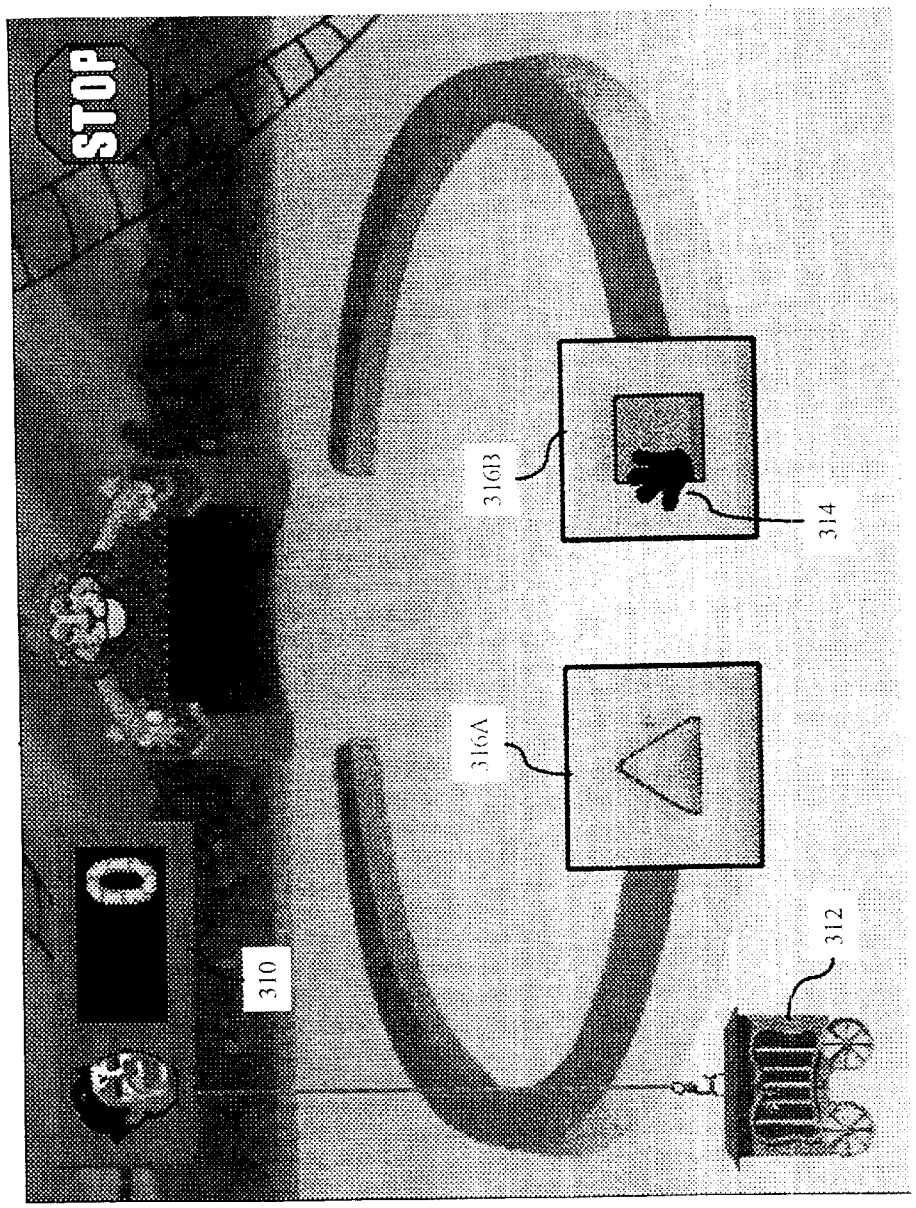

In Circus Sequence, the user indicates readiness to hear the frequency sweeps by clicking on a button 302 (FIG. 17). The user clicks button 302 using conventional user interface techniques by physical manipulation of user input devices as described more completely below. A button 316A (FIG. 18) is associated with an up sweep and another button 316B is associated with a down sweep. Two sweeps are played to the user and the user identifies the sweeps by pressing associated ones of buttons 316A–B. For example, if the user hears two up sweeps, the user presses button 316A twice. If the user hears a down sweep followed by an up sweep, the user presses button 316B then presses button 316A to correctly identify the sweeps. Accordingly, Circus Sequence trains the user to distinguish up sweeps and down sweeps.

The stimuli of Circus Sequence, i.e., the up sweeps and down sweeps, are selected to challenge, and therefore improve, a cognitive ability of the user, in particular, the ability of the user to recognize quick changes in frequency which are common in spoken language. The frequency sweeps have little, if any, inherent entertainment value for the user. Accordingly, extrinsic motivation must generally be provided to encourage the user to listen attentively to the up and down sweeps and to correctly identify them. Such motivation is described more completely below.

Block Commander

FIGS. 35–40 are screen views of a training exercise called "Block Commander" which is used to improve language comprehension of LLI users. Block Commander improves a user's language comprehension. Specifically, Block Commander audibly directs a user to perform an action involving one or more of a number of objects 404 (FIG. 35) using a cursor 402. Using a computer-synthesized voice played through a sound card and loudspeaker, for example, Block Commander can direct the user to "touch the blue square." Using conventional drag-and-drop user interface techniques involving physical manipulation of user input devices, the user complies with the direction given by Block Commander. Compliance with the direction indicates that the user successfully understood the direction. Any act by the user other than the act directed by Block Commander indicates that the user failed to properly understand the direction.

The computer-synthesized voice used by Block Commander to give audible directions to the user is processed and modified in a manner described more completely in the Training Patent and that description is incorporated herein by reference. The modification of the voice makes the voice more easily understood by LLI individuals. The degree to which the computer-synthesized voice is modified is adjusted according to the language comprehension ability of the user as measured in previous play of Block Commander. Thus, as the language comprehension ability of the user improves, the degree to which the computer-synthesized voice is modified is reduced to thereby challenge the language comprehension abilities of the user. Accordingly, Block Commander trains and improves language comprehension of the user.

The stimuli of Block Commander, i.e., the audible directions, are selected to challenge and therefore improve the language comprehension abilities of the user—a cognitive ability of the user. For example, the direction, "touch the small blue square," requires that the user distinguish "small" from "large," "blue" from other colors, and distinguish "square" from "circle." Other complexities of speech can be included in the stimuli as the language. comprehension of the user improves. For example, the user can be directed as follows: "Except for the blue one, touch the circles." The user is therefore challenged to understand exclusion. In addition, the user can be directed as follows: "Before touching the red circle, touch the blue square." Such challenges the user to understand compound phrases and sequencing. Similarly, the user can be directed as follows: "Place the green square between the white circle and the red circle."

These stimuli are specifically designed to challenge, and therefore improve, specific language comprehension abilities of the user and have little or no inherent entertainment value in and of themselves. Accordingly, motivation to the user to comply with the audible directions must generally be provided independently of the audible directions themselves.

Phonic Match

Figure 41:
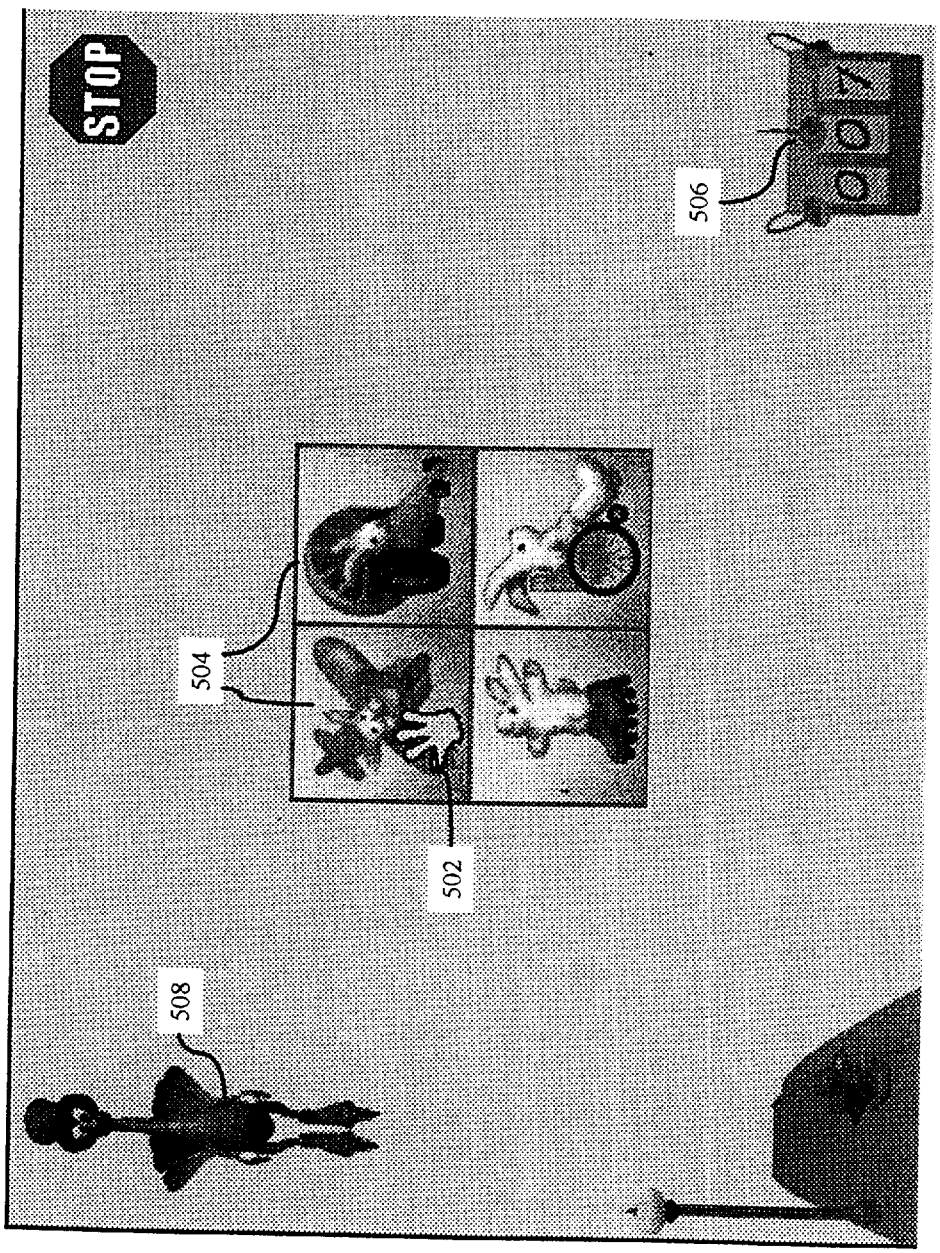
Figure 42:
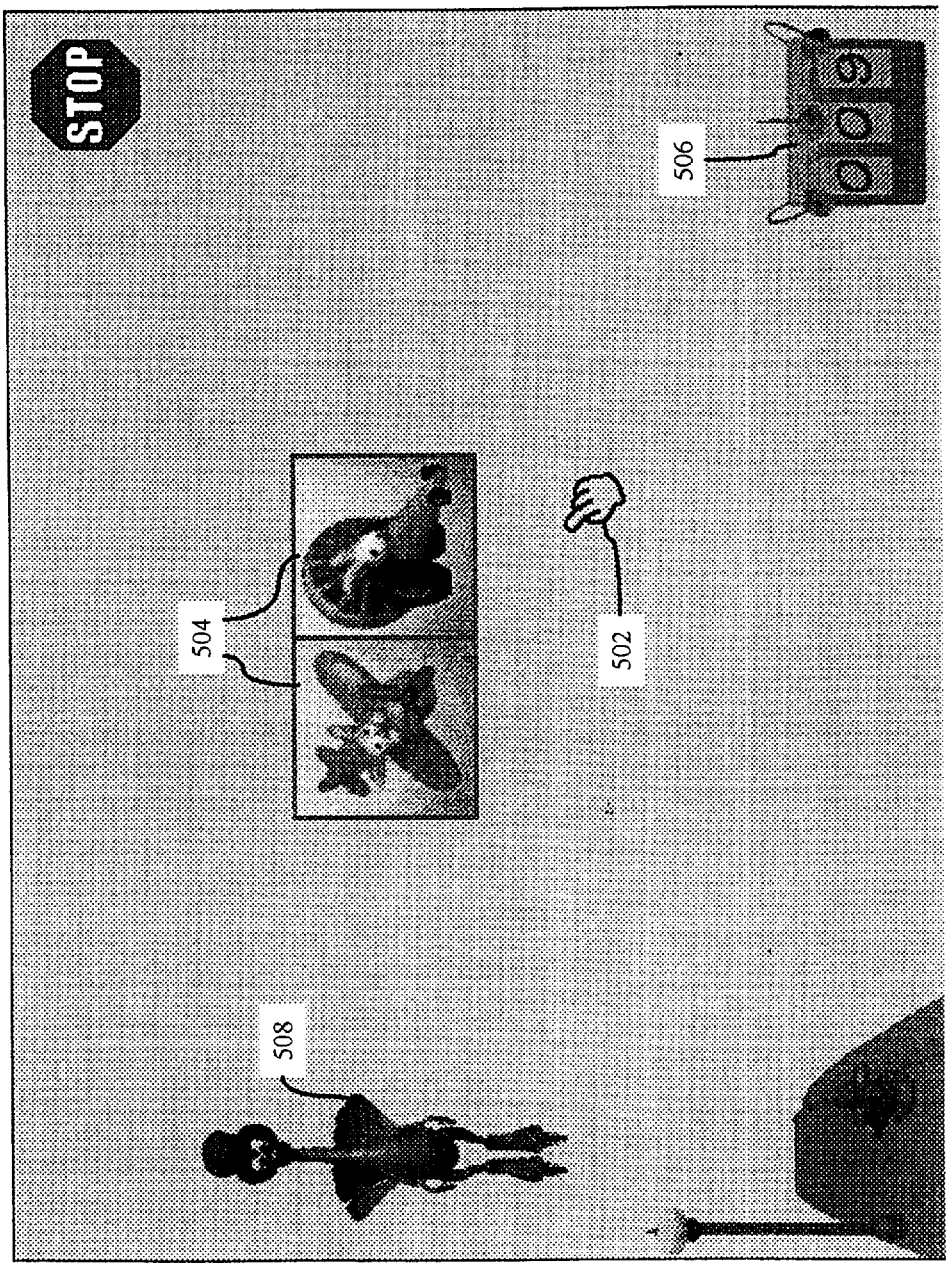
Figure 43:
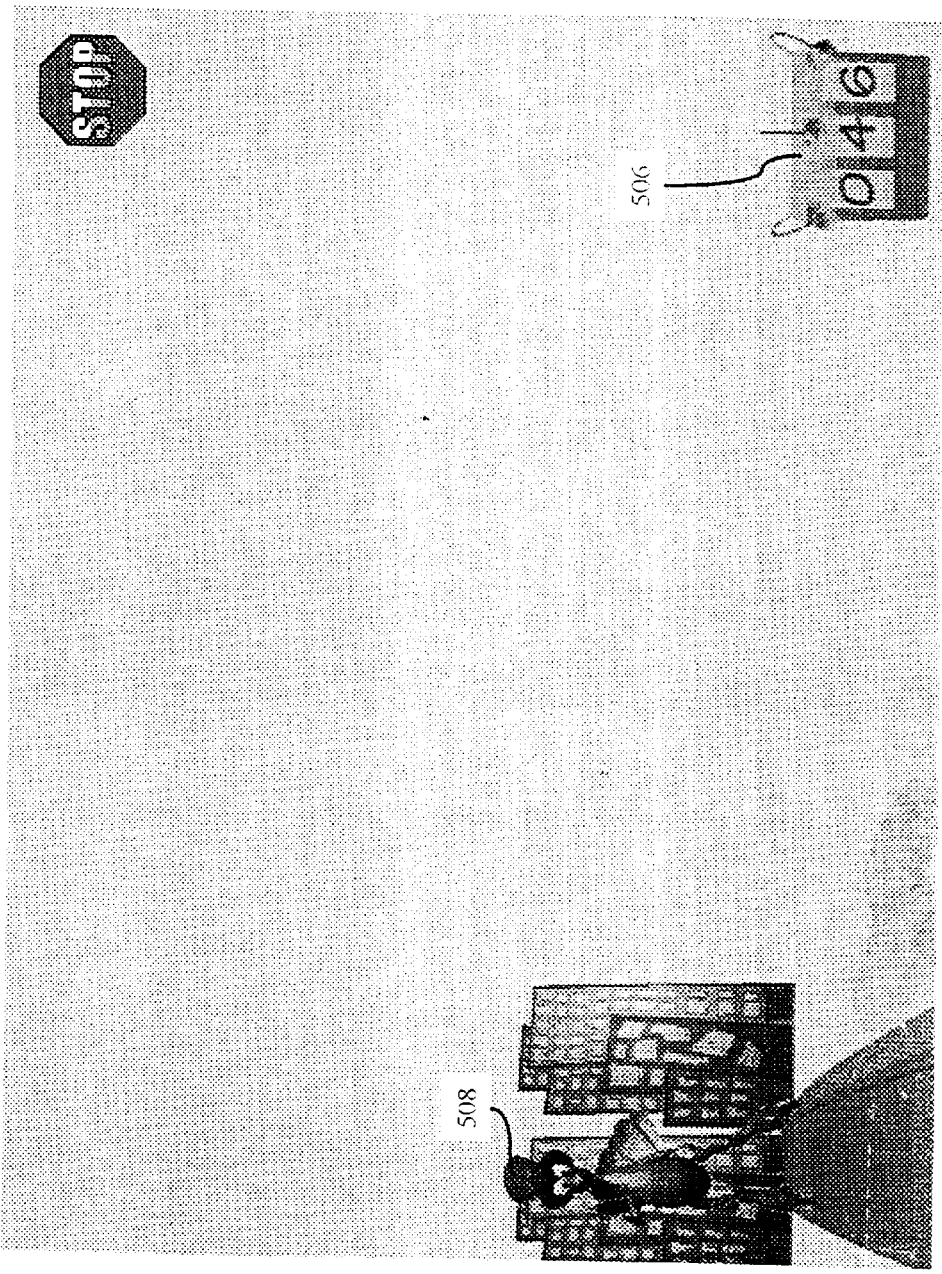

FIGS. 41–47 are screen views of a training exercise called "Phonic Match" which is used to improve language comprehension of LLI users. Phonic Match associates audible words with respective ones of panes 504 (FIG. 41). The audible word associated with a given one of panes 504 is played for the user in response to clicking on the pane with a cursor 502. Each audible word is associated with two paired ones of panes 504 and the user is to recognize and identify both panes of each pair. The user identifies the panes of a pair by clicking on the paired panes in succession. For example, clicking on one of panes 504 the user hears "tag" and clicking on a second one of panes 504 the user hears "bag." The user has not identified a matching pair of panes 504. Conversely, if the user clicks on two of panes 504 and hears "tag" both times, the user has identified a matching pair. When a matching pair of panes 504 is recognized and identified by the user, those panes are removed from the display as shown in FIG. 42.

Figure 45:
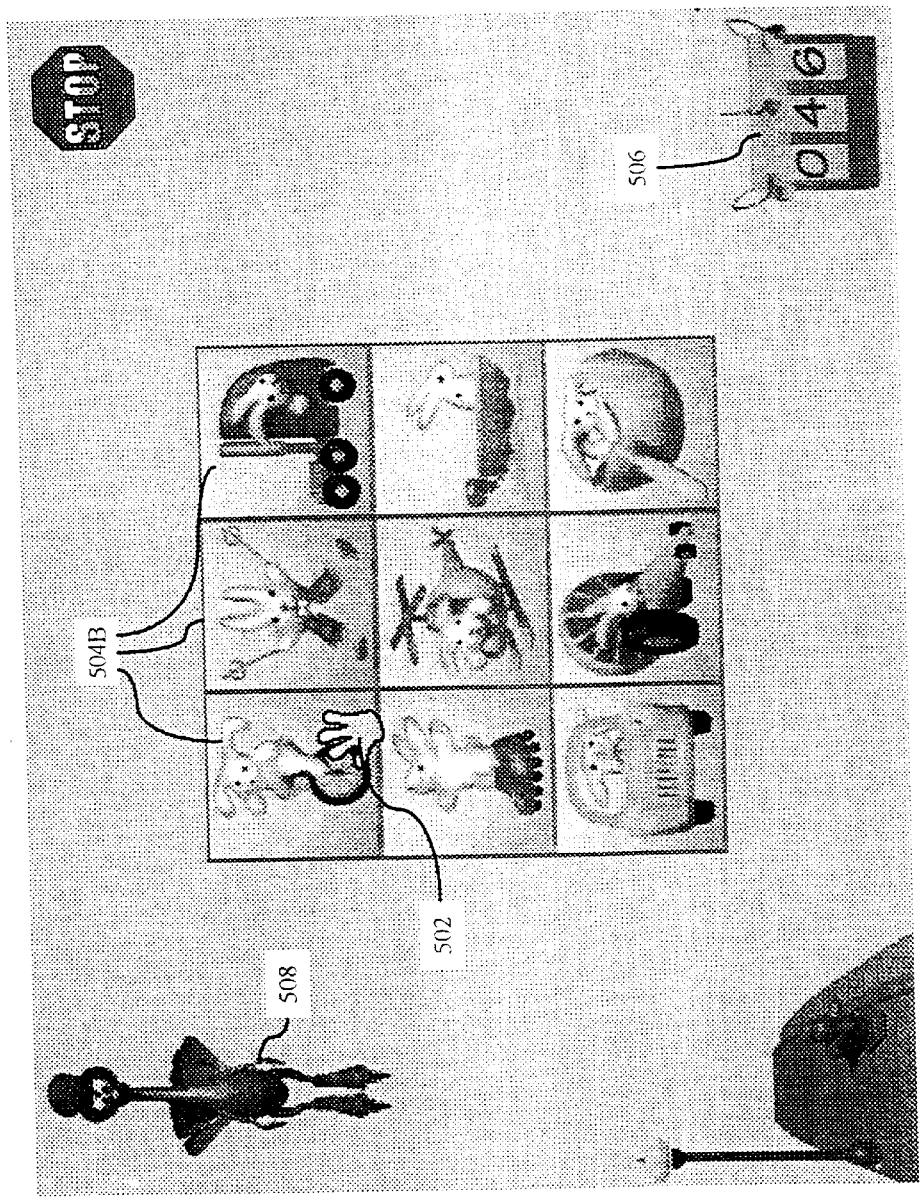
Figure 46:
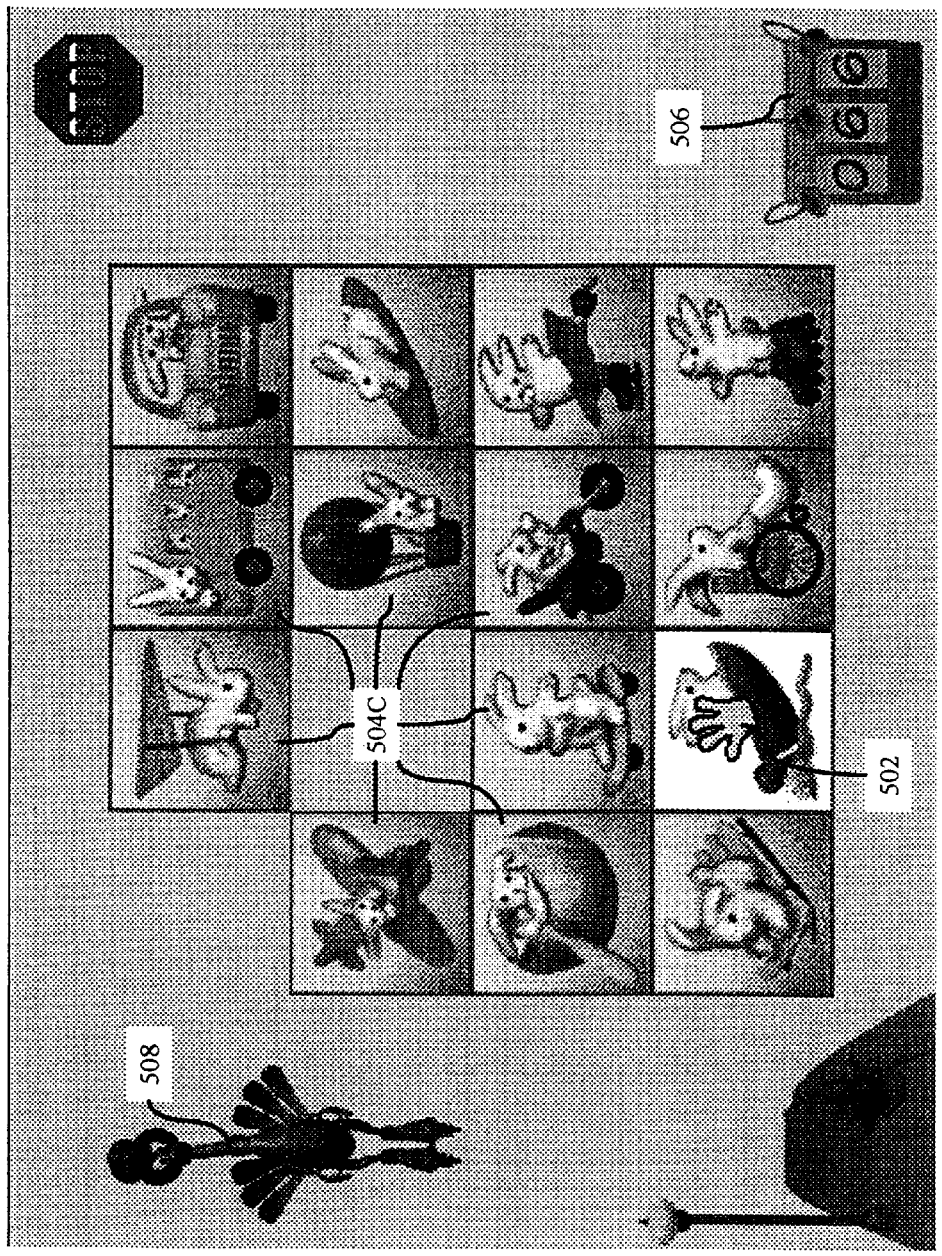
Figure 47:
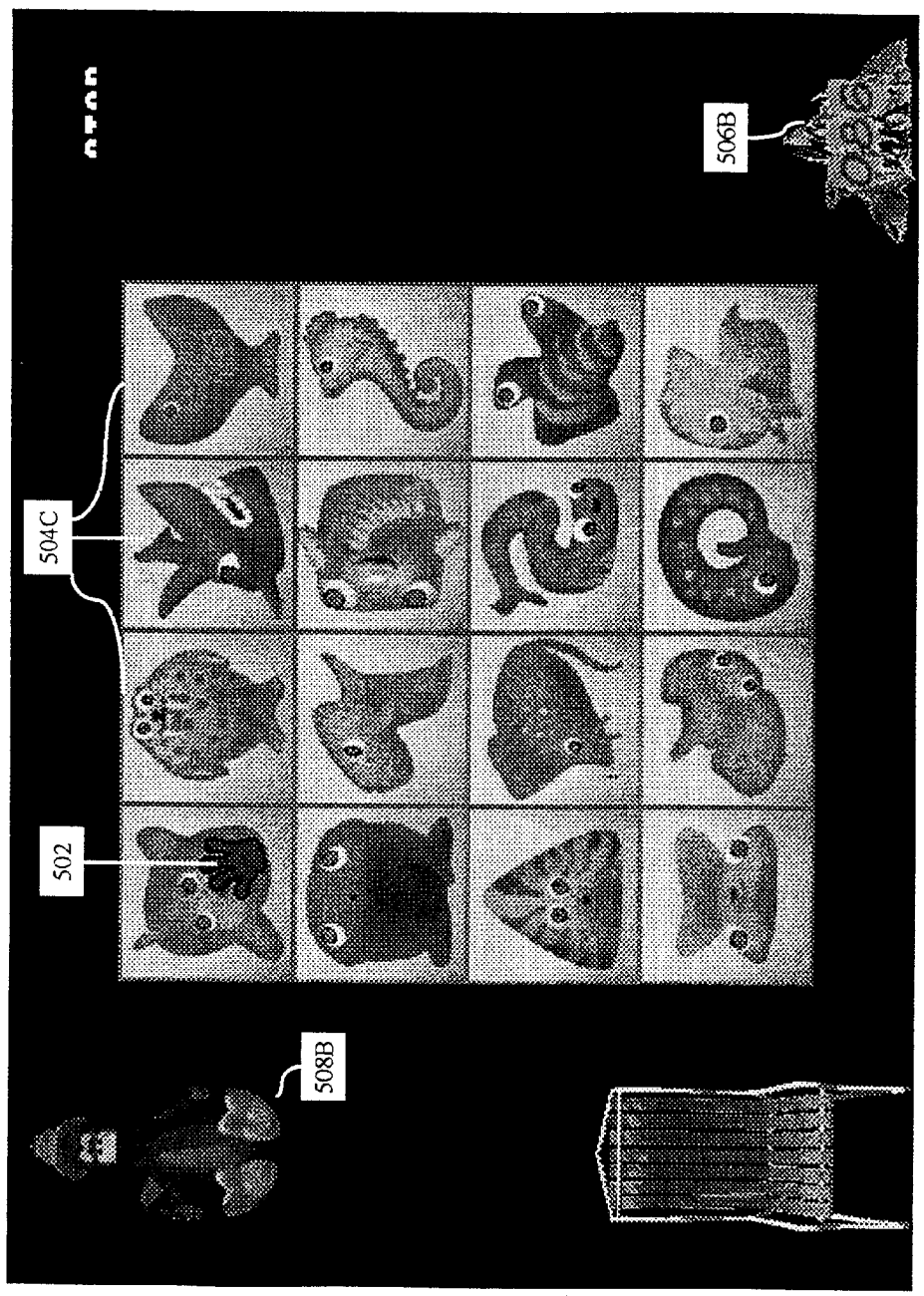
Figure 48:
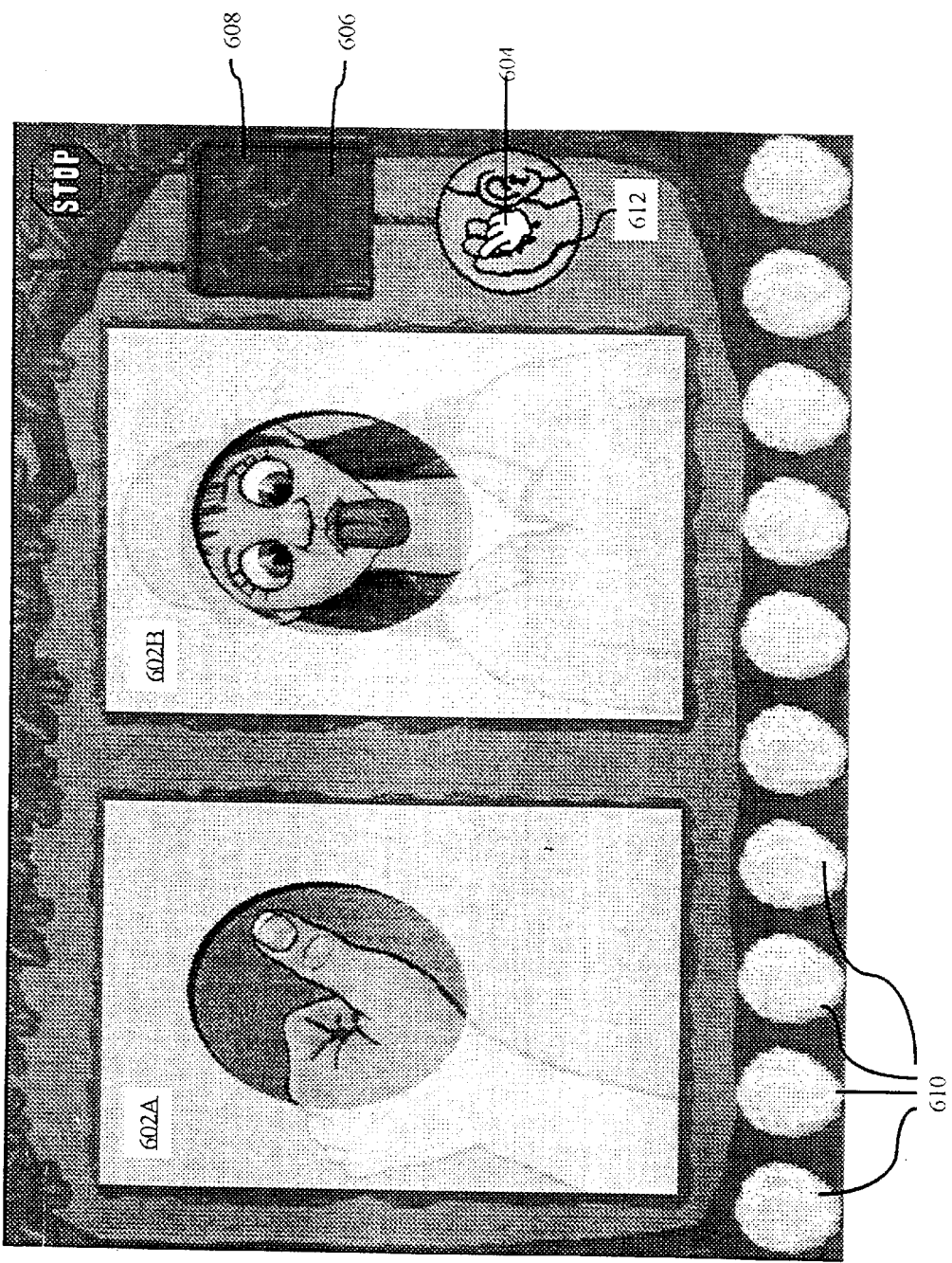

Phonic Match challenges and improves the user's ability to distinguish similarly sounding words and the user's memory capacity simultaneously. The audible words are modified in accordance with previously determined ability of the user to comprehend speech in the manner described above. In addition, the number of panes 504 can be increased in accordance with the user's previous performance of Phonic Match. For example, FIG. 41 shows four (4) panes 504. FIG. 45 shows nine (9) panes 504B. FIG. 46 shows sixteen (16) panes 504C with two matched panes removed after identification by the user in the manner described above.

The stimuli, namely the audible words, are specifically selected to challenge and improve a cognitive ability of the user, i.e., to remember and distinguish similarly sounding words. For example, the audible words can include "tag," "tack," "tab," "bag," "back," "pack," "pick," and "tick." Since these audible words are specifically selected to challenge and improve the user's ability to remember and distinguish similarly sounding words, these words have little or no inherent entertainment value. As a result, motivation independent of the stimuli themselves is provide as described more completely below to encourage the user to strive to remember and correctly identify matching phonemes.

Phonic Word

FIGS. 48–58 are screen views of a training exercise called "Phonic Word" which is used to improve language comprehension of LLI users. Phonic Word tests and trains a user's ability to distinguish similarly sounding words. In general, Phonic Word shows the user two images 602A–B (FIG. 48) and audibly directs the user to identify one of images 602A–B. For example, Phonic Word can play a computer-synthesized voice which tells the user to "show me thumb." Using a cursor 612, the user identifies one of images 602A–B. If the user identifies image 602A, the user correctly identifies the image of the thumb and indicates a correct distinction between "thumb" and "tongue." Conversely, if the user identifies image 602B, the user has failed to distinguish "thumb" from "tongue" and so indicates to Phonic Word.

The computer-synthesized voice is modified in accordance with previously determined ability of the user to distinguish similarly sounding words in the manner described above. As the user's ability to distinguish similarly sounding words improves, the degree to which the computer synthesized voice is modified is decreased to further challenge the user. Accordingly, Phonic Word trains the user to distinguish similarly sounding words.

The stimuli, namely the similarly sounding words, are specifically chosen to challenge and improve the user's ability to distinguish similarly sounding words and generally not for entertainment of the user. As a result, the similarly sounding words have little, if any, entertainment value for the student. Motivation to listen attentively and to correctly comply with the audible direction to identify one of images 602A–B is provided-independently from the audible directions themselves as described more completely below.

Phoneme Identification

FIGS. 59–69 are screen views of a training exercise called "Phoneme Identification" which is used to improve language comprehension of LLI users. Phoneme Identification tests and improves the user's ability to select and identify a particular phoneme from two similarly sounding phonemes.

First, Phoneme Identification plays a target phoneme which the user is to identify. Next, Phoneme Identification plays two similarly sounding phonemes, one of which is the target phoneme.

Figure 67:
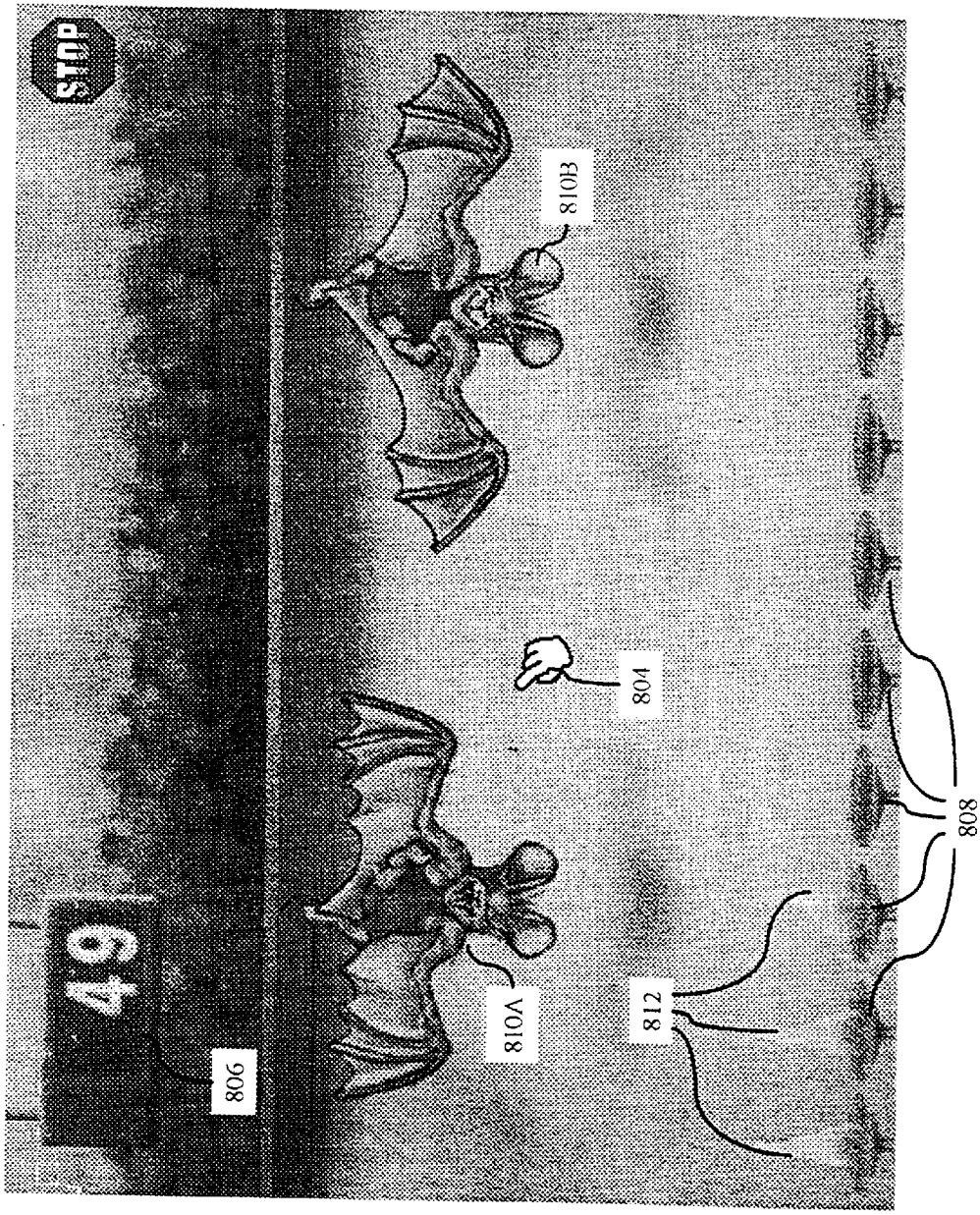
Figure 68:
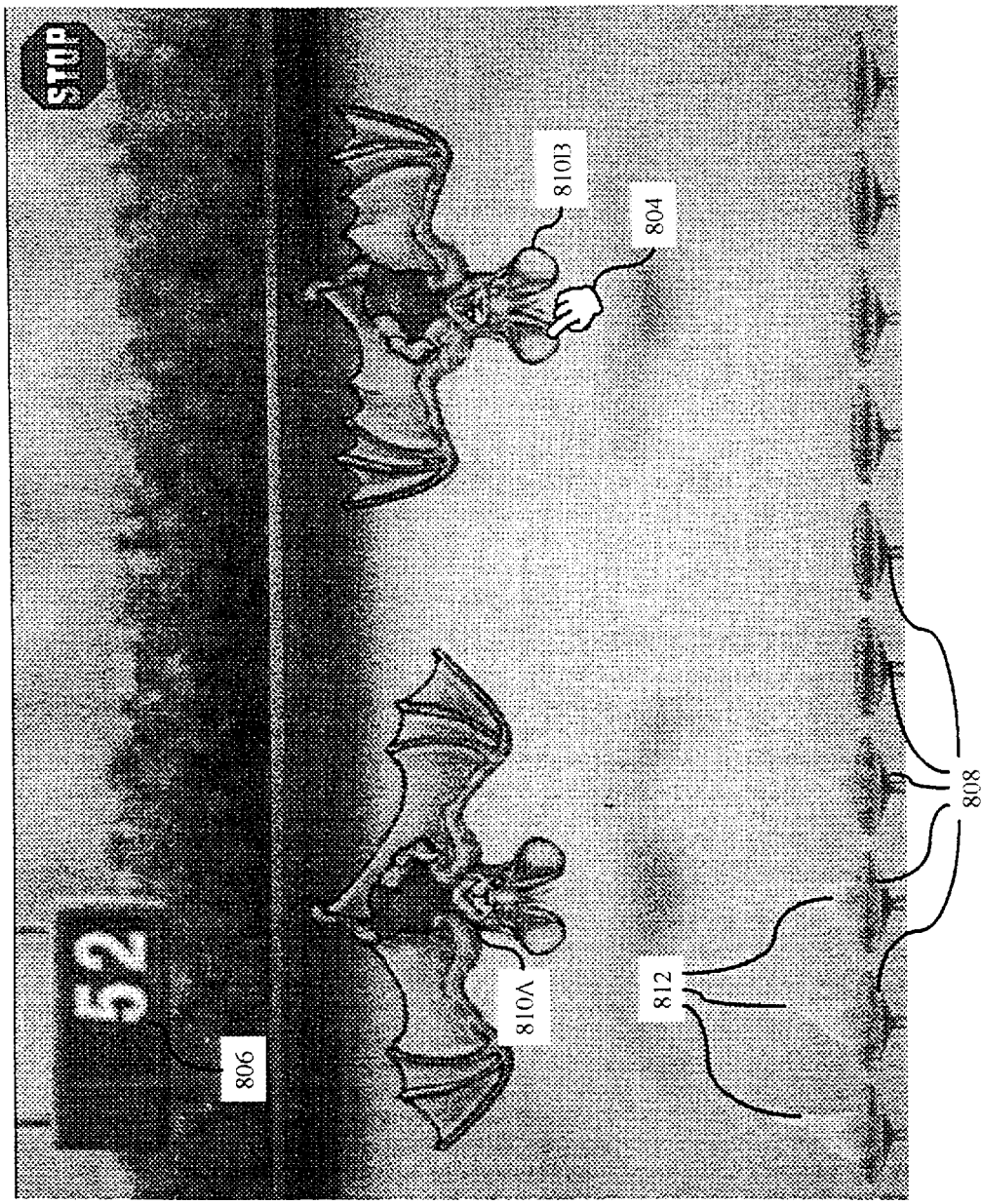
Figure 69:
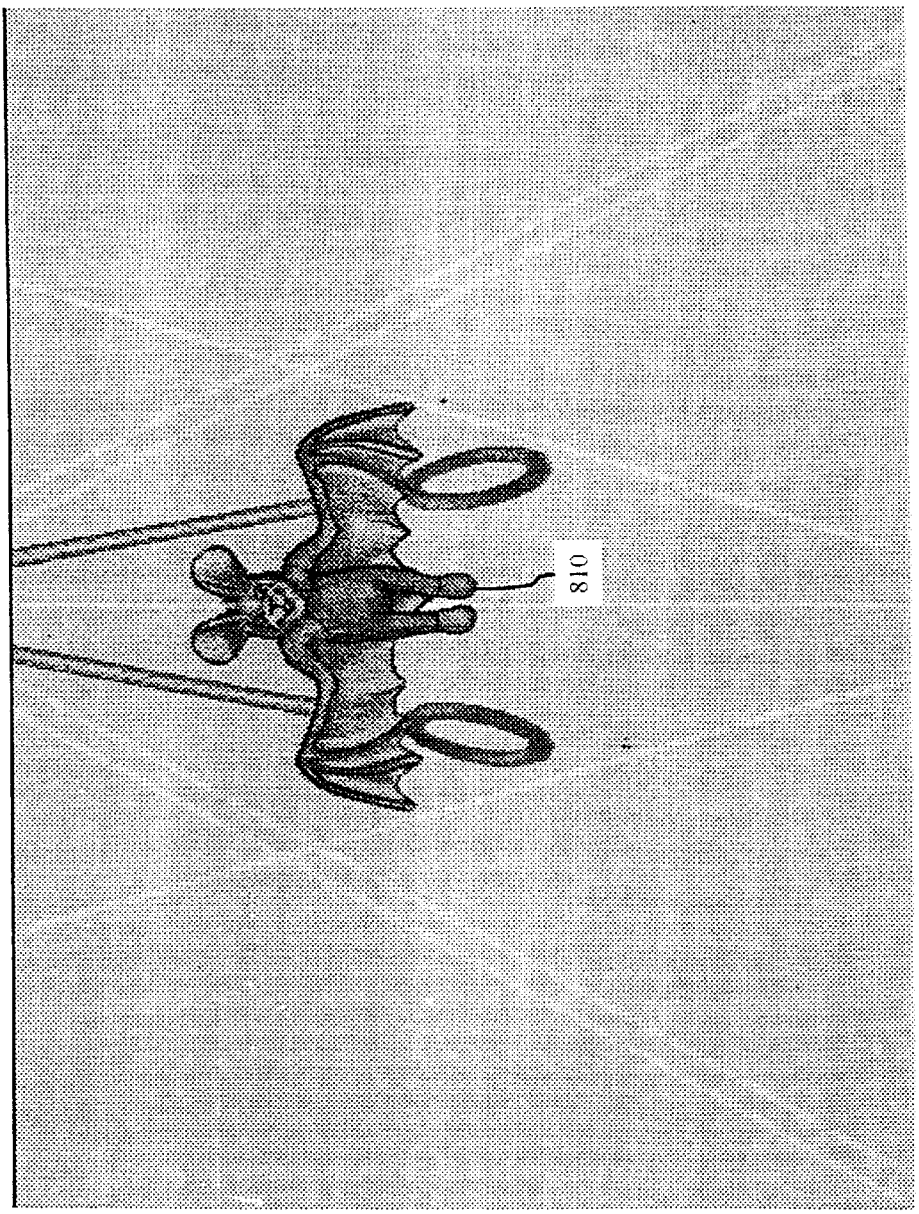

To provide the user with a mechanism by which to identify each of the similarly sounding phonemes, Phoneme. Identification associates each of the phonemes with a graphical image, i.e., each of images 810A–B (FIG. 67). Phoneme Identification animates images 810A–B to give the appearance to the user that each of images 810A–B speaks a respective one of the similarly sounding phonemes. FIG. 67 shows image 810A animated in the simulated act of speaking the first of the similarly sounding phonemes. FIG. 68 shows image 810B animated in the simulated act of speaking the second of the similarly sounding phonemes.

The user identifies the first or second of the similarly sounding phonemes as the target phoneme by clicking on image 810A or image 810B, respectively, with cursor 804 by physical manipulation of user input devices in conventional user interface techniques. The first, second, and target phonemes can be modified in the manner described above to be more easily recognizable to a person with LLI. The degree of phoneme modification, as well as the duration of an ISI between presentation of the first and second phonemes, can be adjusted according to the ability of the user to recognize target phonemes among similarly sounding phonemes as measured by the user's prior performances during playing Phoneme Identification.

In this way, Phoneme Identification tests and trains the user's ability to recognize particular phonemes from among similarly sounding phonemes. The stimuli, i.e., the similarly sounding phonemes, are selected specifically to challenge and improve the user's ability to remember and distinguish similarly sounding phonemes and not to entertain the user. As a result, the stimuli generally have no inherent entertainment value for the user. Motivation for the user to listen attentively to the stimuli and to correctly identify the target phoneme is therefore provided independently of the stimuli themselves as described more completely below.

Language Comprehension Builder

FIGS. 70–80 are screen views of a training exercise called "Language Comprehension Builder" ("LCB") which is used to improve language comprehension of LLI users. LCB tests and trains the user's ability to understand subtle distinctions in spoken language. Specifically, LCB presents to the user between a number of images 902A–D and audibly directs the user to identify one of the images. The images are selected so as to be similar to one another and rely upon subtle language distinctions to specifically request the user to identify only one of the images. For example, image 902A shows a car that is broken, image 902D shows a cup that is broken, and image 902C shows a cup. LCB plays an audible direction to the user to "show me the cup is broken." To properly identify image 902D, the user has to understand the distinction between "cup" and "car" and further has to comprehend "broken."

The user identifies one of images 902A–D by clicking on one of images 902A–D through control of a cursor 904 using conventional user interface techniques and physical manipulation of user input devices. Correctly identifying the one of images 902A–D indicates that the user correctly understood the audible direction given by LCB. Identifying one of images 902A–D other than the image identified audibly by LCB indicates that the user failed to understand the audible direction. The audible direction can be modified in the manner described above to be more easily understood by user's with LLI. The degree of such modification, as well and the speed with which the oral direction is given, can be adjusted according to the language comprehension skills of the user as measured by previous play sessions with LCB by the same user.

Thus, LCB tests and trains the user's ability to understand subtle distinctions in spoken language. The stimuli, which are the audible directions in this case, are specifically chosen to challenge and improve a cognitive ability of the user, namely, to comprehend subtle distinctions and constructs of spoken language. In one embodiment, the audible, audible directions are selected from the known, standardized, Curtis-Yumada Comprehensive Language Examination (CYCLE) language assessment test. The audible directions have little, if any, inherent entertainment value for the user.

Operating Environment of the Training Exercises

Figure 81:
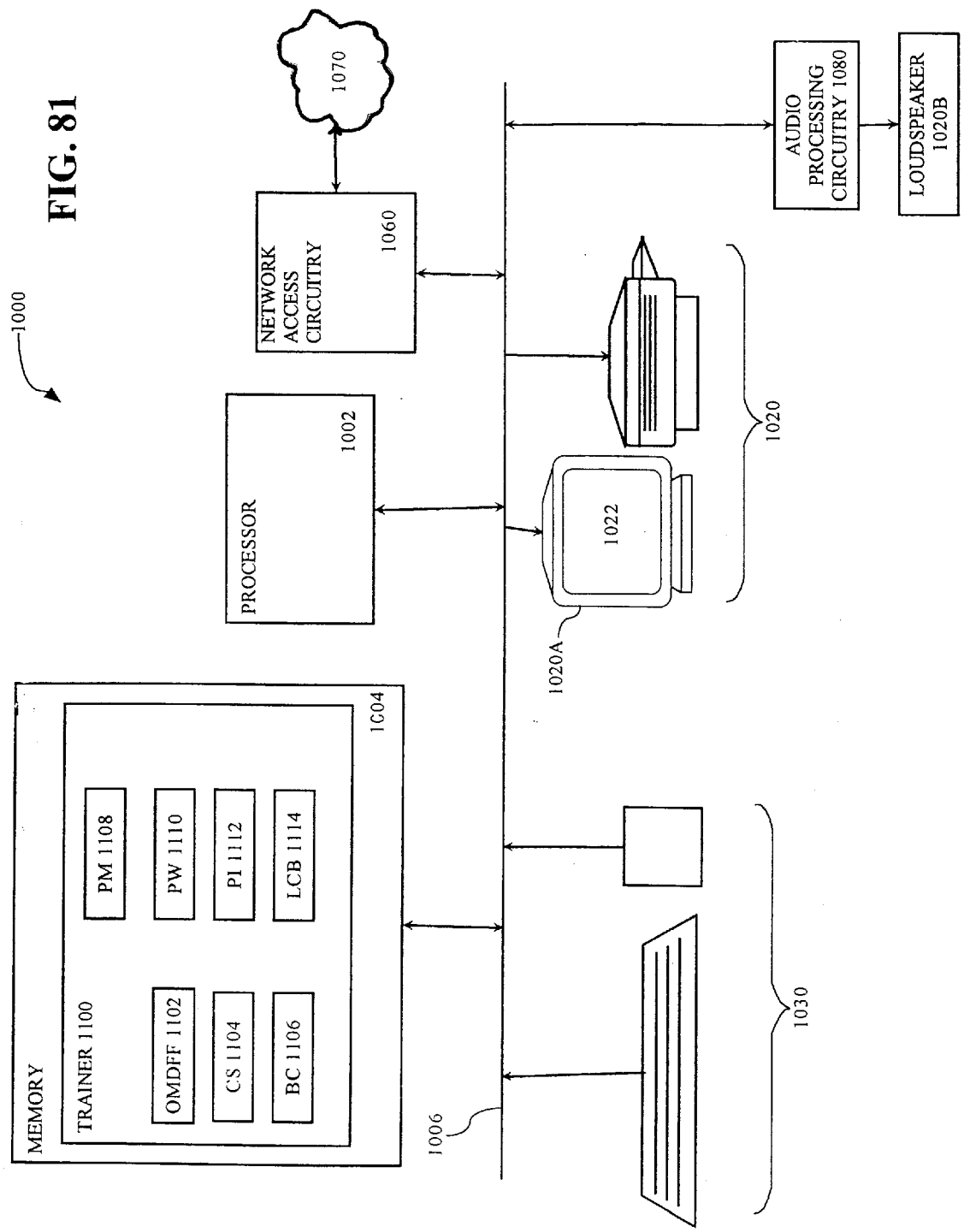
FIG. 81 is a block diagram of a computer system in which training exercises according to the present invention execute.

In this illustrative embodiment, each of the training exercises described above and more completely below are all or part of one or more computer processes executing within a computer system 1000 as shown in FIG. 81. Computer system 1000 (FIG. 81) includes a processor 1002 and memory 1004 which is coupled to processor 1002 through an interconnect 1006. Interconnect 1006 can be generally any interconnect mechanism for computer system components and can be, e.g., a bus, a crossbar, a mesh, a torus, or a hypercube. Processor 1002 fetches from memory 1004 computer instructions and executes the fetched computer instructions. In addition, processor 1002 can fetch computer instructions through a computer network 1070 through network access circuitry 1060 such as a modem or ethernet network-access circuitry. Processor 1002 also reads data from and writes data to memory 1004 and sends data and control signals through interconnect 1006 to one or more computer display devices 1020 and receives data and control signals through interconnect 1006 from one or more computer user input devices 1030 in accordance with fetched and executed computer instructions.

Memory 1004 can include any type of computer memory and can include, without limitation, randomly accessible memory (RAM), read-only memory (ROM), and storage devices which include storage media such as magnetic and/or optical disks. Memory 1004 includes a trainer 1100 which includes the training exercises described above and which is all or part of a computer process which in turn executes within processor 1002 from memory 1004. Alternatively, trainer 1100 can be implemented as a collection of computer processes. A computer process is generally a collection of computer instructions and data which collectively define a task performed by computer system 1000.

Each of computer display devices 1020 can be any type of computer display device including without limitation a printer, a cathode ray tube (CRT), a light-emitting diode (LED) display, or a liquid crystal display (LCD). Computer display devices 1020 each receive from processor 1002 control signals and data and, in response to such control signals, display the received data. In addition, loudspeaker 1020B plays audible sounds received from audio processing circuitry 1080. Loudspeaker 1020B can be one or more loudspeakers, amplified or unamplified. For example, loudspeaker 1020B can be a pair of headphones. Audio processing circuitry 1080 receives digital audio signals arid control signals from processor 1002 and produces analog audio signals in accordance therewith for reproduction through loudspeaker 1020B. Computer display devices 1020, and the control thereof by processor 1002, are conventional.

Each of user input devices 1030 can be any type of user input device including, without limitation, a keyboard, a numeric keypad, or a pointing device such as an electronic mouse, trackball, lightpen, touch-sensitive pad, digitizing tablet, thumb wheels, joystick, or voice recognition device. Each of user input devices 1030 generates signals in response to physical manipulation by a user and transmits those signals through interconnect 1006 to processor 1002.

As described above, trainer 1100 executes within processor 1002 from memory 1004. Specifically, trainer 1100 is all or part of one or more computer processes executing within computer system 1000, i.e., processor 1002 fetches computer instructions of trainer 1100 from memory 1004 and executes those computer instructions. As shown in FIG. 81, trainer 1100 includes the following training exercises: Old MacDonald's Flying Farm 1102, Circus Sequence 1104, Block Commander 1106, Phonic Match 1108, Phonic Words 1110, Phoneme Identification 1112, and Language Comprehension Builder 1114. Each of training exercises 1102–1114 has the respective behavior described above. Processor 1002, in executing trainer 1100, (i) presents stimuli such as the stimuli described above to the user in the form of video images in the screen views of FIGS. 1–80 on display screen 122 and audible sounds through audio processing circuitry 1080 and loudspeaker 1020B, and (ii) receives signals from user input devices 1030 representing the user's response to such stimuli. Furthermore, execution of trainer 1100 provides to the user motivation to continue use of trainer 1100 in the manner described more completely below.

In this illustrative embodiment, processor 1002 is any of the Pentium series of microprocessors available from Intel Corporation of Santa Clara, Calif. and computer system 1000 is compatible with the PC personal computer available from International Business Machines of Atlanita, Ga. operating under the WINDOWS 95 operating system available from Microsoft Corporation of Redmond, Wash. Alternatively, computer system 1000 can be a Macintosh computer available from Apple Computer Inc. of Cupertino, Calif.

Figure 2:
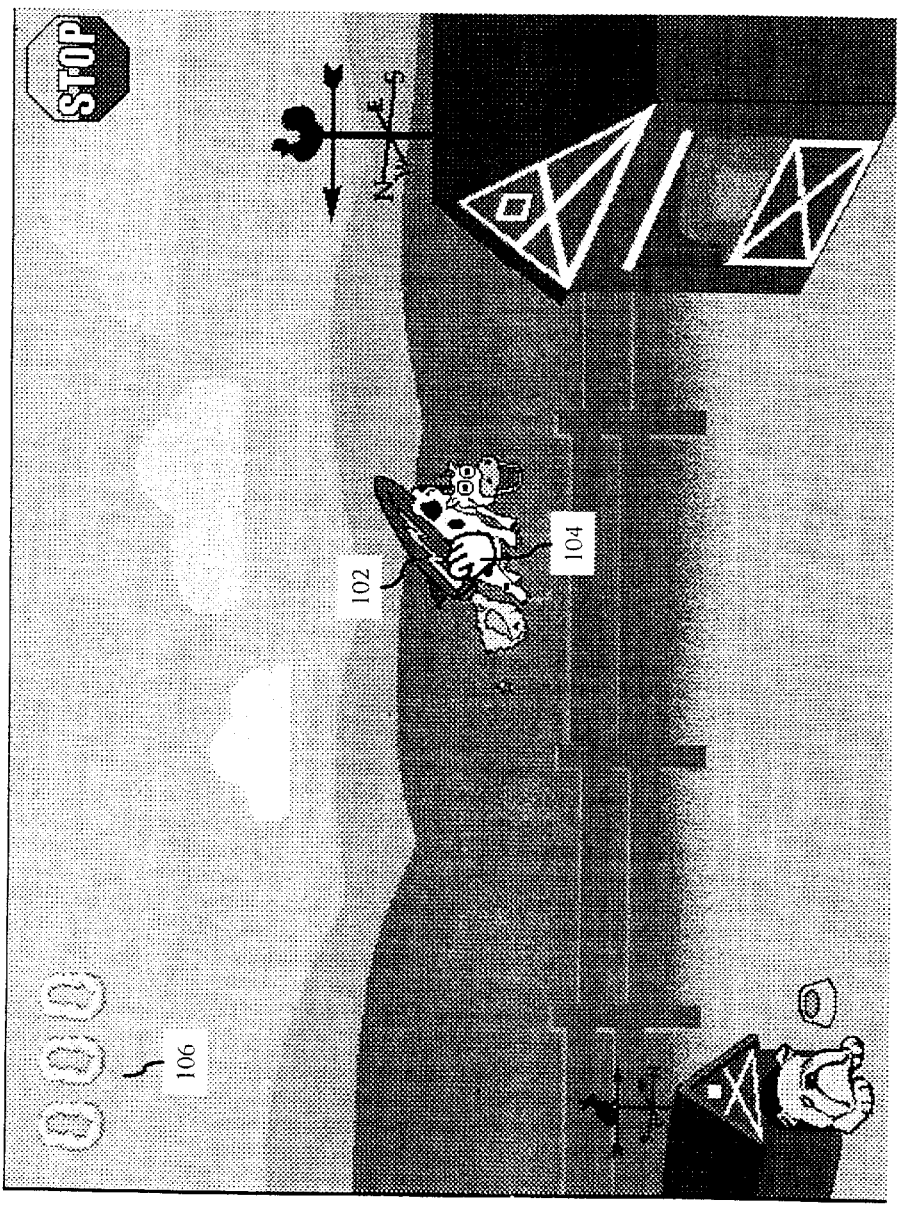

As described briefly above, the user identifies objects represented in display screen 1022 by clicking on such object. Typically, a user clicks on an object, e.g., flying object 102 (FIG. 1) by positioning a cursor, e.g., cursor 104, over the object (as shown in FIG. 2) and actuating a physical button or similar actuation mechanism on a user input device such as any of user input devices 1030 (FIG. 81). The user moves the cursor by physical manipulation one of user input devices 1030. For example, movement of an electronic mouse over a generally flat surface is generally detected by the electronic mouse either mechanically or optically and the electronic mouse generates signals representing the direction and distance of movement of the electronic mouse through interconnect 1006 to processor 1002.

Processor 1002 effects corresponding movements of the cursor in display screen 1022 to provide substantially immediate feedback to the user regarding the current position within display screen 1022 indicated by the current state of the electronic mouse. With the cursor over the object, the user can click on the object by actuating a physical button on the electronic mouse to thereby generate and transmit to processor 1002 signals so indicating. Clicking on an object by a user is detected by a computer process such as trainer 1100 (FIG. 81) and the computer process takes action in response to the detected actuation in accordance with the particular computer instructions which define the behavior of the computer process.

Motivation Mechanisms

In general, a complete training process for a particular user can involve playing the above-described training exercises for extended periods of time over a relatively long period of time, e.g., approximately one-to-two hours per day, five (5) days per week, for a period of 6–8 weeks. In addition, users of the training exercises described above are typically children. Children frequently have relatively little appreciation for the skills and cognitive abilities developed by the above-described training exercises and, accordingly, attention and persistence in adhering to the rigorous schedule described above is a significant problem. In addition, the nature of the training exercises as described briefly above are not as inherently exciting and motivating as threat/defense games. Instead of defending oneself from a simulated threat or racing or fighting an opponent, the user is asked to recognize sounds and follow simple directions. For many children, such challenges might seem mundane. Accordingly, a number of motivation mechanisms are implemented in the training exercises described above to promote use of the training exercises by users and to help users maintain and follow the ambitious schedules established for proper training. These motivation mechanisms include (i) a standardized token economy, (ii) achievement-based context changes, (iii) progress indicators, (iv) reward animations using persistent characters and plots, and (v) variable ratio reinforcement mechanisms. The motivations mechanisms described herein can be used individually or in combination to motivate users to apply themselves and to maintain the interest of users throughout the training process.

Standardized Token Economy

In playing the training exercises described above, the user accumulates points which can be subsequently exchanged for physical rewards. Such rewards can include small toys, T-shirts, recorded music (e.g., tapes and compact discs), and tickets to sporting events. The points therefore represent a currency in a token economy. A point counter such as point counter 106 (FIG. 1) indicates to the user the number of points accumulated during any individual play session of a particular training exercise. The represented accumulation of points provides motivation of the user to continue to use the training exercise and to accumulate points toward a particular reward the user would like.

Such a token economy can provide motivation to play one of the training exercises described above rather than others of the training exercises. For example, Circus Sequence 1104 (FIG. 81) and Phonic Match 1108 play relatively quickly, i.e., present stimuli to and receive responses from the user in a relatively short time period. The sounds in question are very short compared to sounds used in other training exercises. For example, Circus Sequence 1104. presents two relatively; short frequency sweeps to the user, and Phonic Match 1108 presents only single, short phonemes for each response by the user. By comparison, LCB 1114 can present audible stimuli in the form of lengthy sentences such as "show me the boy is hugging the clown that is kissing the girl" and such stimuli can be slowed and stretched and modified to be more easily understood by a user with LLI. Attributing the same number of points to each correct response regardless of the particular training exercise being played allows players to spend an inordinate amount of time playing training exercises with quick stimuli/response exchanges, e.g., Circus Sequence 1104 and Phonic Match 1108, and to spend much less time playing training exercises with slower stimuli/response exchanges, e.g., LCB 1114. Doing so enables the user to more quickly accumulate points.

Therefore, the number of points accumulated during play of each of the training exercises is standardized such that playing different training exercises for the same amount of time with the same degree of proficiency accumulates approximately the same number of points. As a result, preferences for one training exercise over another based on point-earning capacity are removed.

Figure 82:
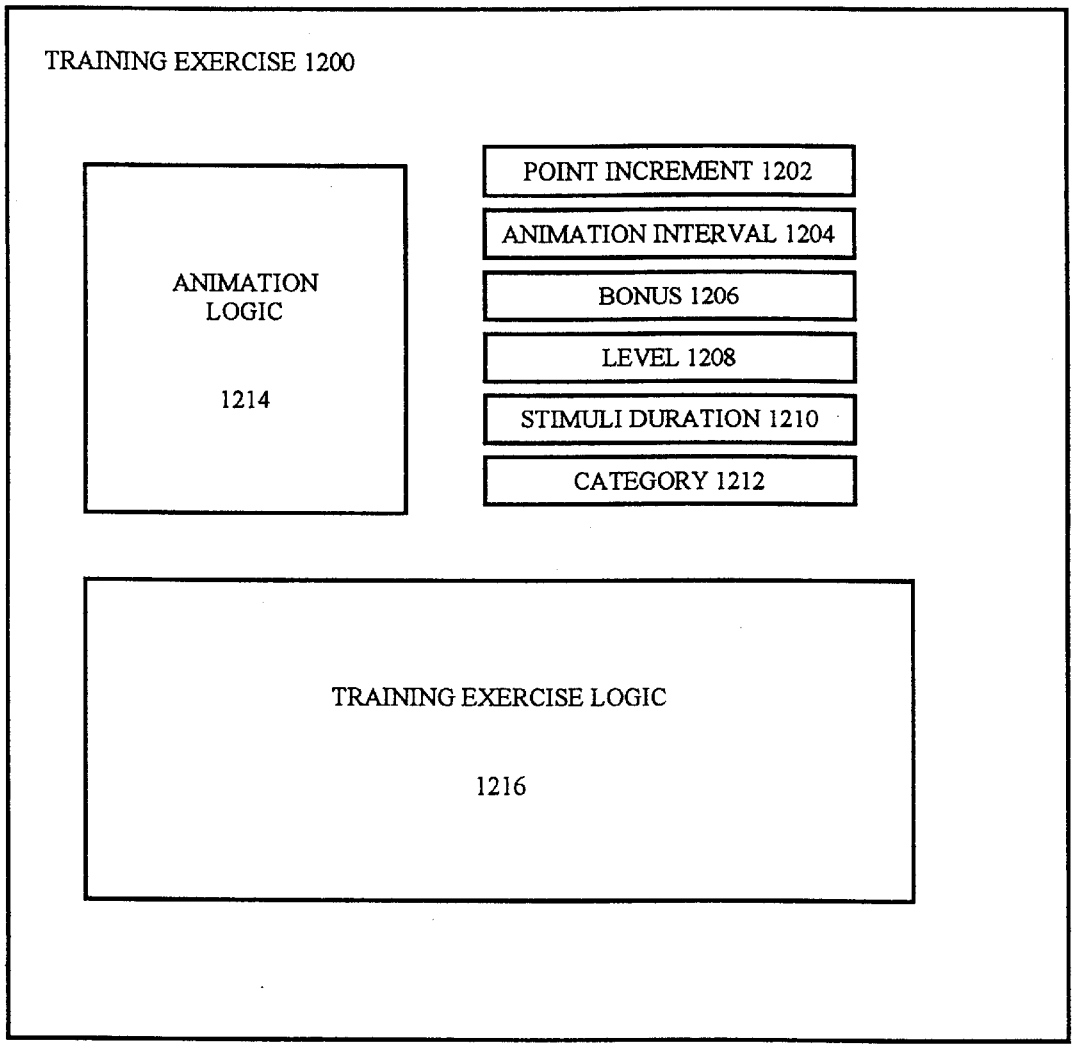
FIG. 82 is a block diagram of a training exercise of FIG. 81.

Training exercise 1200 (FIG. 82) is a generic representation of any of training exercises 1102–1112 of trainer 1100 (FIG. 81). Training exercise 1200 includes a number of field 1202–1212 which define components of the behavior of training exercise 1200. Training exercise 1200 further includes animation logic 1214 which presents reward animations to the user to periodically reward the user for good performance during play of training exercise 1200. Training exercise logic 1216 defines the overall behavior of training exercise 1200 described above. For example, if training exercise 1200 represents Old MacDonald's Flying Farm 1102 (FIG. 81), then training exercise logic 1214 (FIG. 82) defines the behavior described above with respect to Old MacDonald's Flying Farm 1102.

In general, each of training exercises 1102–1114 (FIG. 81) presents the user with a reward animation after a number of correct responses have been provided by the user. A number of points are awarded for each correct response to stimuli and a number of bonus points are awarded each time the user has earned a reward animation. To standardize the token economy, training exercise 1200 (FIG. 82) specifies in point increment field 1202, animation interval field 1204, and bonus field 1206 the amount of points a user can earn during play of the training exercise represented by training exercise 1200.

Specifically, point increment field 1202 specifies the number of points awarded to the user for each correct response. The number of points is directly related to the amount of time typically required to present the user with stimuli and to receive corresponding response signals from the user through user input devices 1030 (FIG. 81). This time is referred to herein as a transaction time.

As described above, Circus Sequence 1104 and Phonic Match 1108 typically have the smallest transaction times. Accordingly, the number of points awarded for each correct response during play of Circus Sequence 1104 and Phonic Match 1108 as represented in point increment field 1202 (FIG. 82) is relatively low. In this illustrative embodiment, two (2) points are awarded for each correct response in Circus Sequence 1104 and two (2) points are awarded for each correctly identified pair of panes in Phonic Match 1108. Circus Sequence 1104 represents the user's points accumulated during the current session in a point counter box 310 (FIG. 17). Similarly, Phonic Match 1108 (FIG. 81) represents the user's points accumulated during the current session in a point counter box 506 (FIG. 41).

Figure 59:
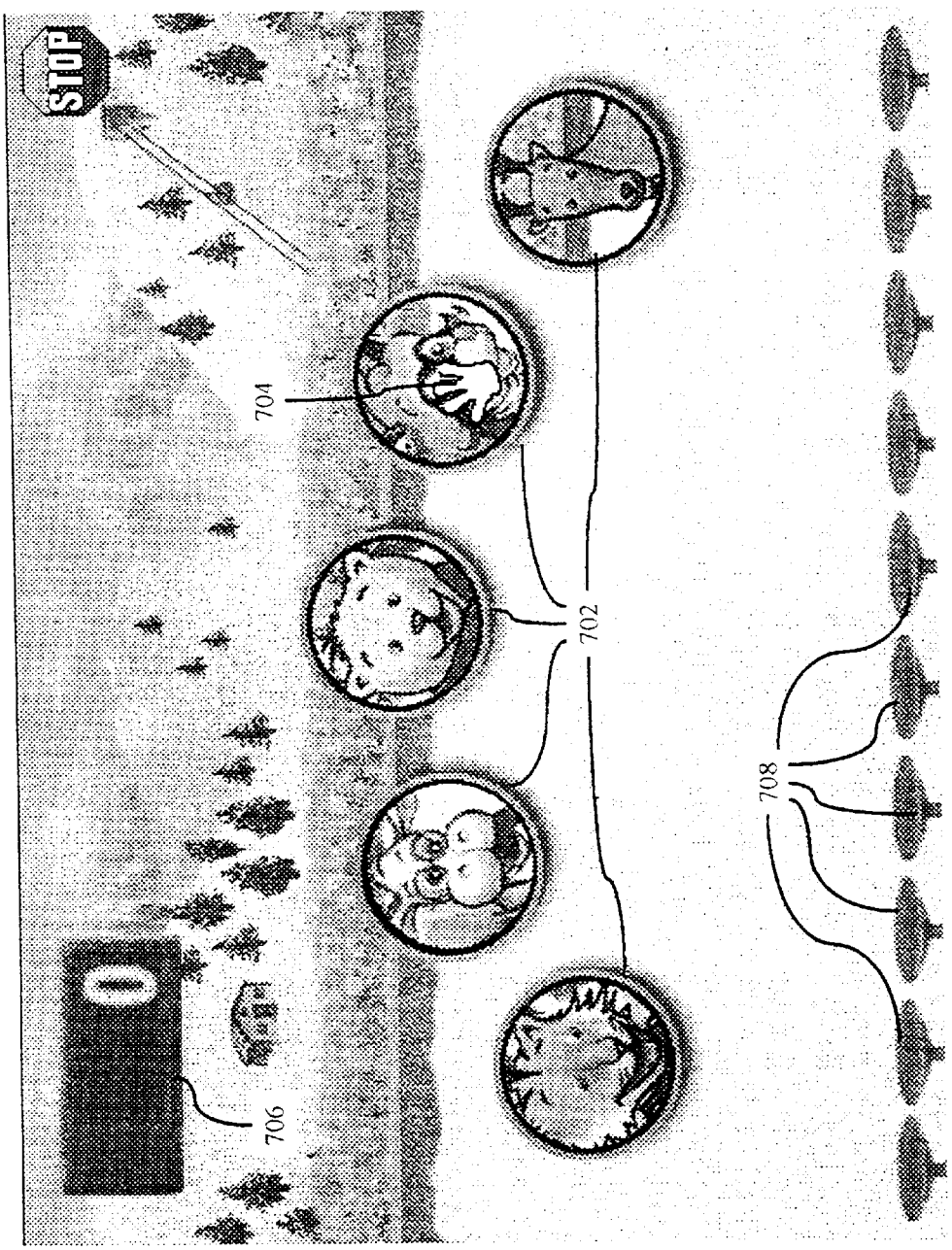
Figure 60:
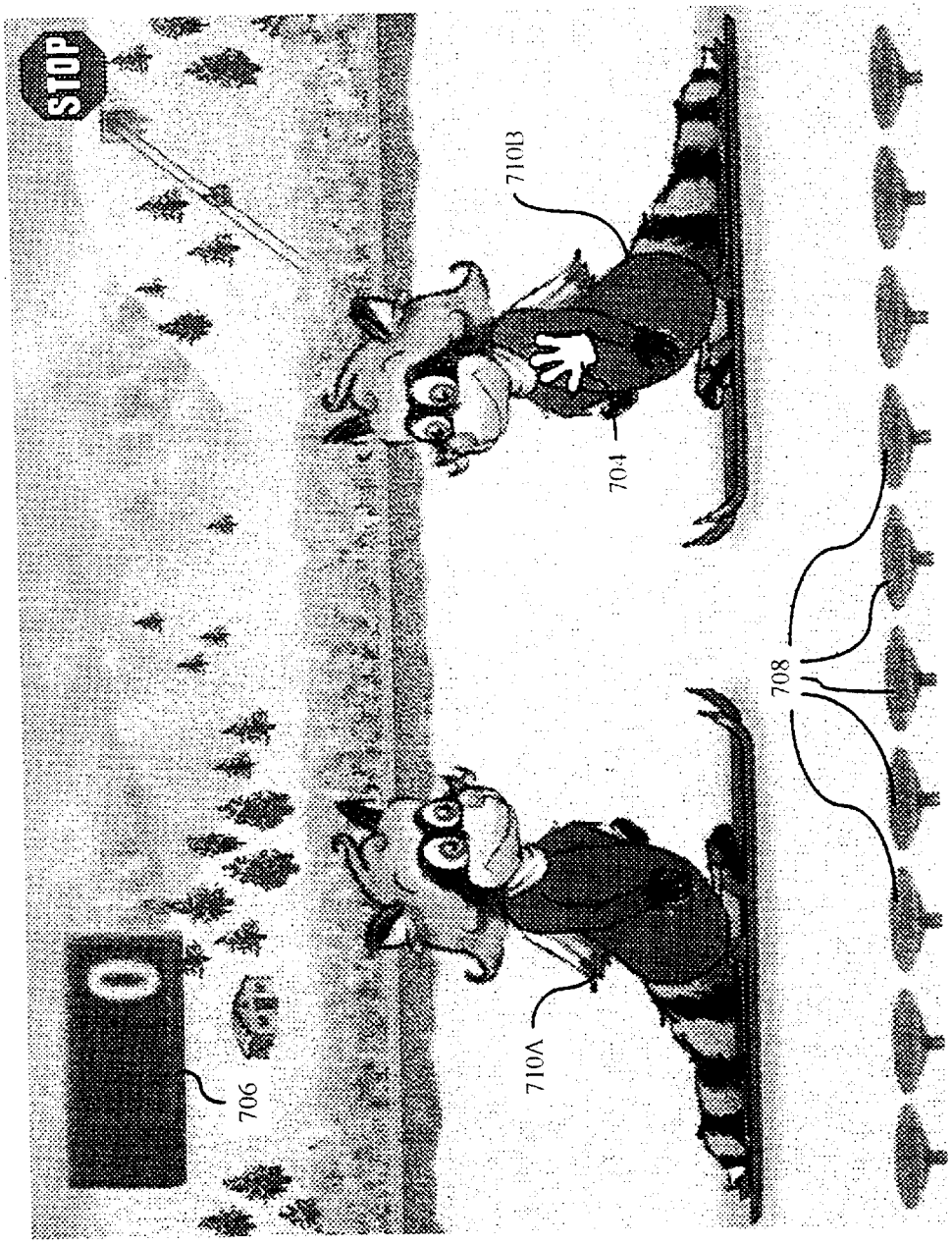
Figure 61:
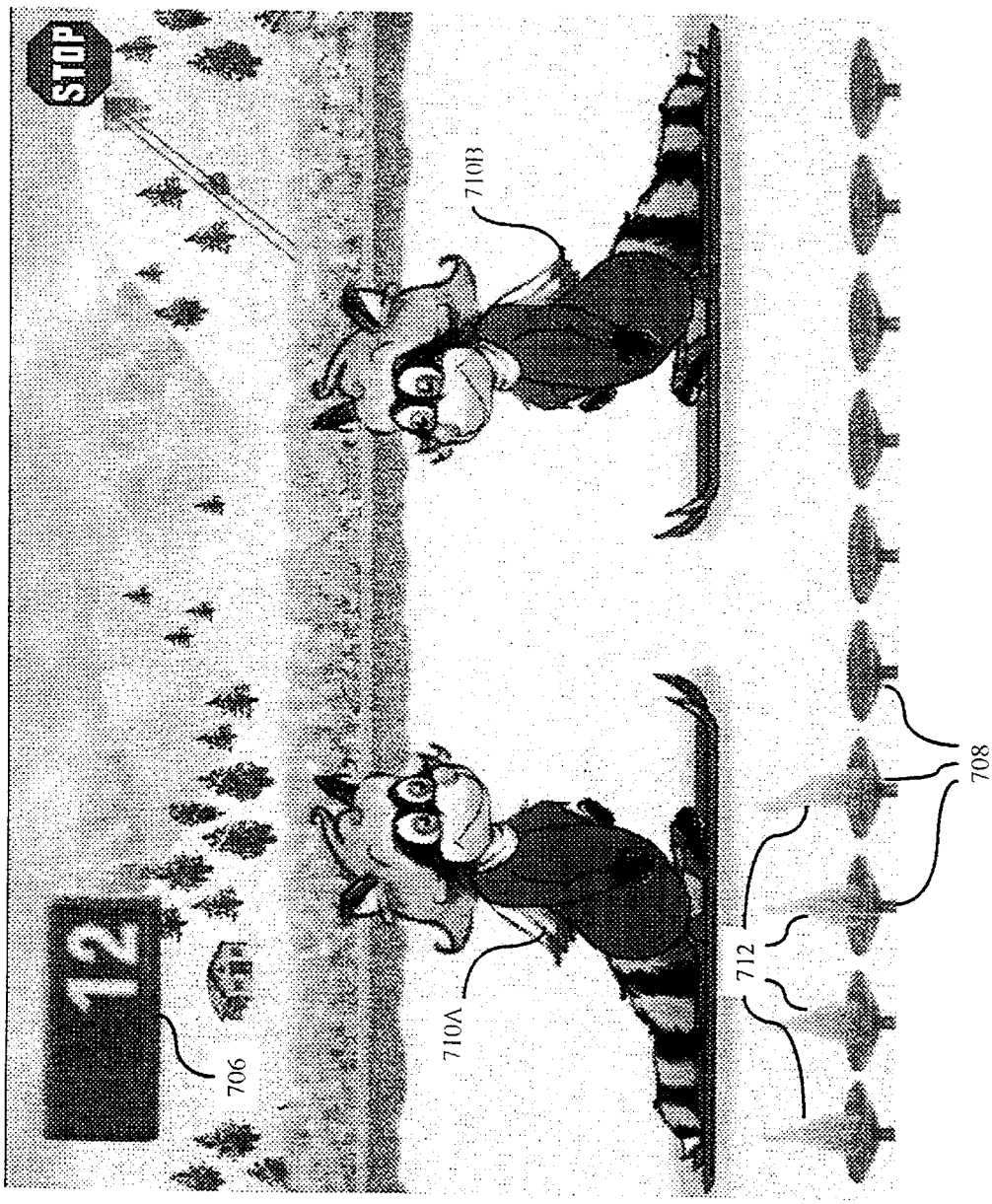
Figure 62:
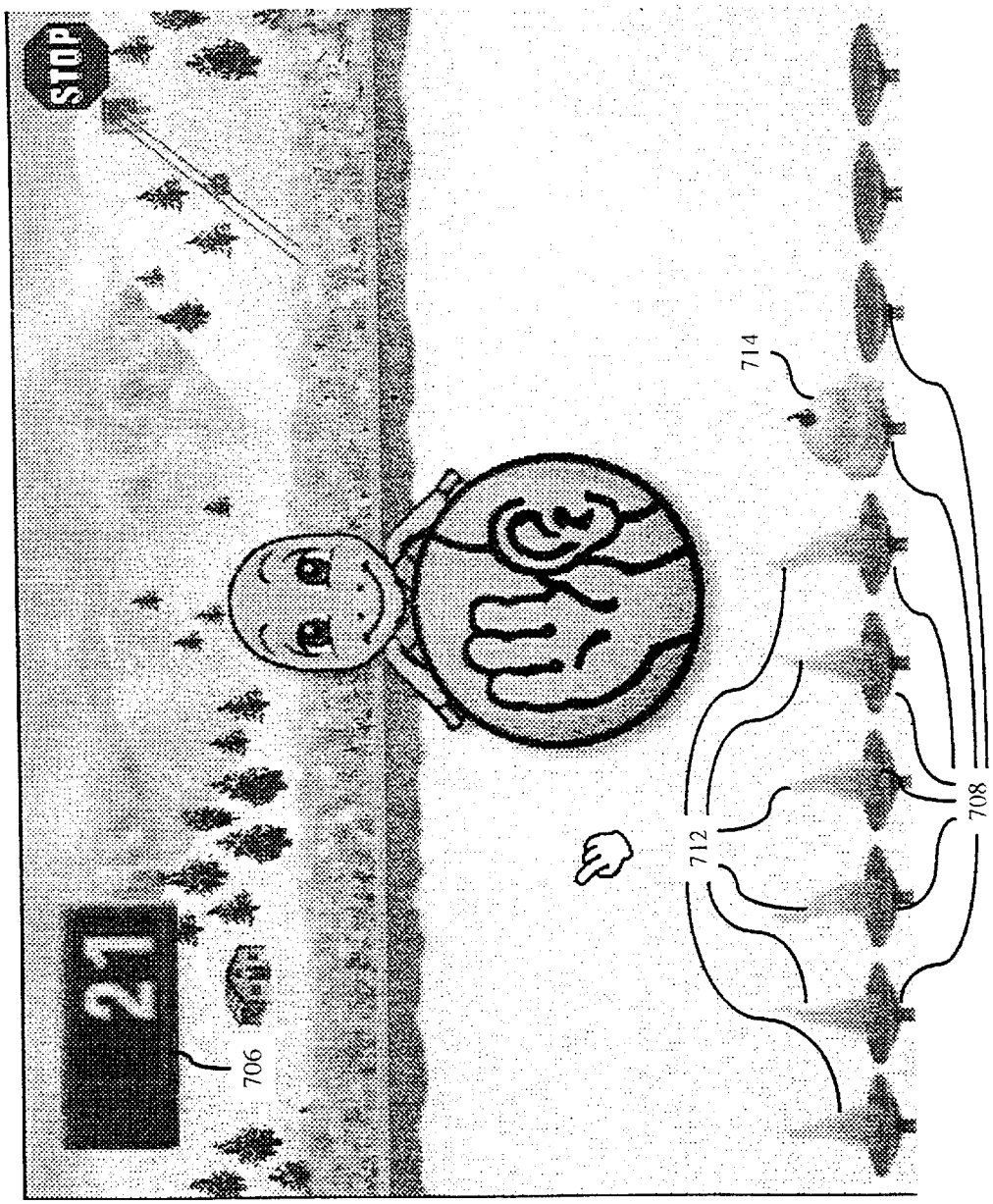
Figure 63:
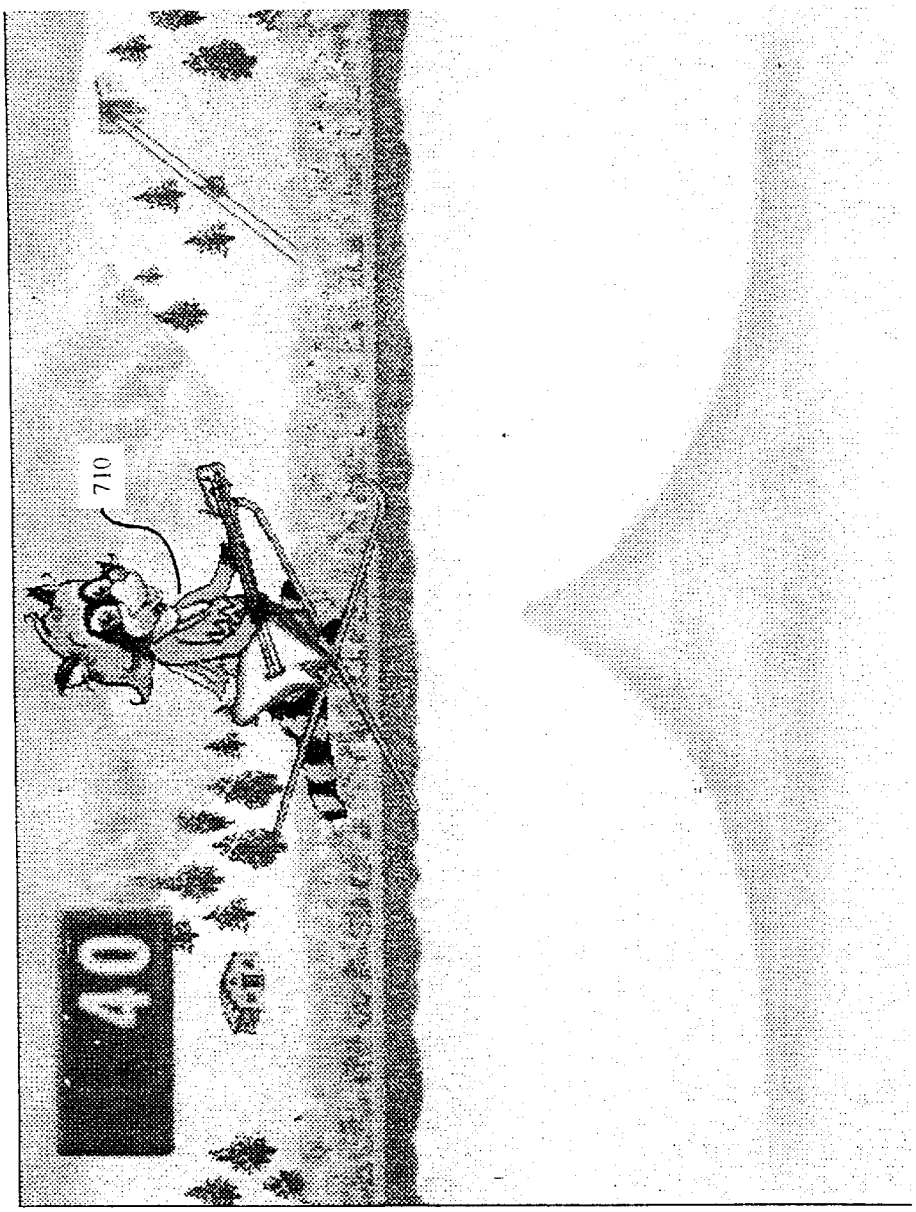
Figure 64:
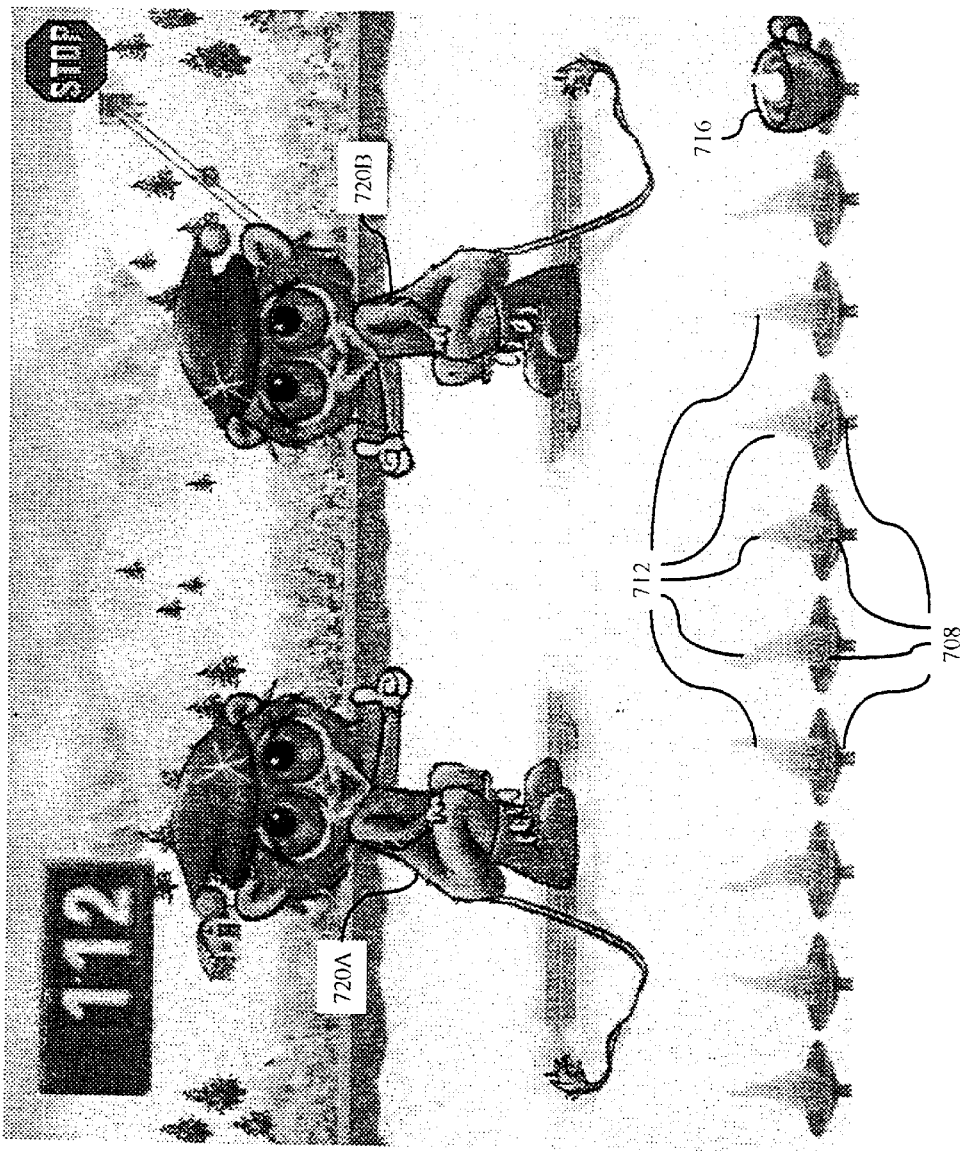
Figure 65:
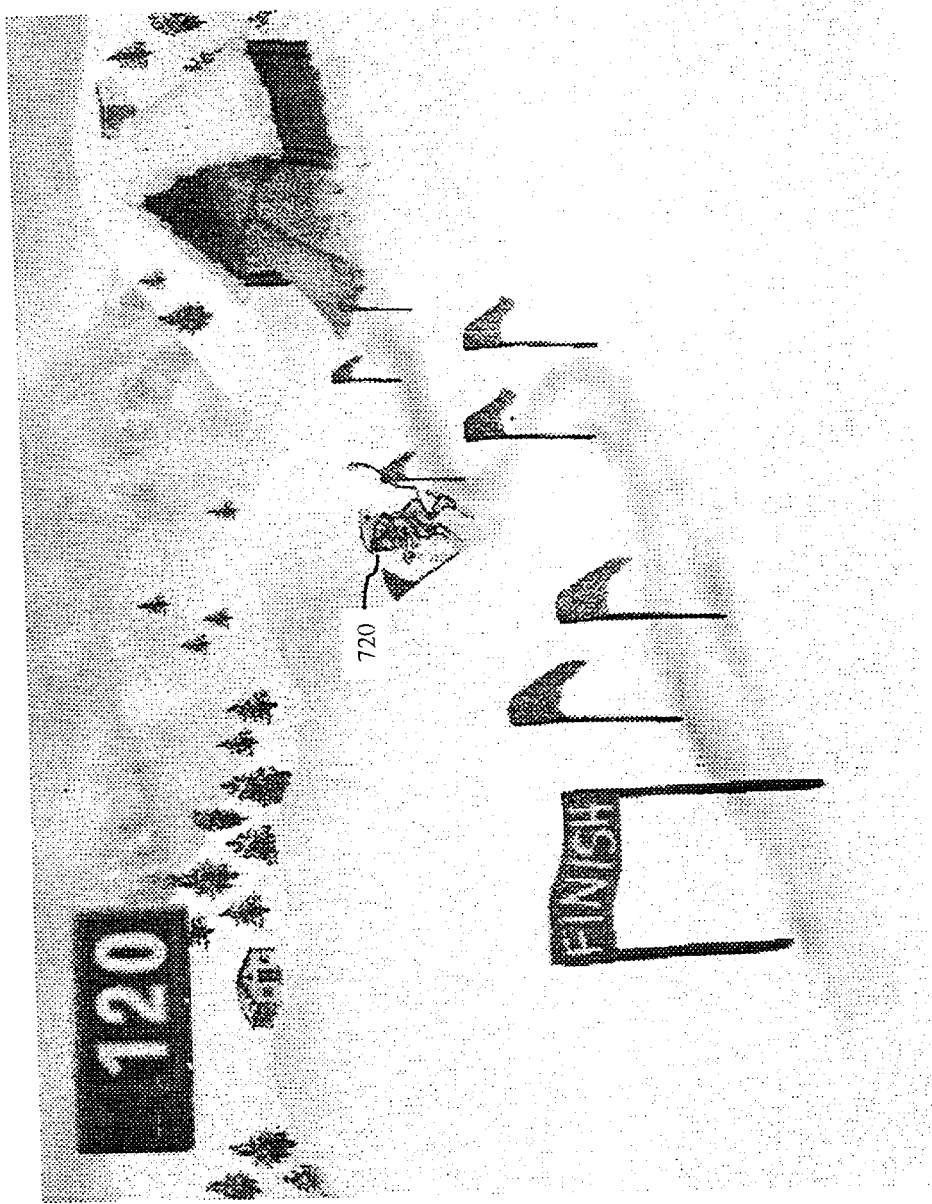
Figure 66:
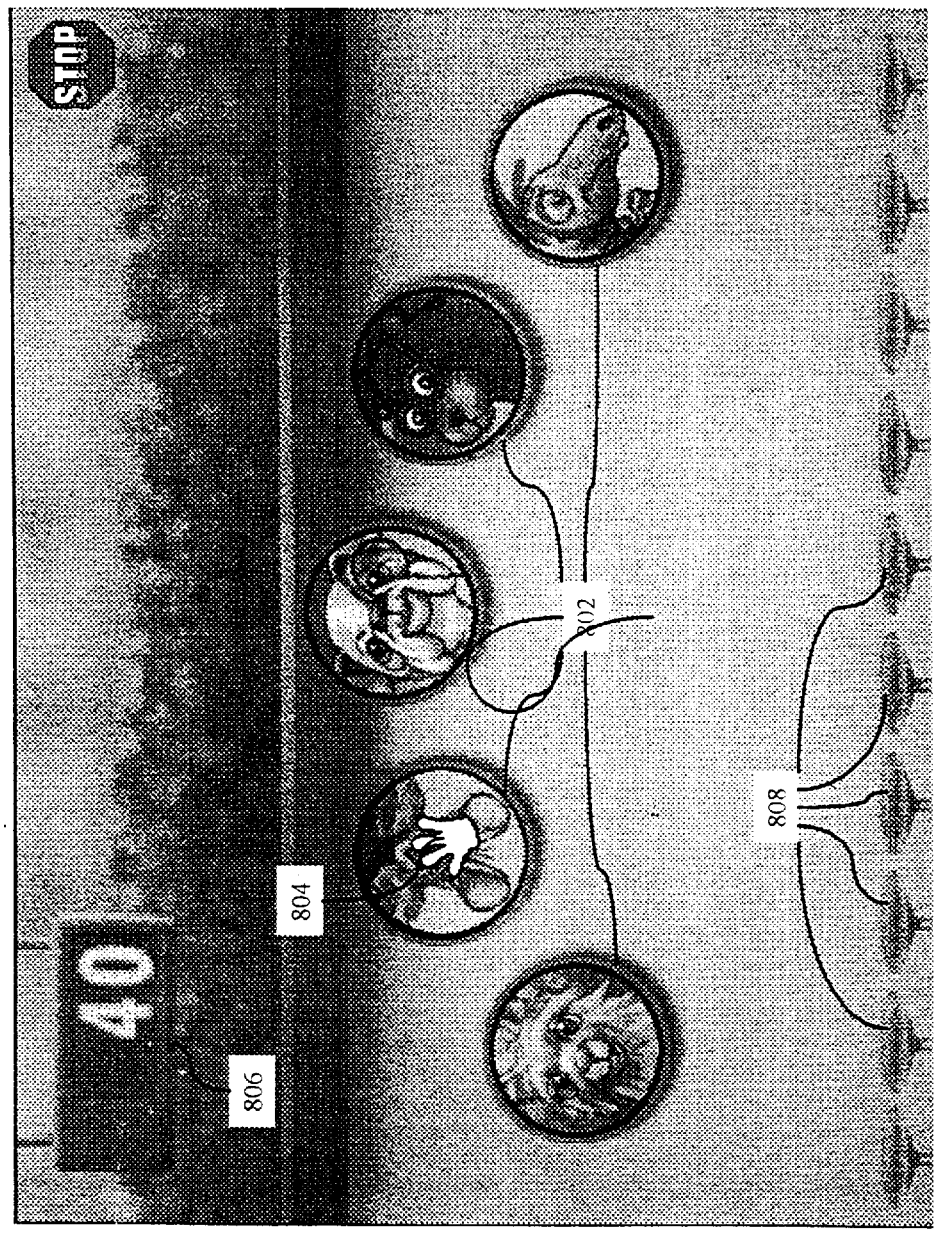

Phoneme Identification 1112 (FIG. 81) has a typical transaction time which is slightly greater than the typical transaction times of Circus Sequence 1104 and Phonic Match 1108. Therefore, if training exercise 1200 (FIG. 82) represents Phoneme Identification 1112, point increment field 1202 stores data indicating that three (3) points are awarded to the user for each correct response. Phoneme Identification 1112 represents the user's points accumulated during the current session in a point counter box 706 (FIG. 59).

Old MacDonald's Flying Farm 1102 has a typical transaction time which is greater than that of Phoneme Identification 1112. Accordingly, point increment field 1202 stores data indicating that four (4) points are awarded to the user for each correct response if training exercise 1200 represents Old MacDonald's Flying Farm 1102. Old MacDonald's Flying Farm 1102 represents the user's points accumulated during the current session in a point counter box 106 (FIG. 1).

Figure 49:
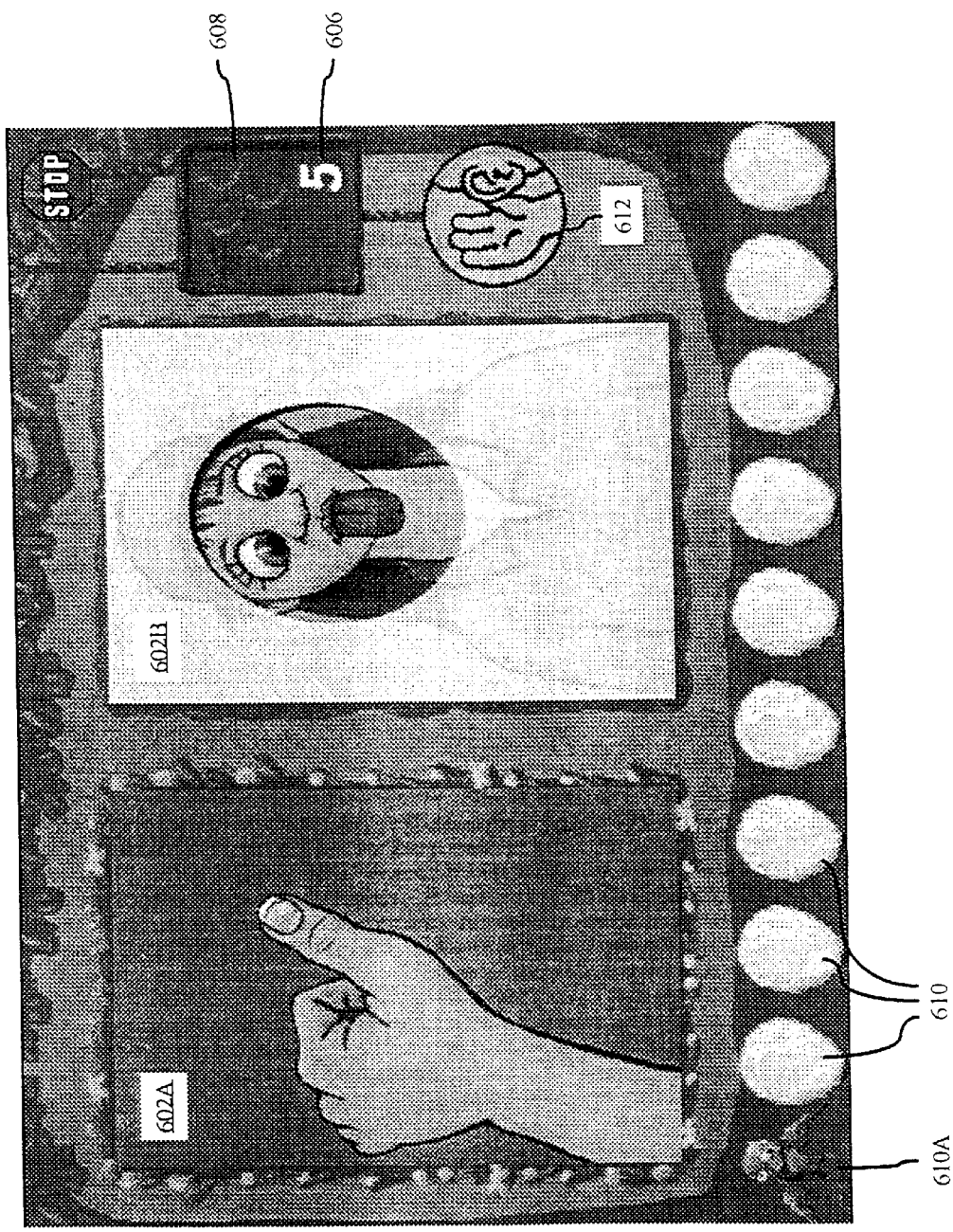

Phonic Words 1110 (FIG. 81) has a typical transaction time which is greater than the typical transaction time of Old. MacDonald's Flying Farm 1102 and less time than the typical transaction time of LCB 1114. Five (5) points are therefore awarded to the user for each correct response if training exercise 1200 (FIG. 82) represents Phonic Words 1110. Phonic Words 1110 represents the user's points accumulated during the current session in a point counter box 606 (FIG. 49).

Figure 35:
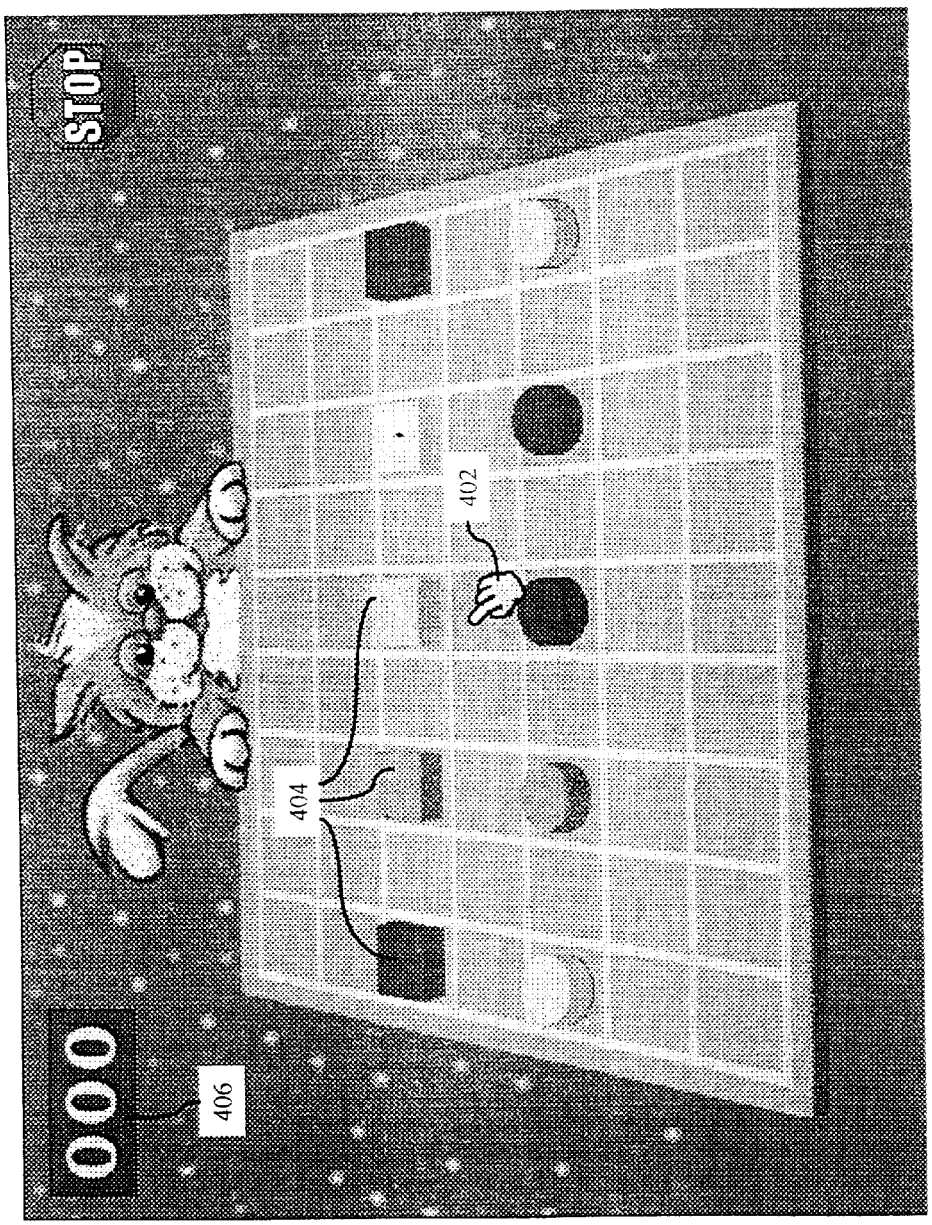
Figure 36:
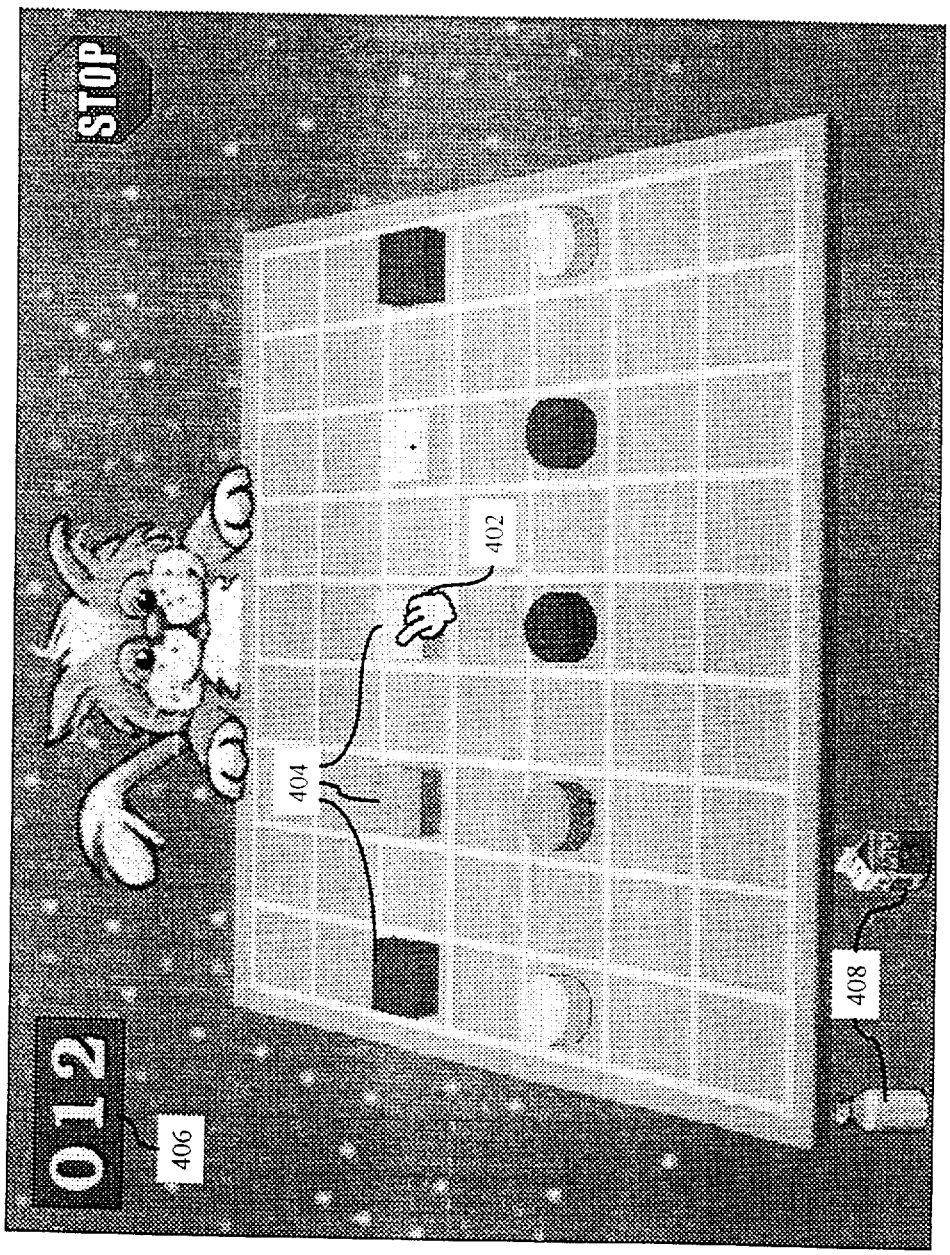
Figure 37:
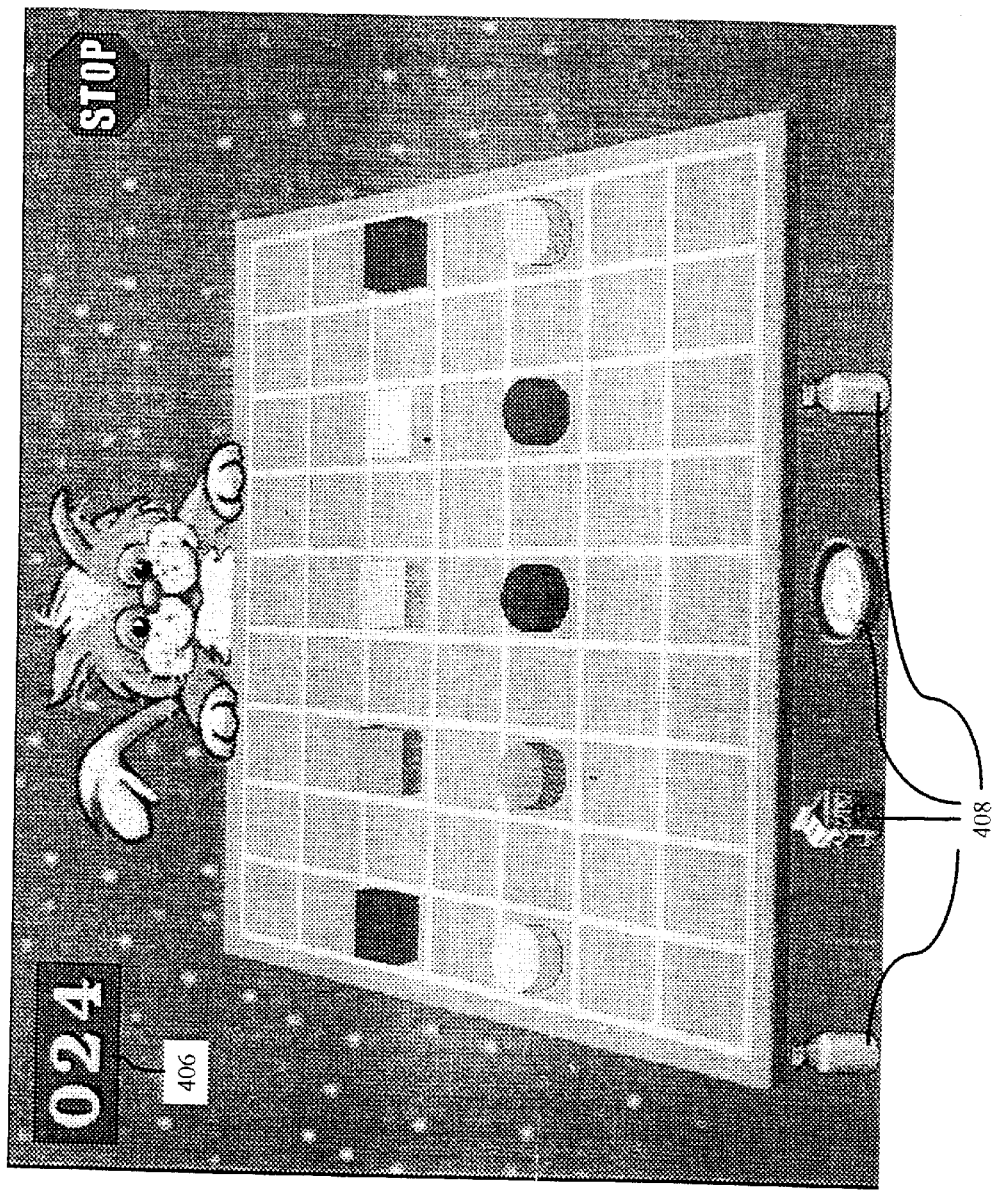
Figure 70:
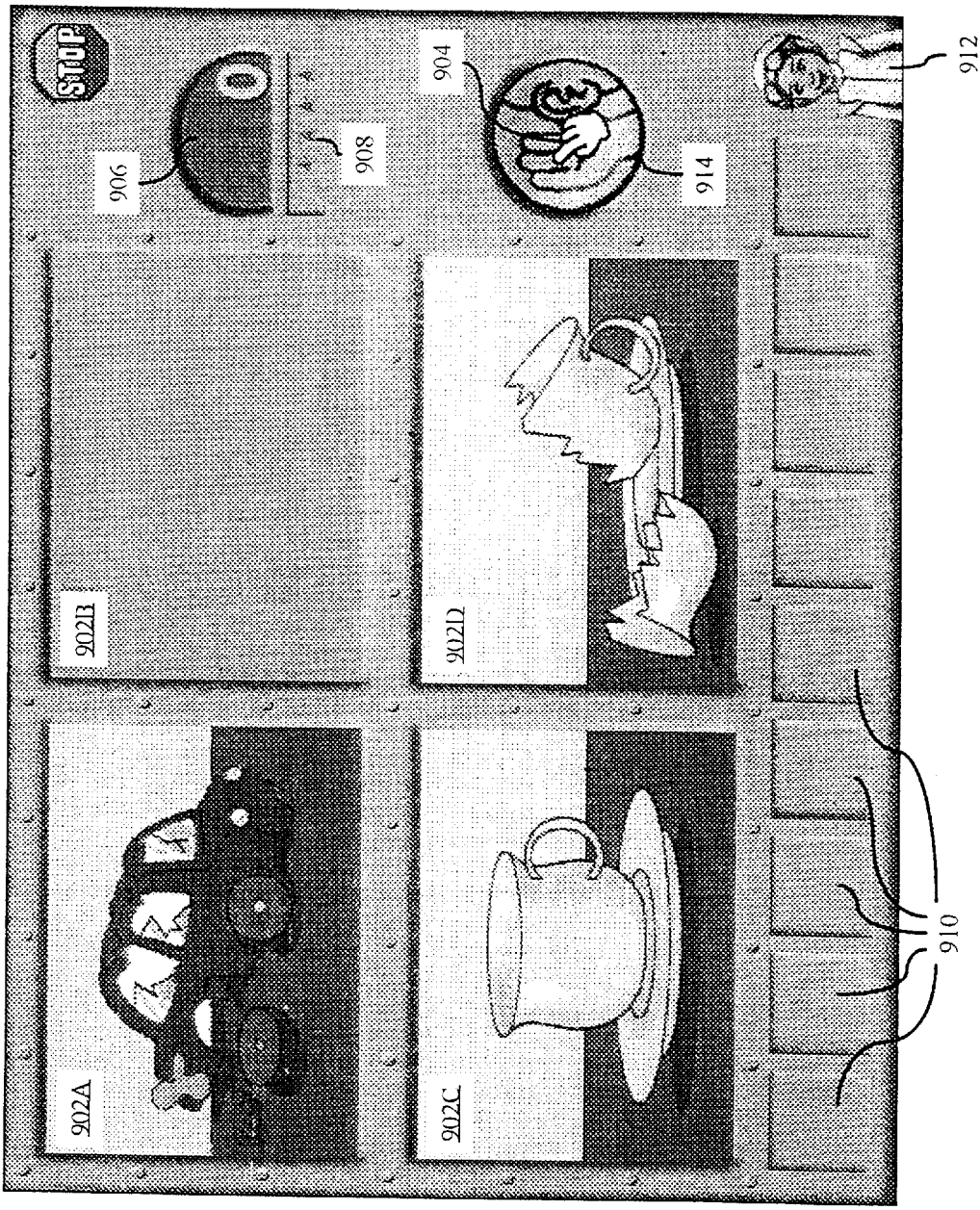
Figure 71:
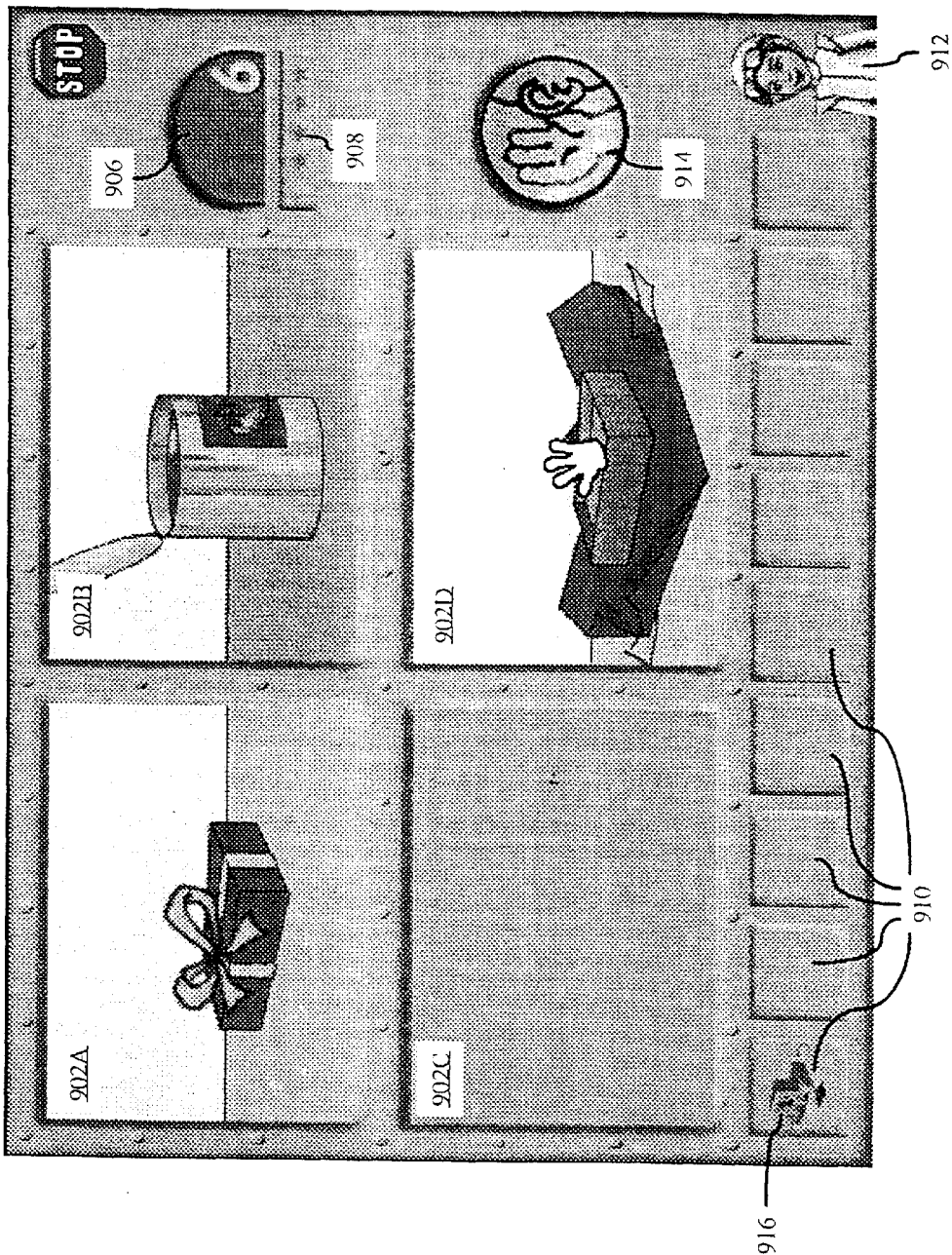

LCB 1114 (FIG. 81) and Block Commander 1106 generally have the greatest transaction times. Therefore, if training exercise 1200 (FIG. 82) represents LCB 1114 or Block Commander 1106, point increment field 1202 stores data indicating that six (6) points are awarded to the user for-each correct response. LCB 1114 represents the user's points accumulated during the current session in a point counter box 906 (FIG. 70). Similarly, Block Commander 1106 (FIG. 81) represents the user's points accumulated during the current session in a pointer counter box 406 (FIG. 35).

Thus, the user accumulates three (3) times as many points for each correct response in LCB 1114 (FIG. 81) as are accumulated for each correct response of Circus Sequence 1104. Such is appropriate since LCB 1114 requires approximately three (3) times as much time to present stimuli to the user and receive the user's response as does Circus Sequence 1104. Therefore, the number of points accumulated during play of each training exercise is normalized over time. In other words, playing each training exercise for a period of time with substantially equivalent levels of proficiency accumulates approximately equal amounts of points.

As described briefly above and more completely below, the user is periodically rewarded with an animation. Animation interval field 1204 (FIG. 82) stores data representing the number of correct responses required to earn a reward animation. The number of correct responses is referred to herein as the animation interval and, like the point increment, can be related to the transaction time. In the case of the animation interval, the relation is generally an inverse relation in that a larger animation interval corresponds to a smaller transaction time and vice versa.

When the user earns a reward animation through correctly responding to stimuli the number of times represented in animation interval field 1204, the user is also awarded a number of bonus points. The number of bonus points awarded at each animation interval is represented by data stored in bonus field 1206. The bonus points generally serve two purposes. First, the bonus points provide a relatively short term, achievable, and desirable goal for the user. Second, the bonus points can be adjusted to further equalize point accumulation among the respective training exercises over time. Various combinations of animation intervals and bonus points can effect accumulation at non-integer rates per correct response by the user to give added flexibility in equalizing point accumulation among training exercises 1102–1114 while maintaining the simplicity of integer point values and relatively small point increments which are relatively easily grasped and appreciated by users. For example, an animation interval of twenty (20) correct responses and a bonus of ten (10) points per reward animation in effect results in one-half point per correct response by the user over time.

Thus, point increments, animation intervals, and bonus points as represented in point increment field 1202, animation interval field 1204, and bonus field 1206, respectively, can be used to equalize point accumulation over time among the various training exercises. The following table sets out the point increments, animation intervals, and bonuses of the various training exercises of the illustrative embodiment.

TABLE A

| Training exercise | Point Increment | Animation Interval | Bonus | Points per Reward Animation | Effective Point Incr't |
|---|---|---|---|---|---|
| Old MacDonald's Flying Farm | 4 | 10 | 10 | 50 | 5 |
| Block Commander | 6 | 5 | 0 | 30 | 6 |
| Circus Sequence | 2 | 10 | 10 | 30 | 3 |
| Phonic Match | 2 | varying | varying | varying | varying |
| Phonic Words | 5 | 10 | 10 | 60 | 6 |
| Phoneme Identification | 3 | 10 | 10 | 40 | 4 |
| Language Comprehension Builder | 6 | 9 | 10 | 64 | 7.11111 |

The point increments, animation intervals, and bonuses shown in Table A provide a relatively standardized token economy such that users generally do not prefer one training exercise over another. Statistics regarding the amount of time users spend playing each of the training exercises can be collected in the manner described in the Compliance Monitoring Application, which description is incorporated herein by reference, and disparity in the amount of time spent by users using each training exercise can be detected. Upon such detection, the values shown in Table A can be adjusted so as to remove any disparity in the time spent using the respective training exercises by users.

Progress Indicators

As described briefly above, the user is rewarded periodically with a reward animation. Each of the training exercises described above provides a progress indicator to convey to the user information regarding the progress toward such a reward animation. Such progress indicators are best described by way of example.

Figure 5:
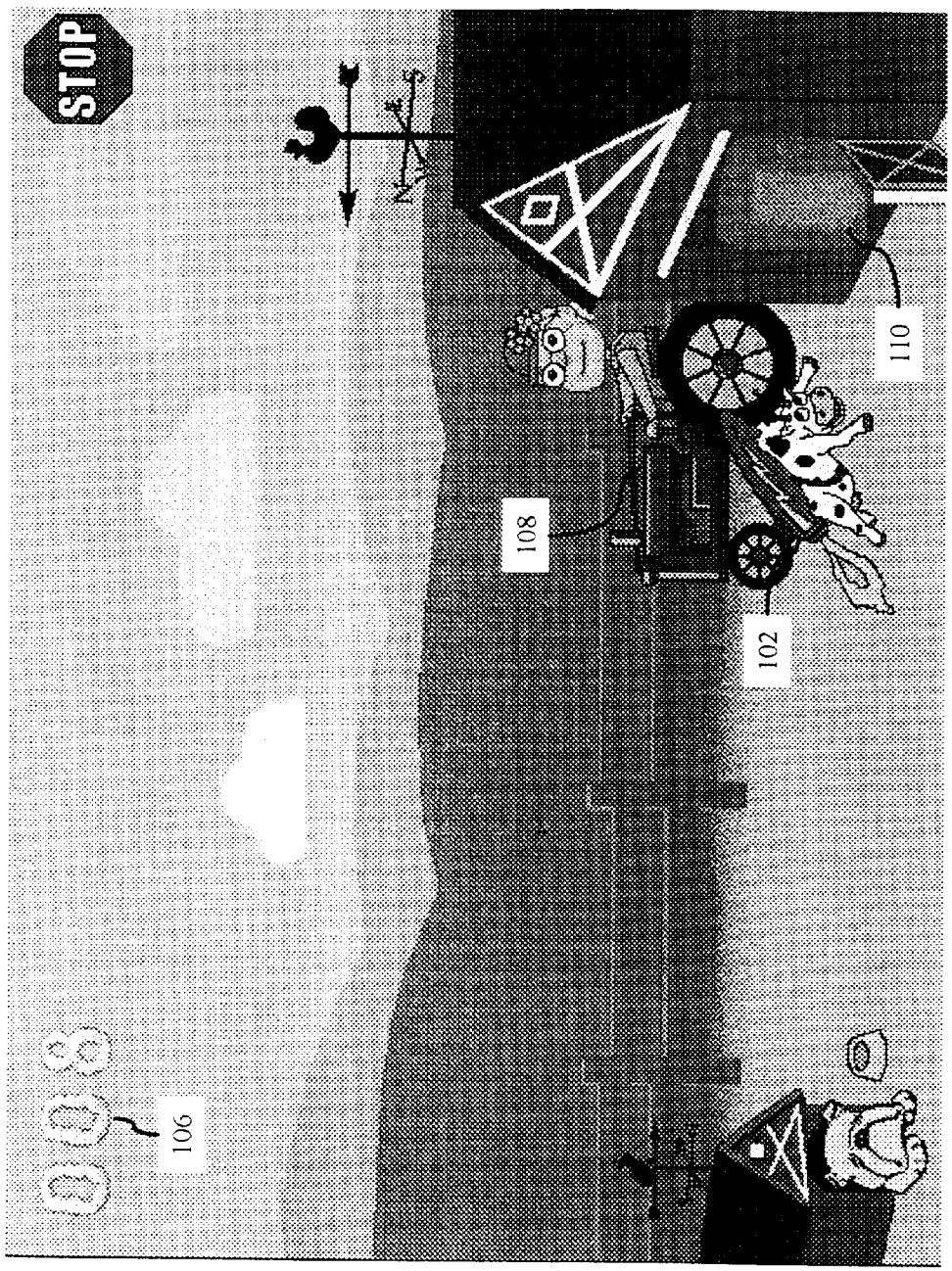
Figure 6:
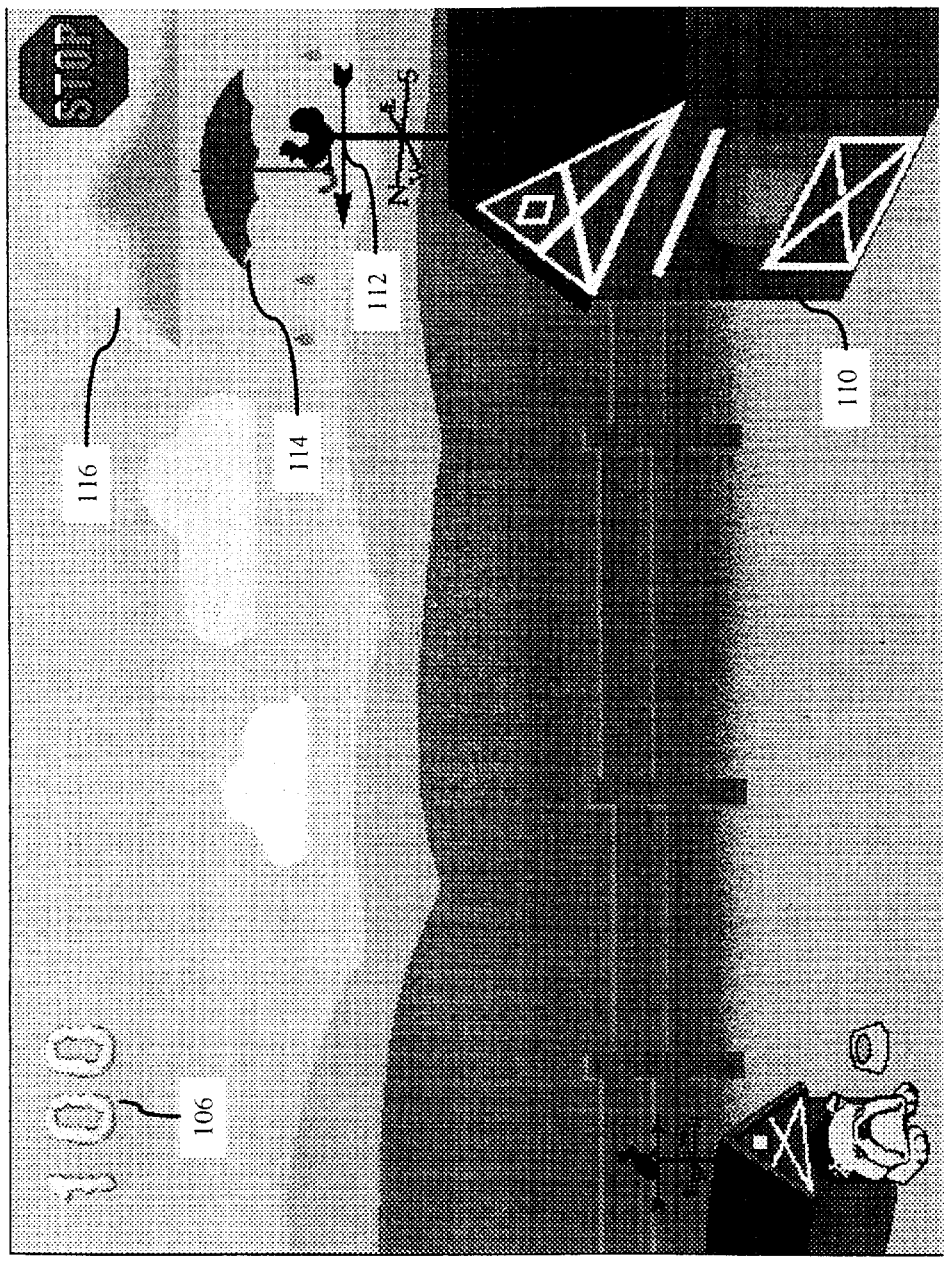
Figure 7:
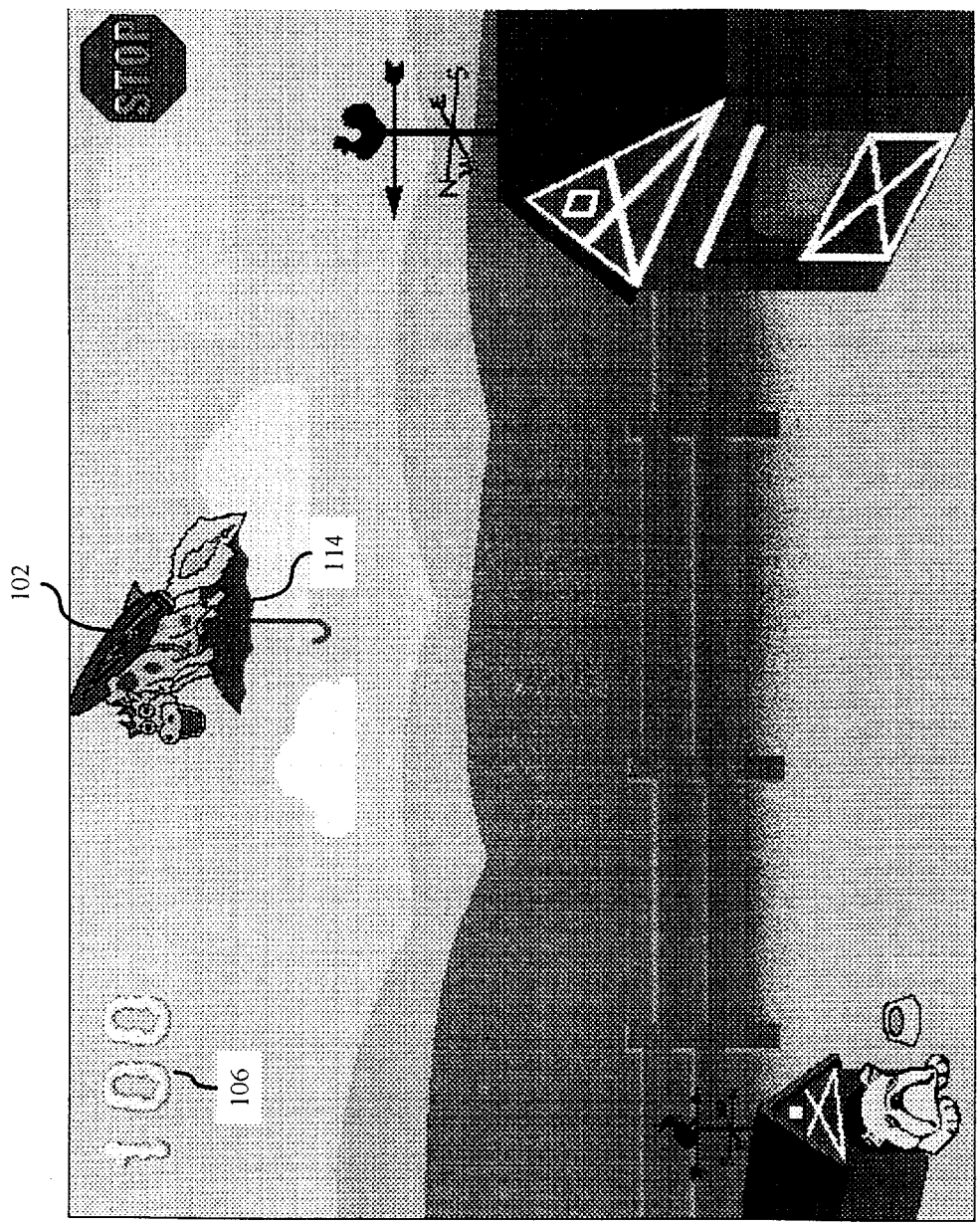
Figure 8:
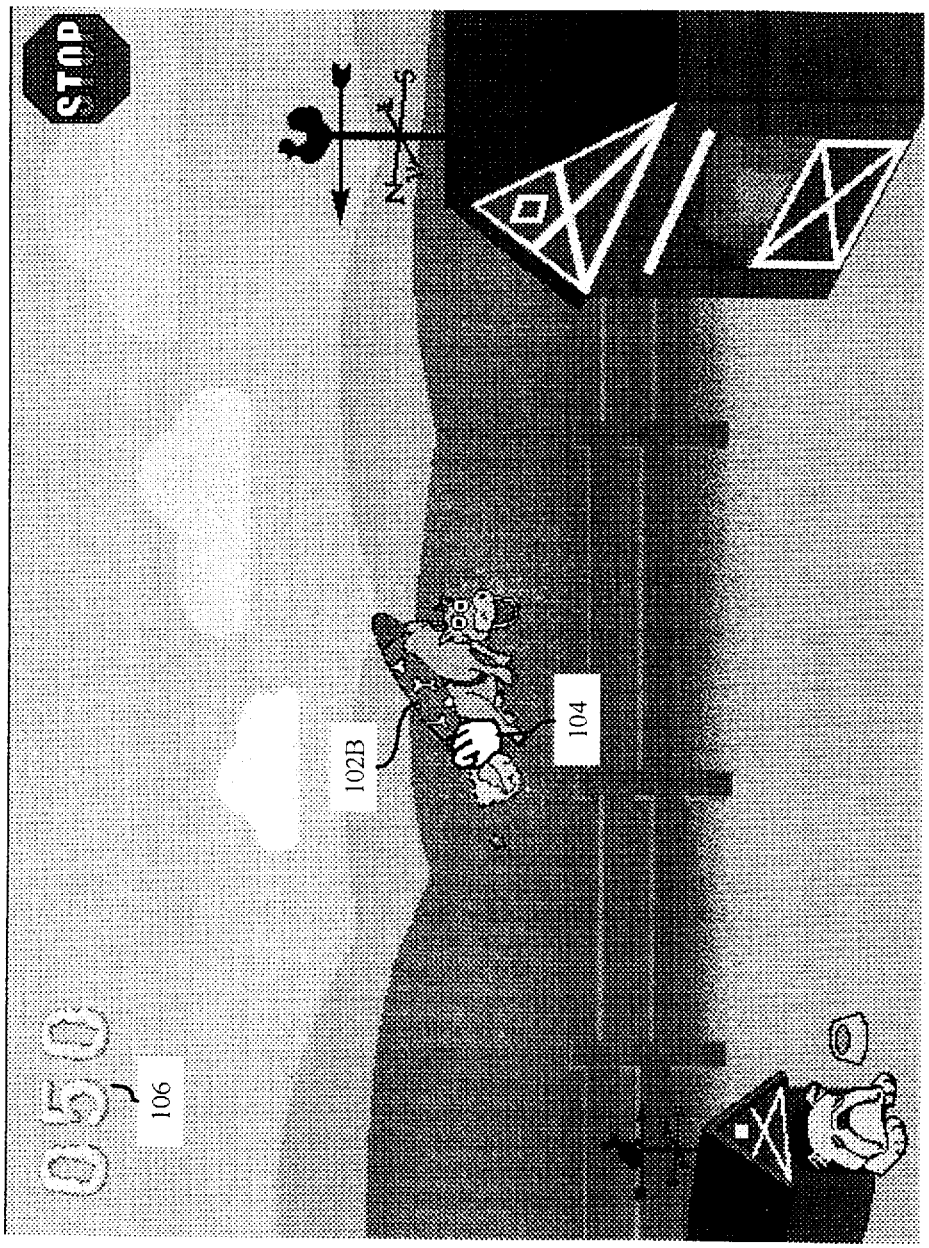
Figure 9:
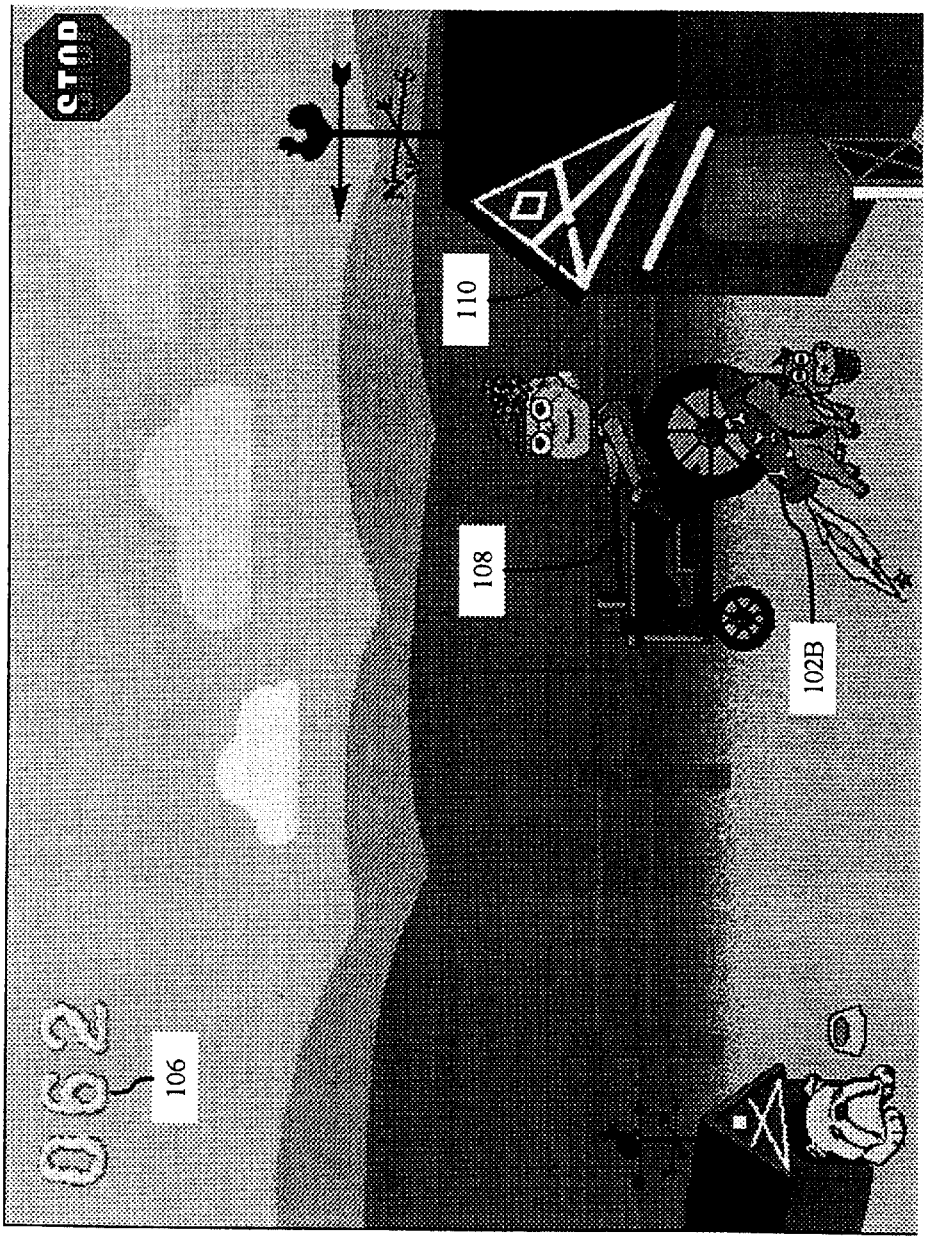

Old MacDonald's Flying Farm 1102 includes a progress indicator 108 (FIG. 3) which is in the form of a grandmother driving a tractor across a farm scene. For each correct response given by the user in response to a detected change in the repeated phoneme, progress indicator 108 moves a predetermined offset increment from right to left. FIG. 5 shows progress indicator 108 moved further to the left as a result of one or more additional correct responses. Progress indicator 108 is an integral component of the scene in which Old MacDonald's Flying Farm takes place. Specifically the grandmother-driven tractor is an integral component of the farm depicted in FIGS. 1–16.

In addition, progress indicator 108 is animated. Specifically, a brief progress animation gives both the grandmother and the tractor motion in moving from one position to the next. The motion is relatively smooth and provides an appearance of progress. By contrast, simply removing a progress indicator from a previous position and re-drawing the progress indicator at a next position gives an appearance of an instantaneous change of state rather than a smooth progression. The progress animation is entertaining and pleasing, providing a continuous rate reinforcement mechanism. In other words, each correct response is met with immediate feedback in the form of a brief animation moving progress indicator 108 and the feedback is desirable to the user, motivating the user to earn another small progress animation. In addition, correct responses elicit an immediate, pleasant sound such as a "ding." Conversely, an incorrect response elicits a less pleasing sound, such as a "thunk," to indicate to the user that a response was received but the response was not the response sought by the training exercise.

When the user has earned a reward animation by responding correctly a number of times represented in animation interval field 1204 (FIG. 82), progress indicator 108 (FIG. 5) has moved to its left-most position and the user has achieved a short-term goal. Accordingly, a reward animation is presented to the user. For example, a cloud 116 (FIG. 6) darkens, a weathervane 112 pulls out an umbrella 114 and raindrops fall from cloud 116. The rain then stops and flying object 102 (FIG. 7), which is represented as a cow with a rocket pack, flies by and takes umbrella 114 off the scene.

Figure 19:
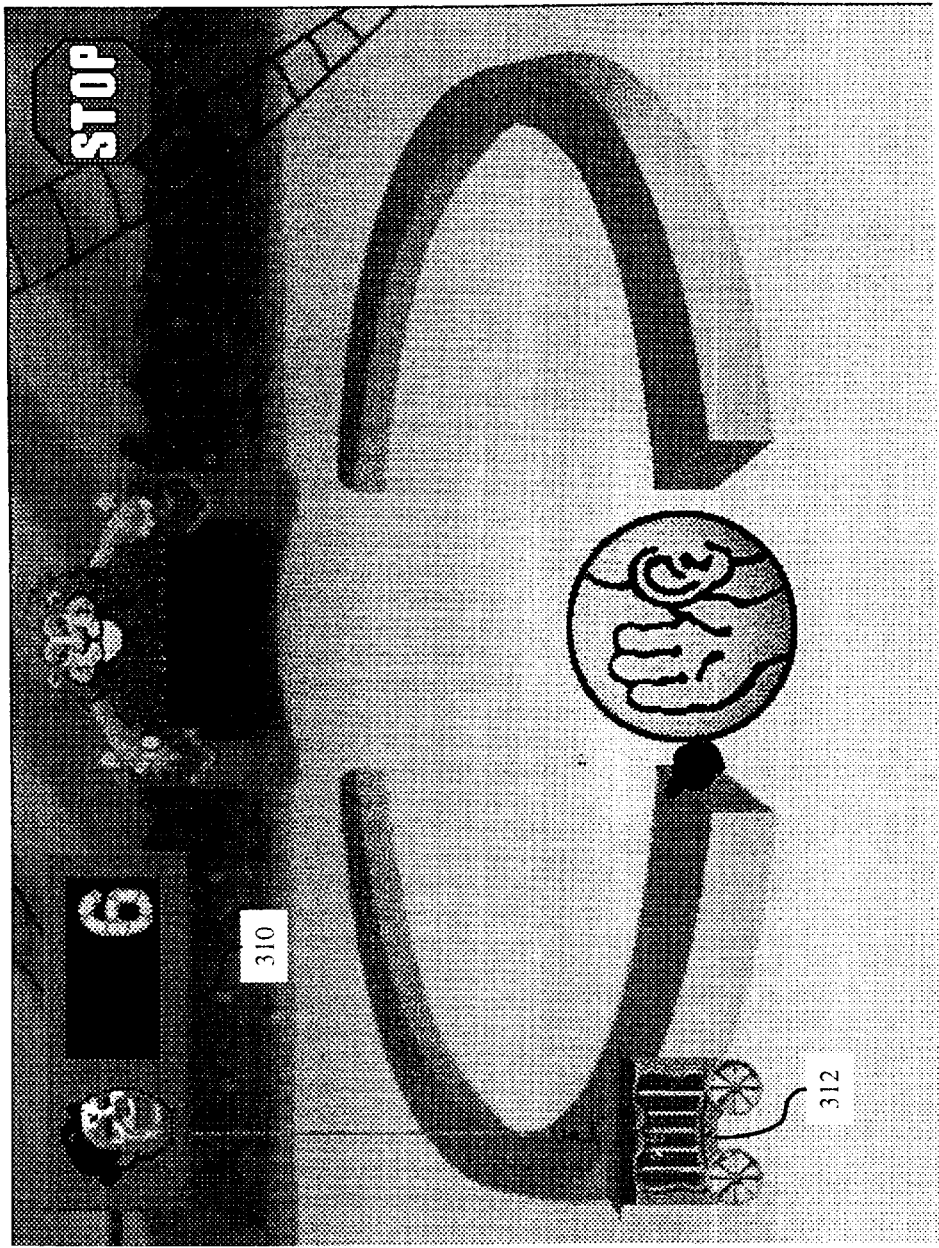
Figure 20:
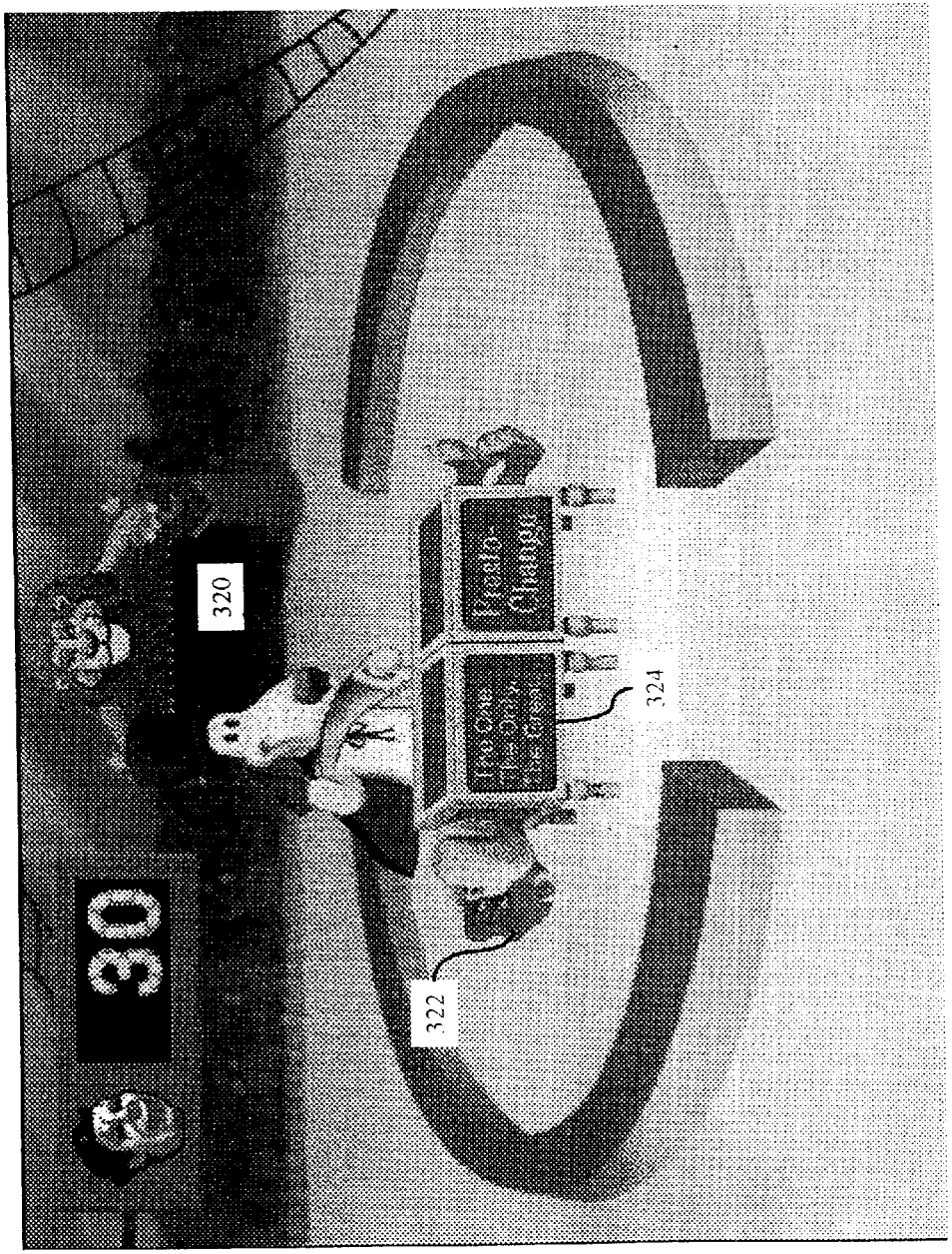
Figure 21:
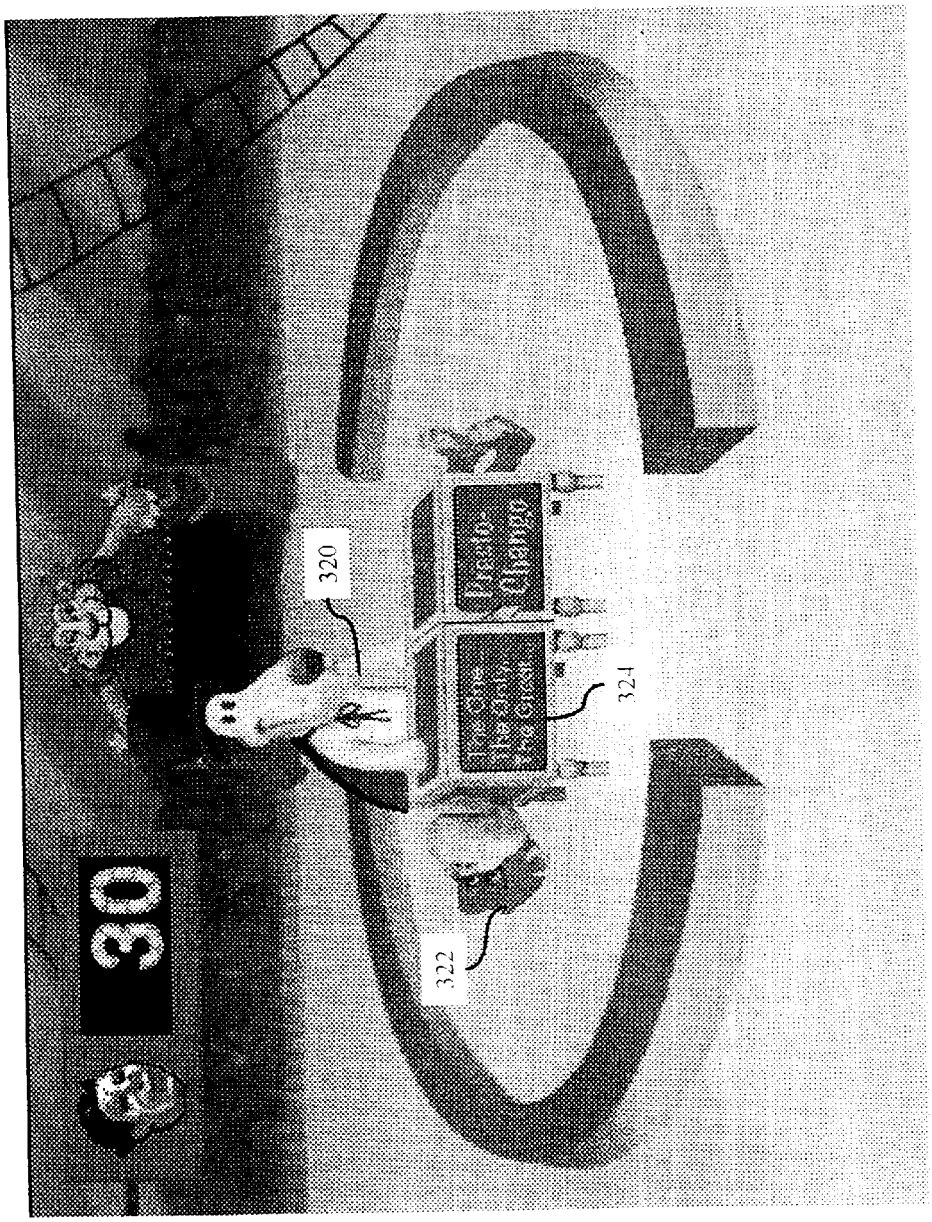
Figure 22:
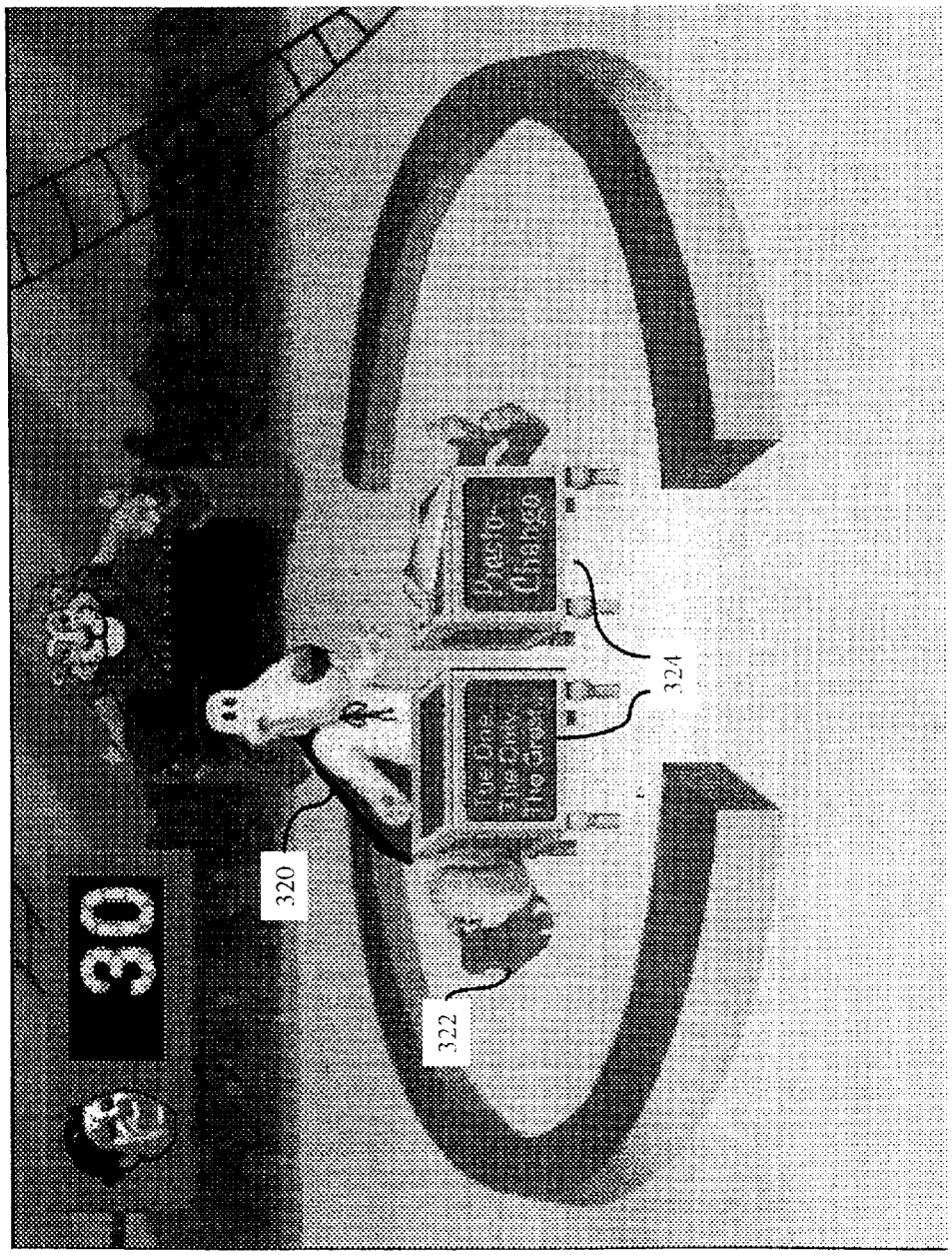
Figure 23:
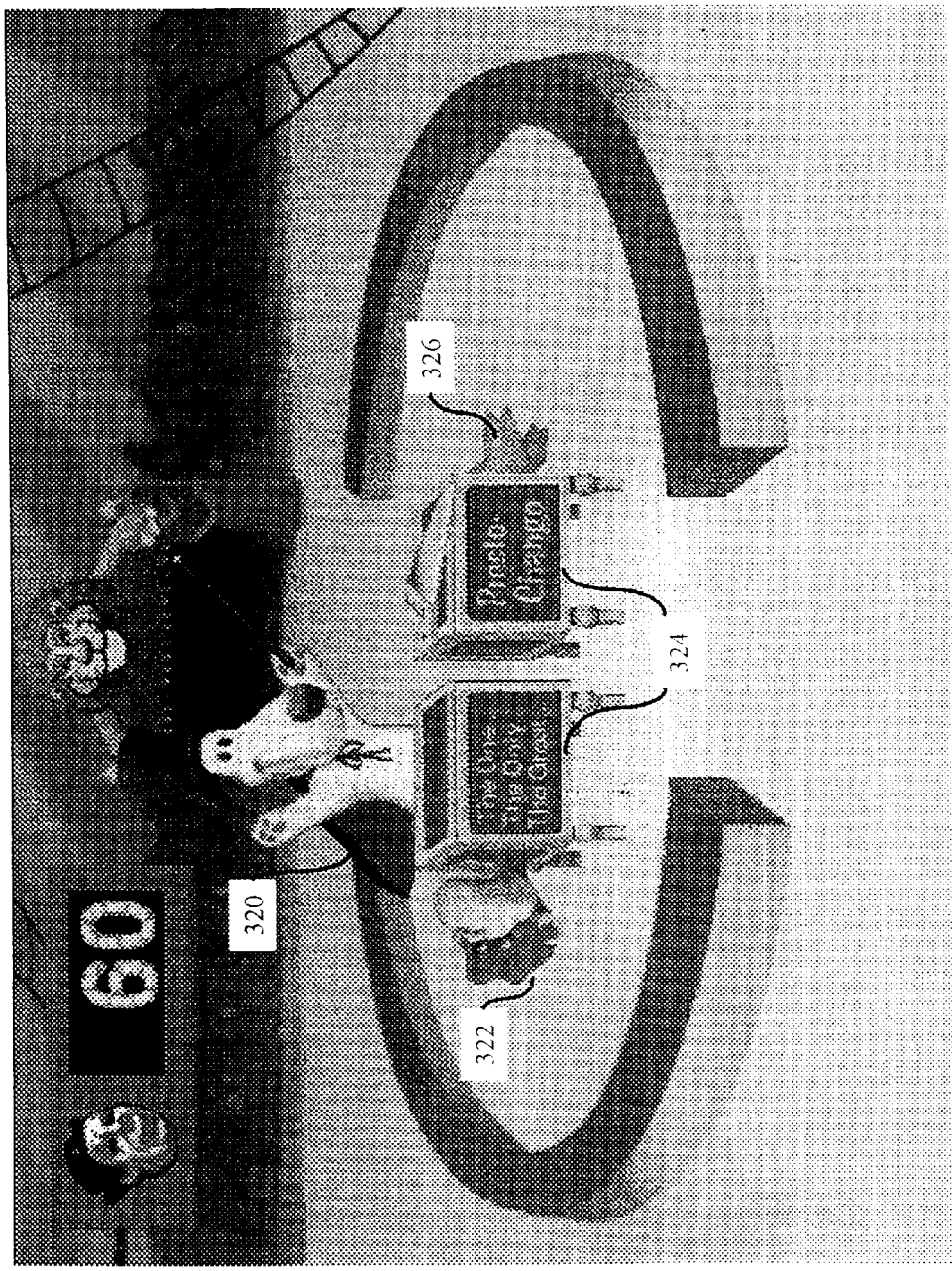
Figure 24:
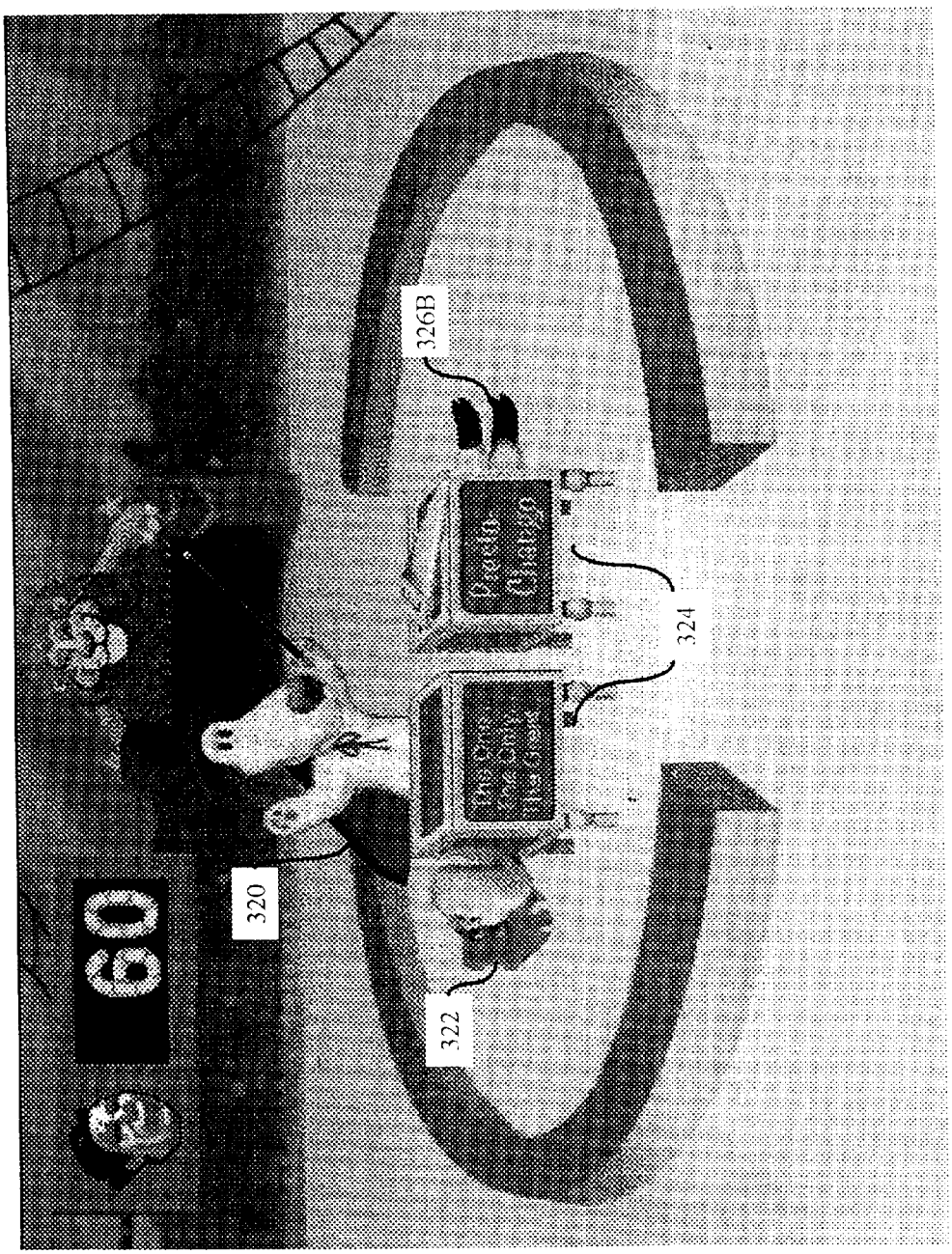
Figure 25:
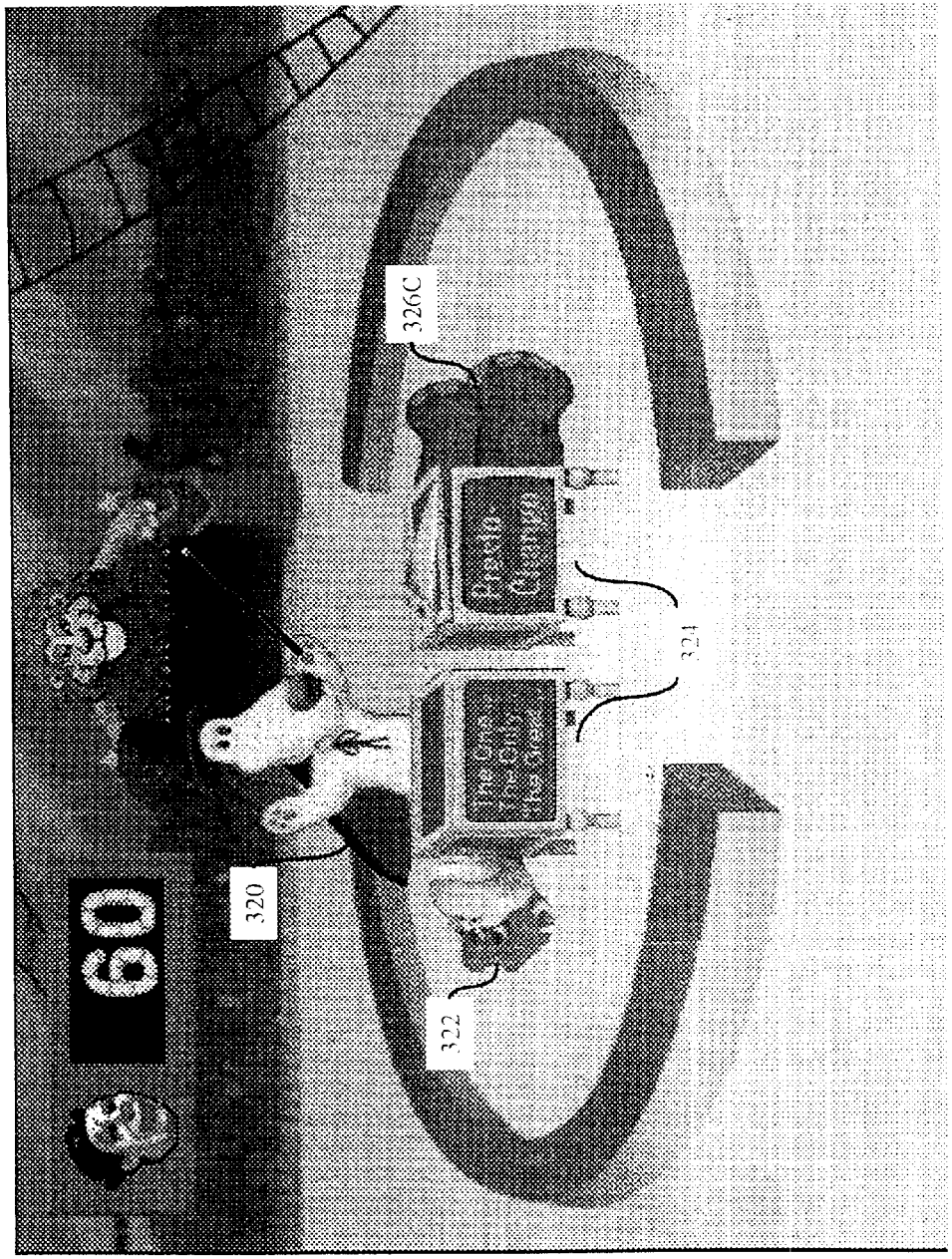
Figure 26:
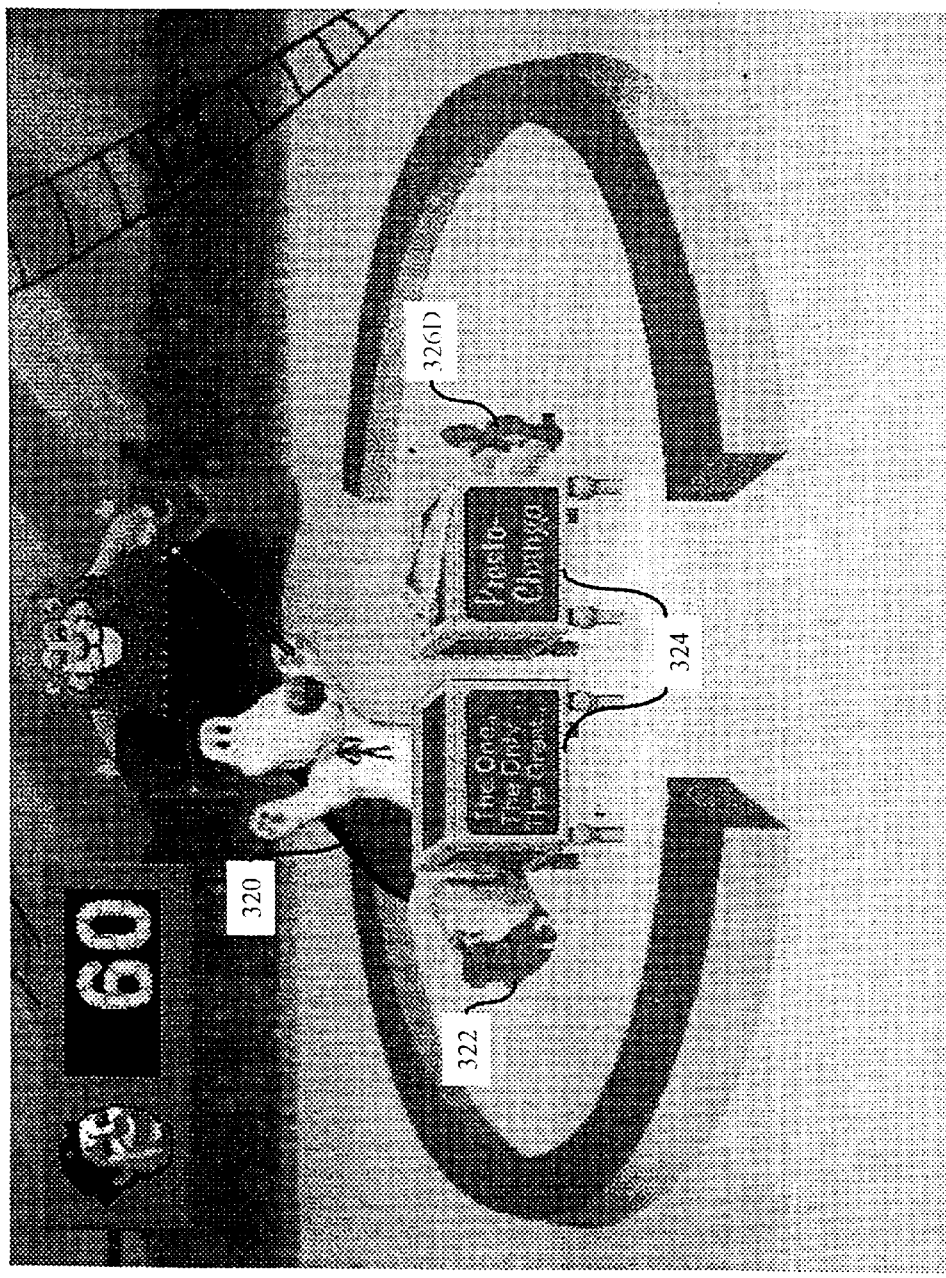

Circus Sequence 1104 (FIG. 81) includes a progress indicator 312 (FIG. 17) which is raised from the bottom of the circus scene to a top position by an increment with each correct response by the user. Progress indicator 312 is represented as a wheeled circus cage raised by a rope and is animated in that eyes move back and forth as the cage is raised from one position to the next. FIG. 19 shows progress indicator 312 in a slightly raised position resulting from one or more correct responses by the user. When the user responds correctly a number of times represented in animation interval field 1204 (FIG. 82), the user is rewarded with a reward animation as shown in FIGS. 20–22. This particular animation is described more completely below.

After each animation, the progress indicator of Circus Sequence 1104 changes to provide variety to the user. Other progress indicators include a woman on a trapeze, a man climbing a rope, a hippopotamus raised by a hot-air balloon (progress indicator 312B in FIG. 30), and a merry-go-round (progress indicator 312C in FIG. 32).

Phonic Match 1108 includes a progress indicator 508 (FIG. 41) which is represented as a roadrunner skating with in-line skates and wearing a top hat. Progress indicator 508 is perpetually animated in that progress indicator 508 appears to be skating without pausing between user selection of individual ones of panes 504. Each time a matching pair of panes 504 is correctly identified by the user, progress indicator 508 moves one position lower toward a sidewalk on which progress indicator 508 ultimately skates.

Figure 83:
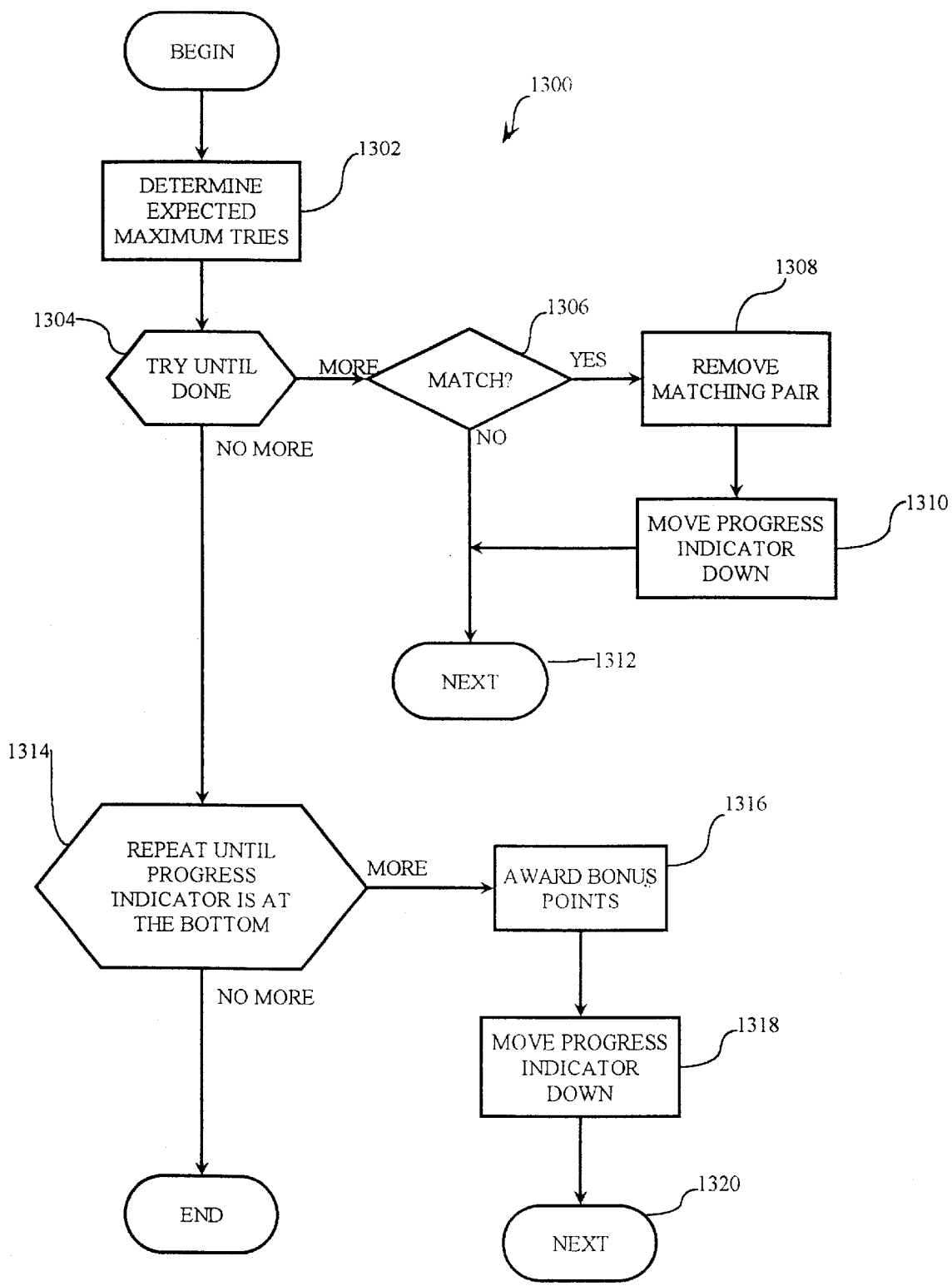
FIG. 83 is a logic flow diagram of the progress indication and bonus point determination of a training exercise in accordance with the present invention.

Phonic Match 1108 operates slightly different from the other training exercises described herein in that the animation interval is variable. Phonic Match 1108 determines a maximum number of tries the user should need to correctly identify all matching pairs of panes 504 and awards the user with bonus points for using fewer tries to correctly identify all matching pairs. The processing of Phonic Match is illustrated as logic flow diagram 1300 (FIG. 83).

In step 1302, Phonic Match 1108 (FIG. 81) determines the expected maximum number of tries. The expected maximum number of tries depends on the number of panes 504 (FIG. 41) and an estimation of the memory capacity of the user. In one embodiment, Phonic Match 1108 (FIG. 81) empirically determines the mean and standard deviation of the number of tries required to correctly identify all matching pairs of panes 504 (FIG. 41) and sets the expected maximum number of tries as the mean number of tries plus one standard deviation. Phonic Match 1108 makes such an empirical determination by assuming the user can remember the phonemes of two (2) of panes 504 at any one time and randomly trying individual ones of panes 504, using the simulated memory, and counting the number of tries to correctly identify all matching pairs of panes 504. Through repeated simulations of this type, Phone Match 1108 can empirically determine an estimated mean and standard deviation. While, in this illustrative embodiment, simulated trying assumes a memory of two (2) of panes 504, other assumptions can be made with respect to the user's memory capacity. For example, assuming a memory of one or even zero can be used to train memory impaired individuals.

In step 1304 (FIG. 83), Phonic Match 1108 (FIG. 81) repeatedly receives a try in the form of signals from the user identifying a selected one of panes 504 (FIG. 41). In test step 1306 (FIG. 83), Phonic Match determines with the try correctly identifies a matching pair of panes 504 (FIG. 41), i.e., whether the identified pane matches the most recently identified pane. If not, Phonic Match 1108 (FIG. 81) waits for the next try. If so, Phonic match 1108 removes the matching pair from the display in step 1308 (FIG. 83) and moves progress indicator 508 (FIG. 41) down one position in step 1310 (FIG. 83). The total number of positions of progress indicator 508 (FIG. 41) is equal to the expected maximum number of tries determined in step 1302 (FIG. 83). FIG. 42 shows that a matching pair of panes 504 have been removed and progress indicator 508 has been lowered one or more positions. After step 1310 (FIG. 83), Phonic Match 1108 (FIG. 81) waits for the next try by the user.

Figure 44:
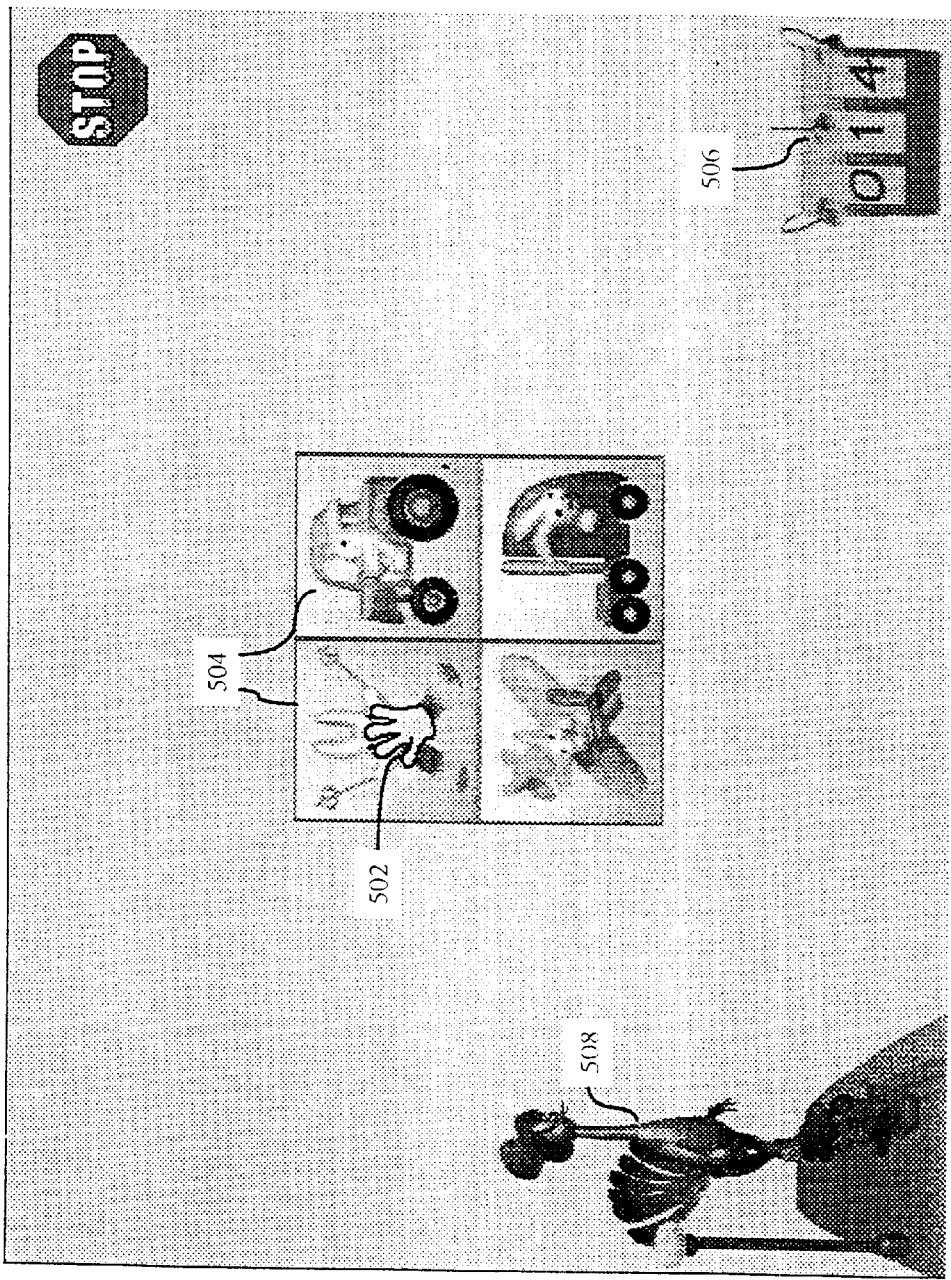

When all matching pairs have been correctly identified by the user, processing transfers to step 1314 (FIG. 83) in which steps 1316 and 1318 are performed repeatedly until position indicator 508 (FIG. 42) is positioned at the bottom. In step 1316 (FIG. 83), the user is awarded a number of bonus points, and, in step 1318, position indicator 508 (FIG. 42) is lowered one position. Therefore, the amount of bonus points awarded to the user is proportional to the number of tries less than the expected maximum the user required to correctly identify all matching pairs of panes 504. If position indicator 508 is already at the bottom before step 1314 (FIG. 83), i.e., before the user correctly identifies all matching pairs of panes 504 as shown in FIG. 44, no bonus points are awarded to the user. Accordingly, the user has a strong incentive to correctly identify all matching pairs of panes 504 in as few tries as possible.

Figure 38:
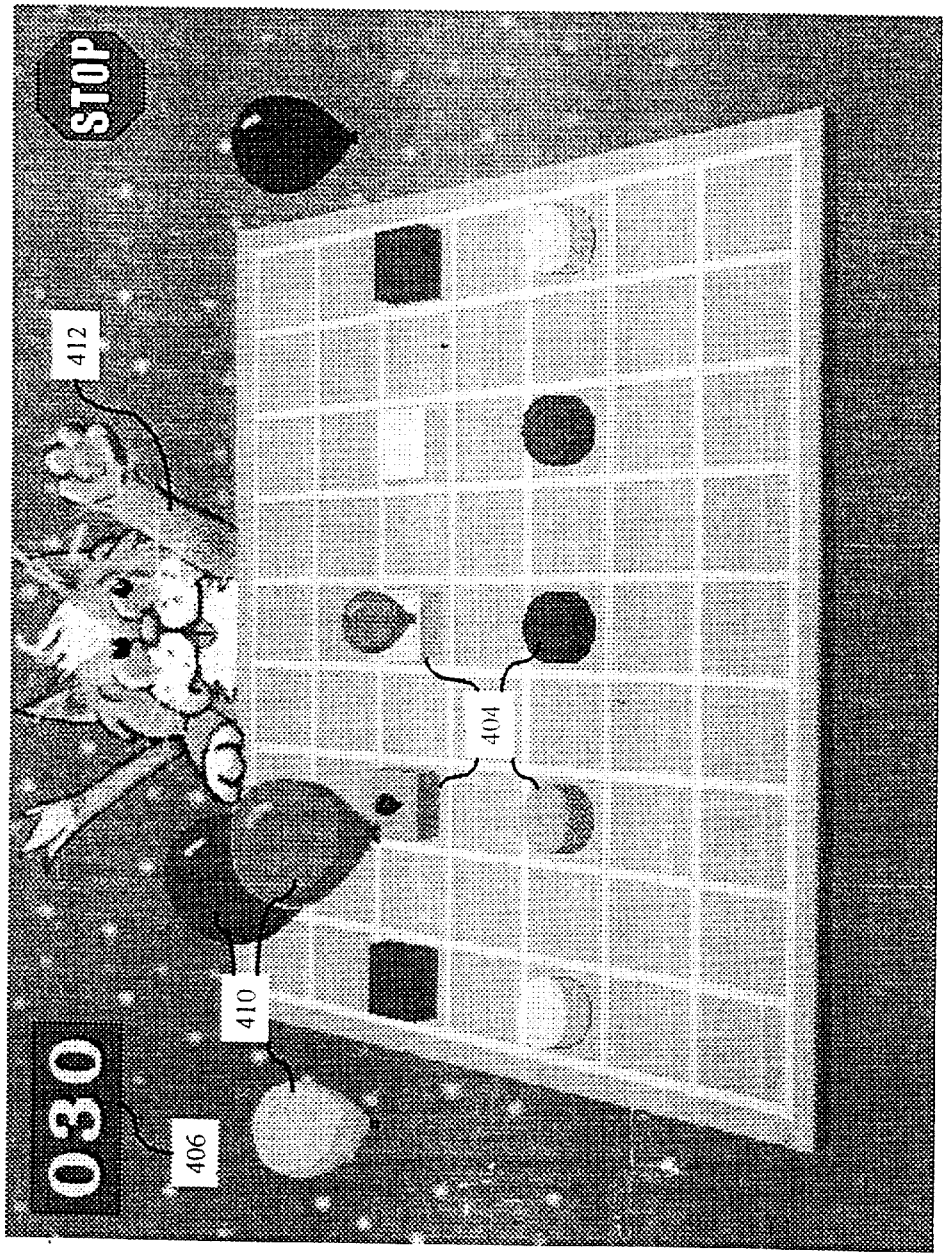

Block Commander 1106 (FIG. 81) uses non-animated discrete progress indicators 408 (FIG. 36) to indicate to the user progress toward a reward animation. Progress indicators 408 (FIG. 37) are different yet belong to a theme. In the illustrative example of FIG. 37, the theme is one of milk. Since each of progress indicators 408 can be different, the user is motivated to see the various forms of representation of progress indicators 408 belong to the theme of milk. Specifically, Block Commander 1106 (FIG. 81) randomly selects a graphical image from a collection of graphical images of a given theme each time the user responds correctly to stimuli presented by Block Commander 1106. When the user has provided a number of correct responses equal to the animation interval represented in animation interval 1204 (FIG. 82), when training exercise 1200 represents Block Commander 1106, animation logic 1214 presents the user with a reward animation as shown in FIG. 38. Specifically, balloons 410 are shown to float up from blocks 404 while a cat 412 bats a paw at balloons 410.

Figure 39:
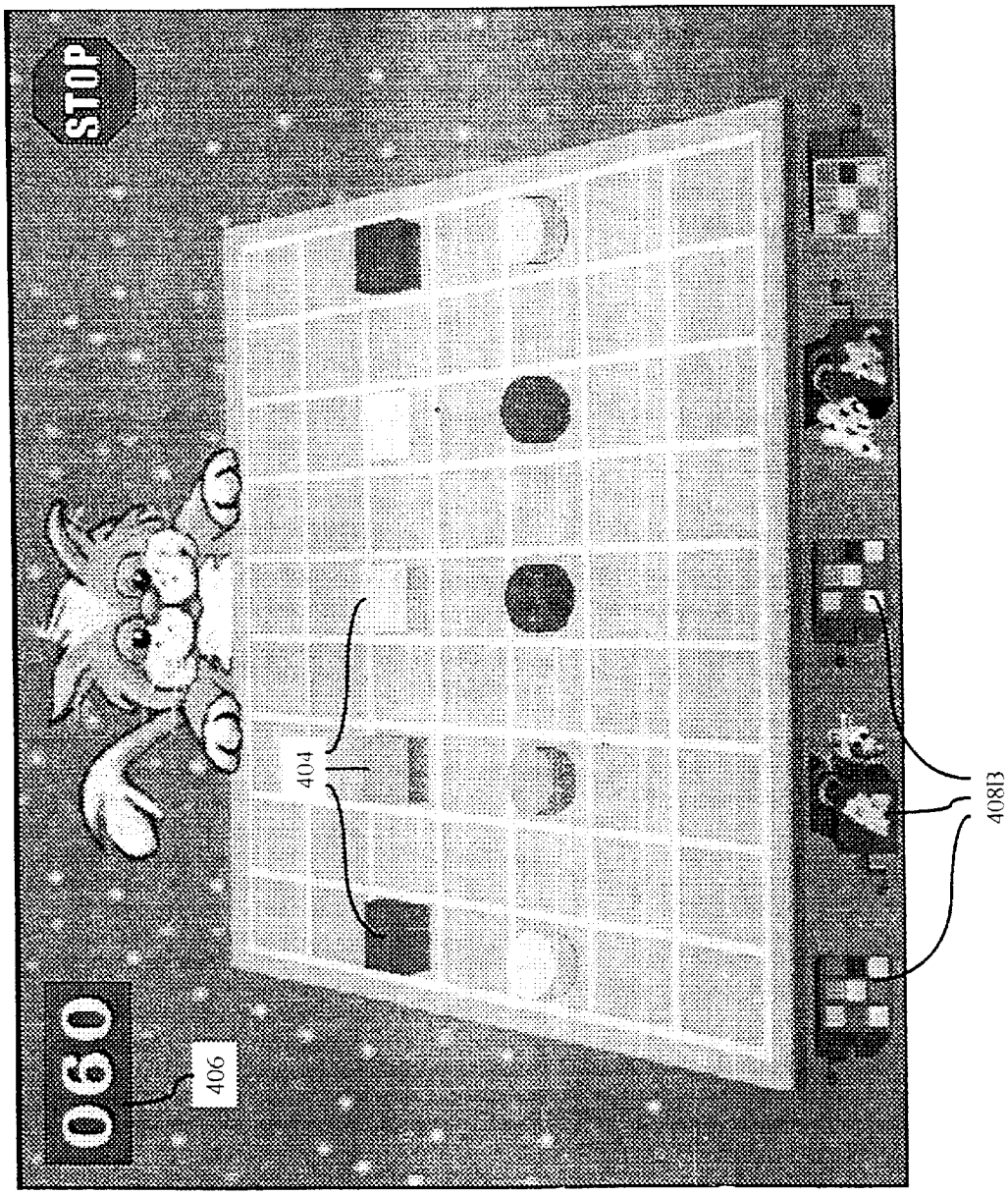
Figure 40:
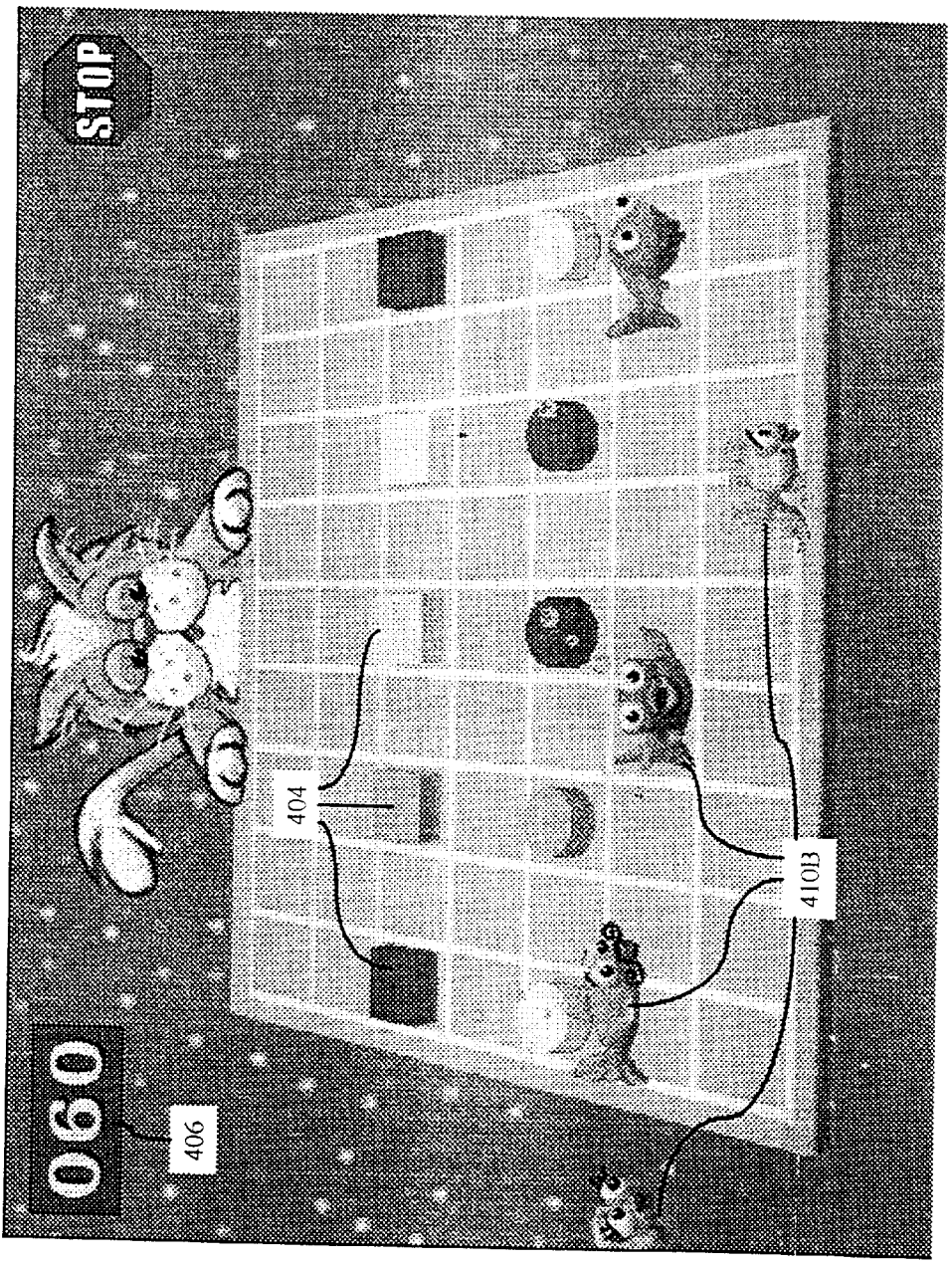

After presentation of a reward animation, Block Commander 1106 changes the theme of progress indicators. For example, FIG. 39 shows progress indicators 408 B in the form of mouse-theme jack-in-the-boxes. The associated reward animation includes fish 410B (FIG. 40) floating up the scene and blowing bubbles.

Figure 50:
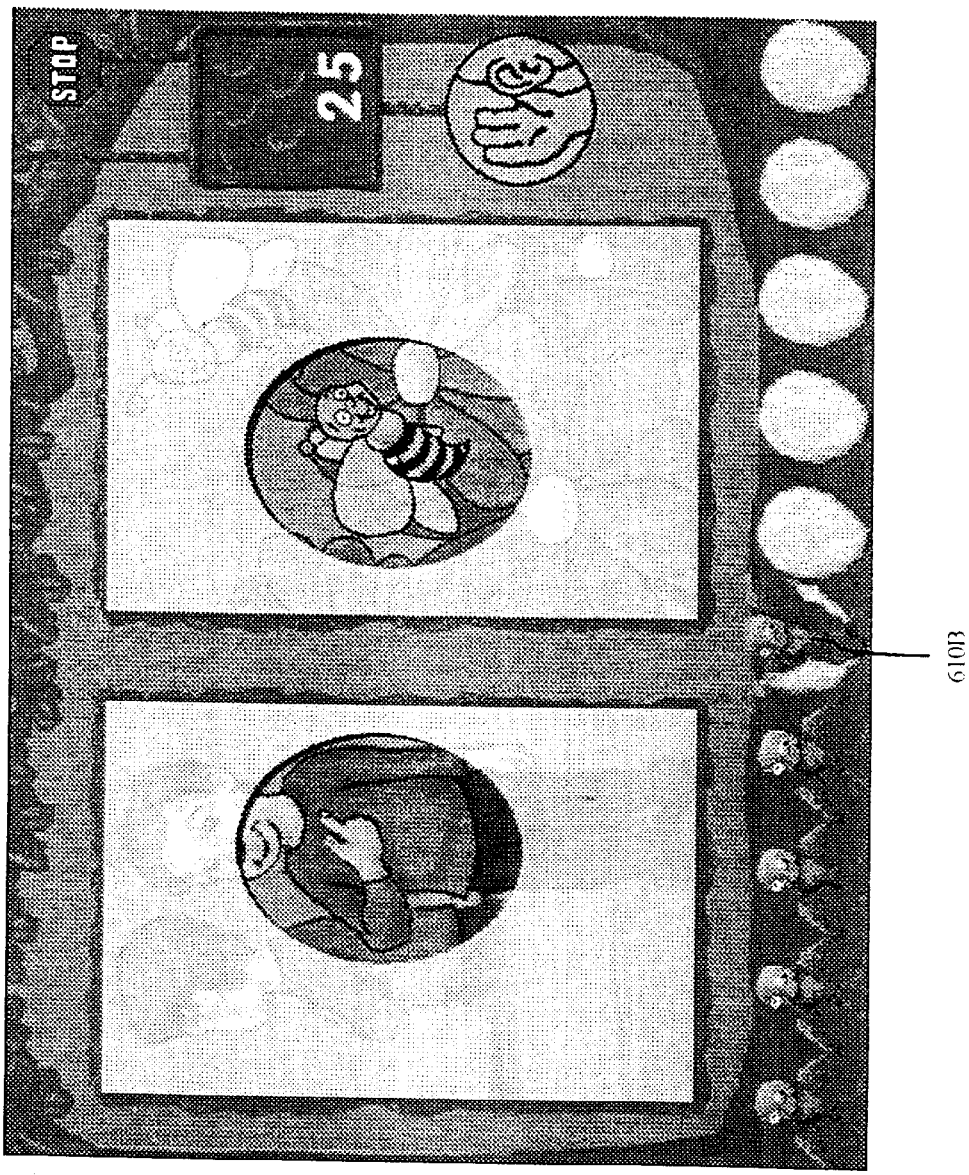
Figure 51:
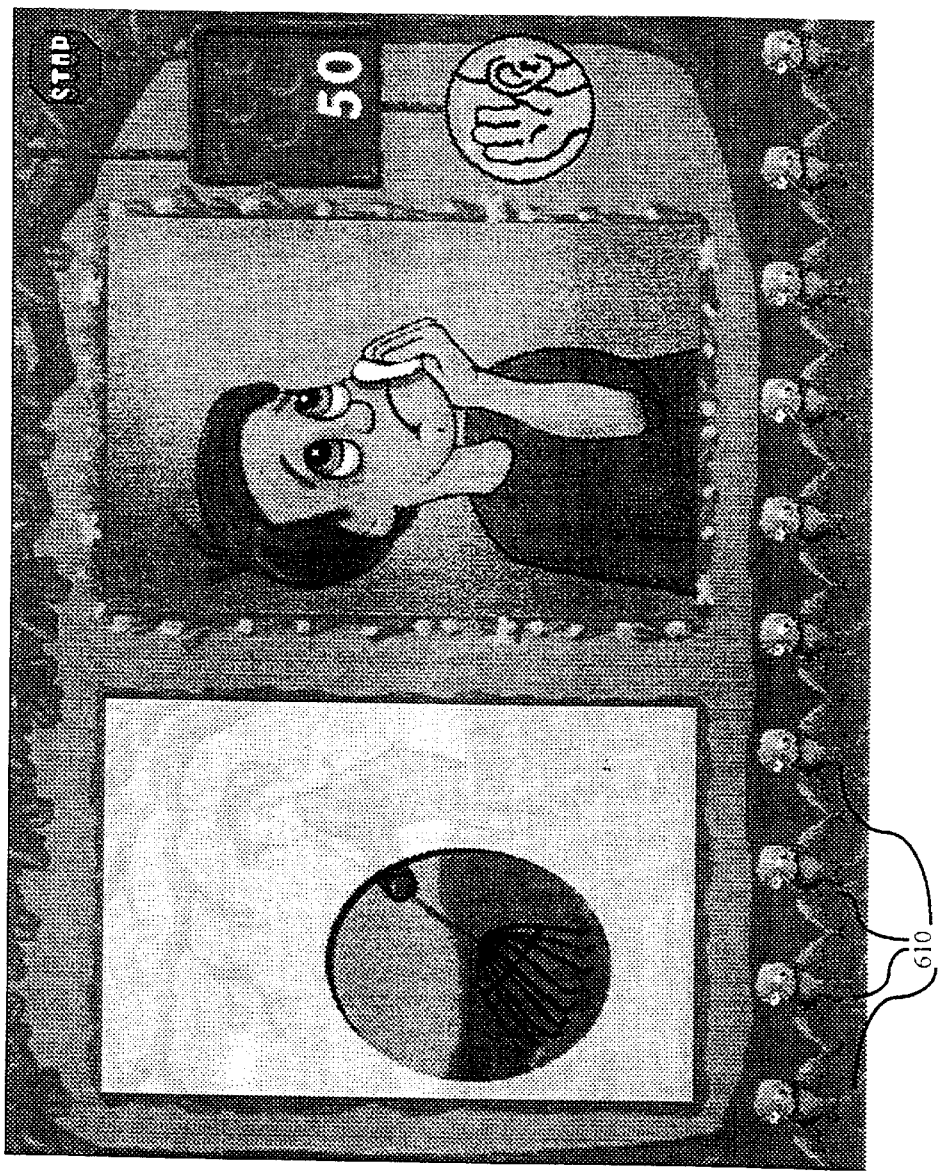
Figure 52:
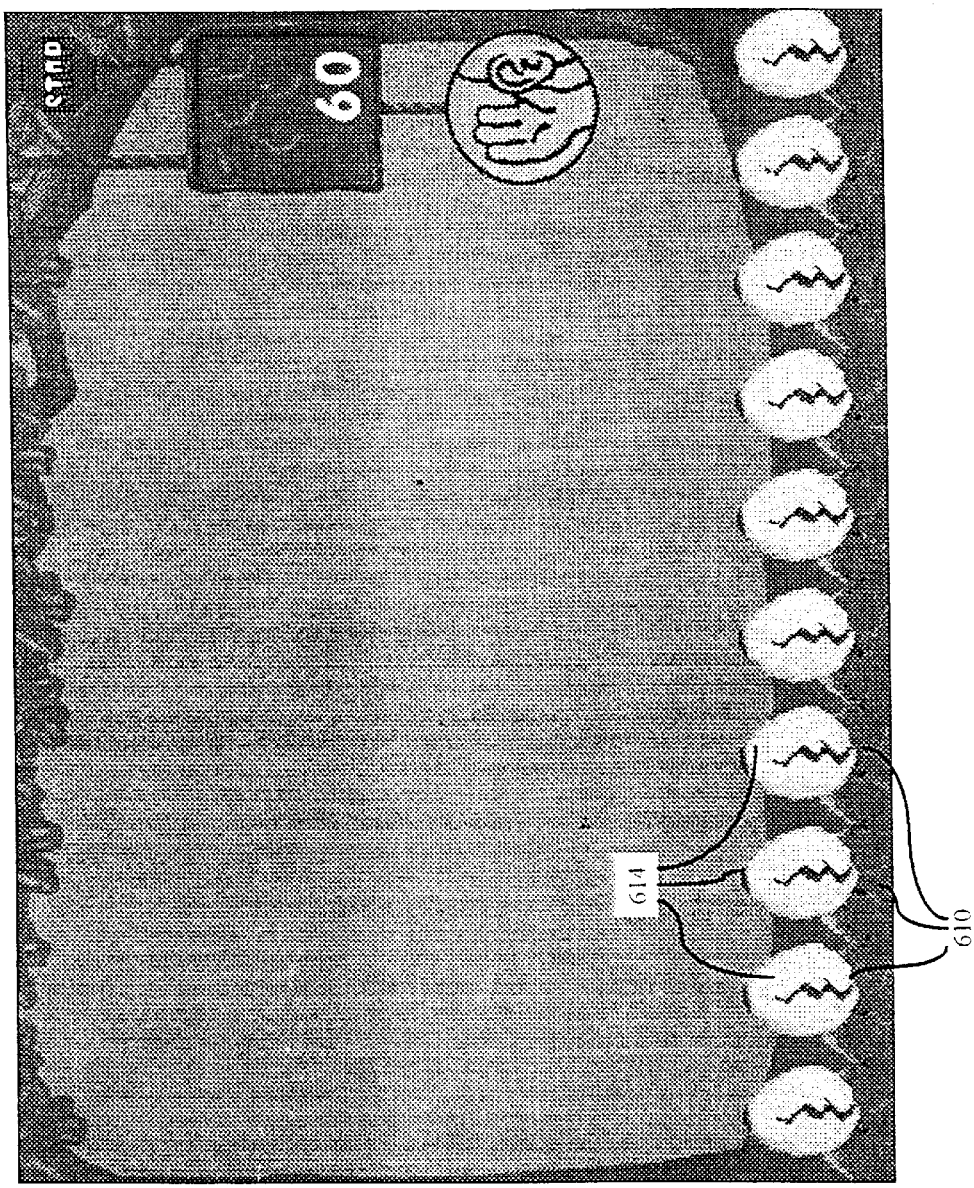
Figure 53:
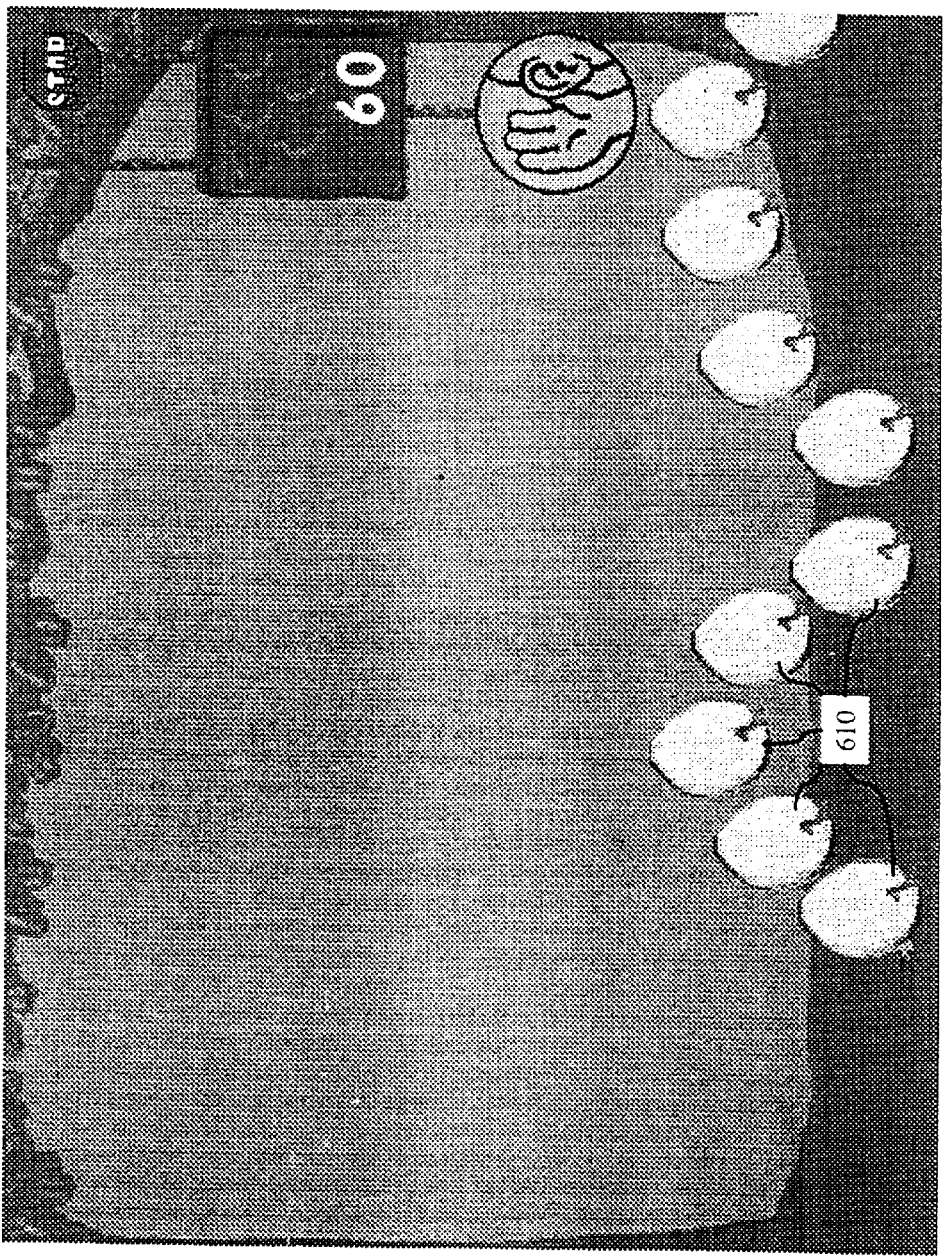
Figure 54:
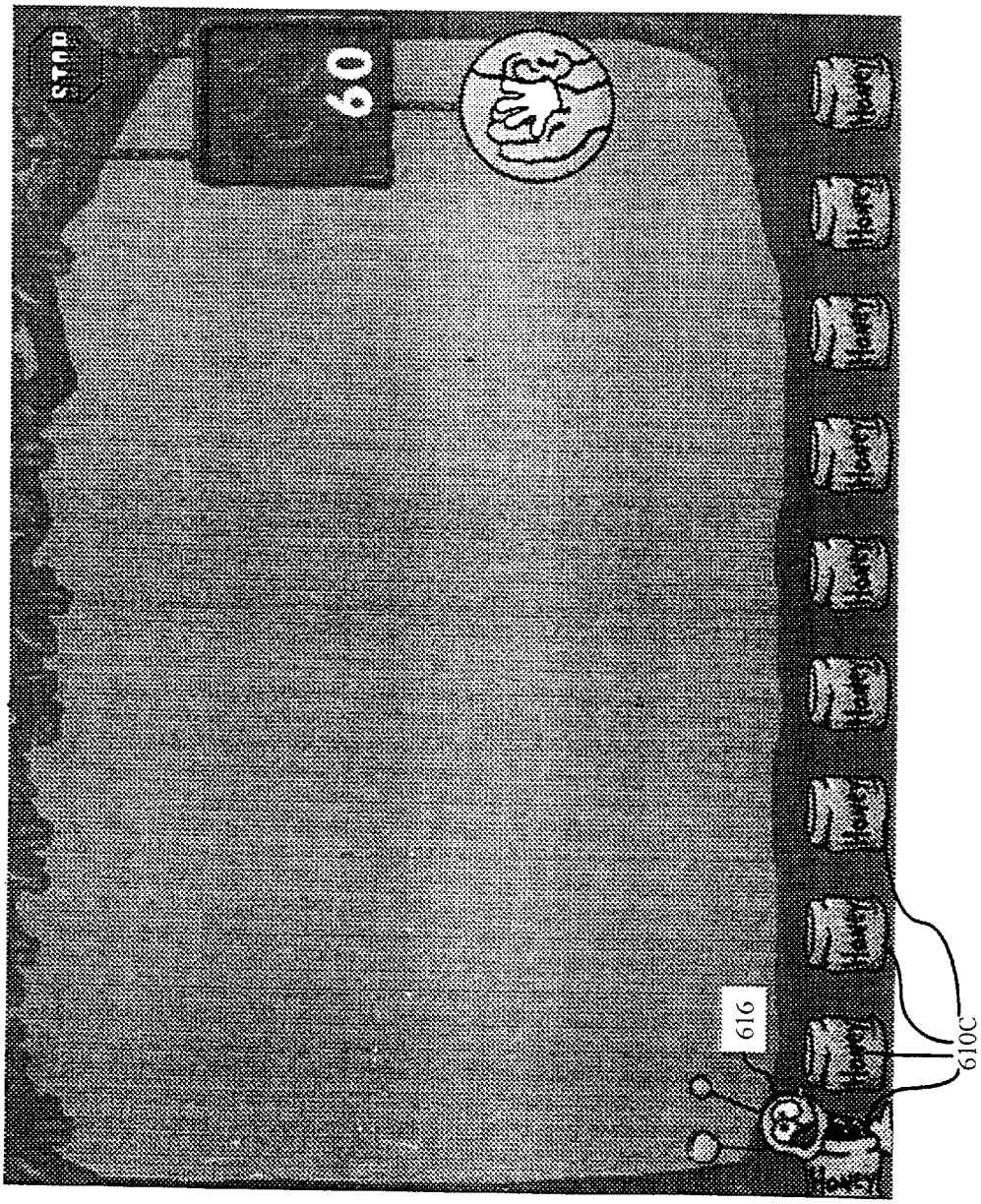

Phonic Words 1110 (FIG. 81) uses discrete progress indicators 610 (FIG. 48) to indicate to user progress toward a reward animation. Each of progress indicators 610 changes its state, e.g., from a representation of an egg to a bird 610A (FIG. 49), in response to a correct response by the user. The change of state is animated to provide an appearance of smooth progress. For example, in transition from an egg representation to bird representation 610A, progress indicators 610 are animated to show the egg cracking and a bird emerging as shown as progress indicator 610B (FIG. 50). When the user has provided ten (10) correct responses, all progress indicators 610 (FIG. 51) are shown as bird representations and the user is rewarded with a reward animation. Specifically, egg shells 614 (FIG. 52) float down the scene and enclose progress indicators 610 an slink away as a single inch worm as shown in FIG. 53.

Figure 55:
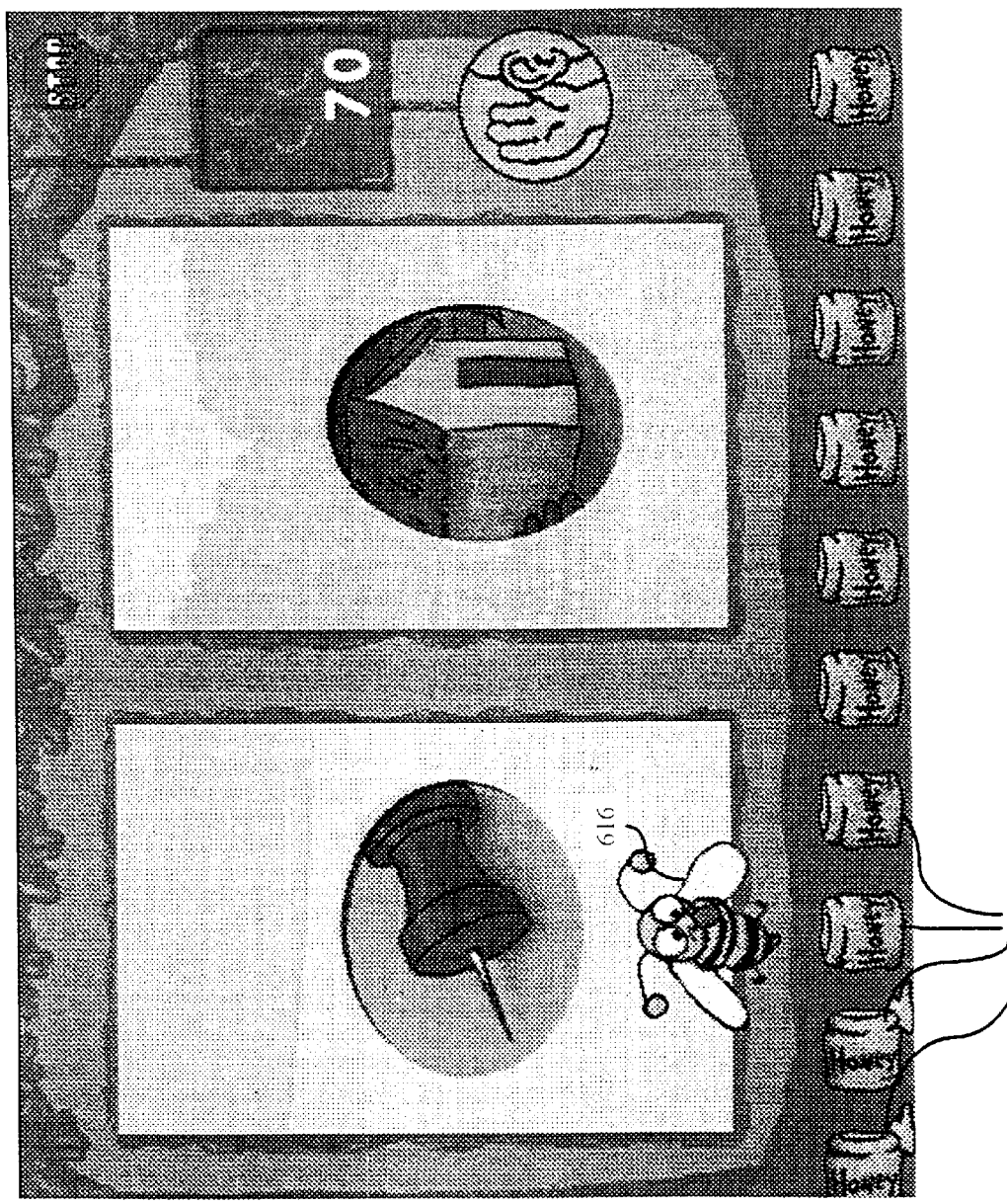
Figure 56:
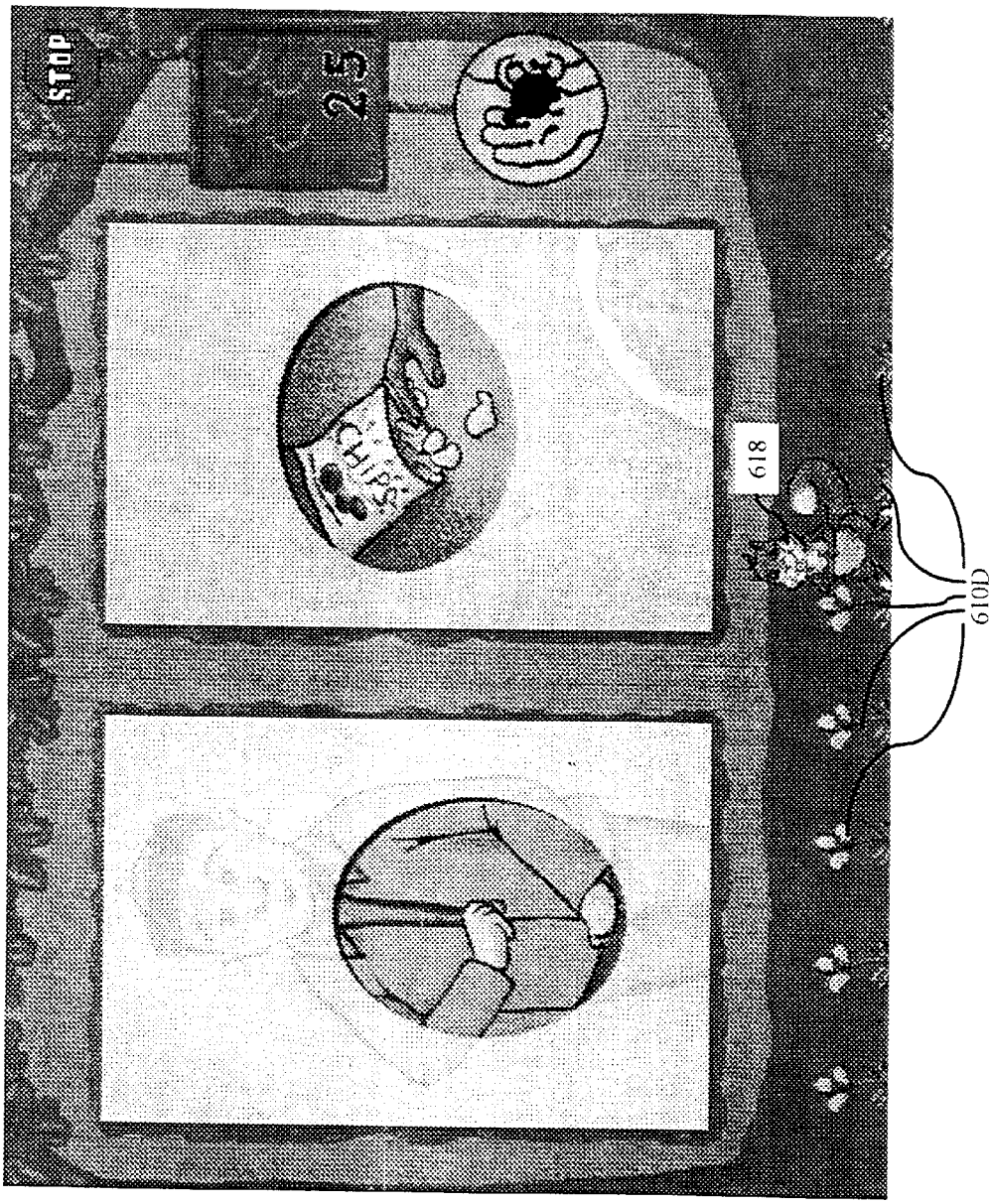
Figure 57:
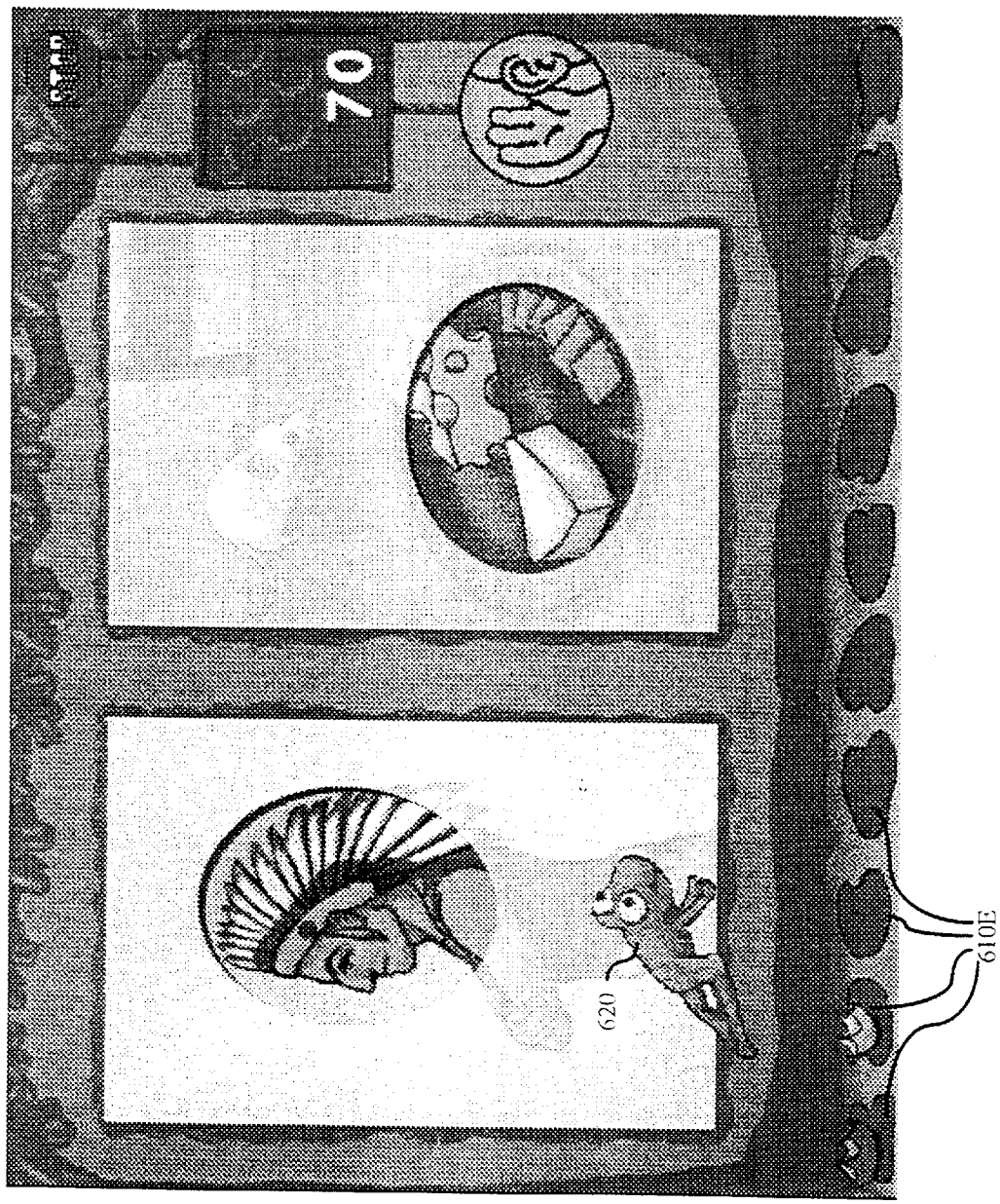
Figure 58:
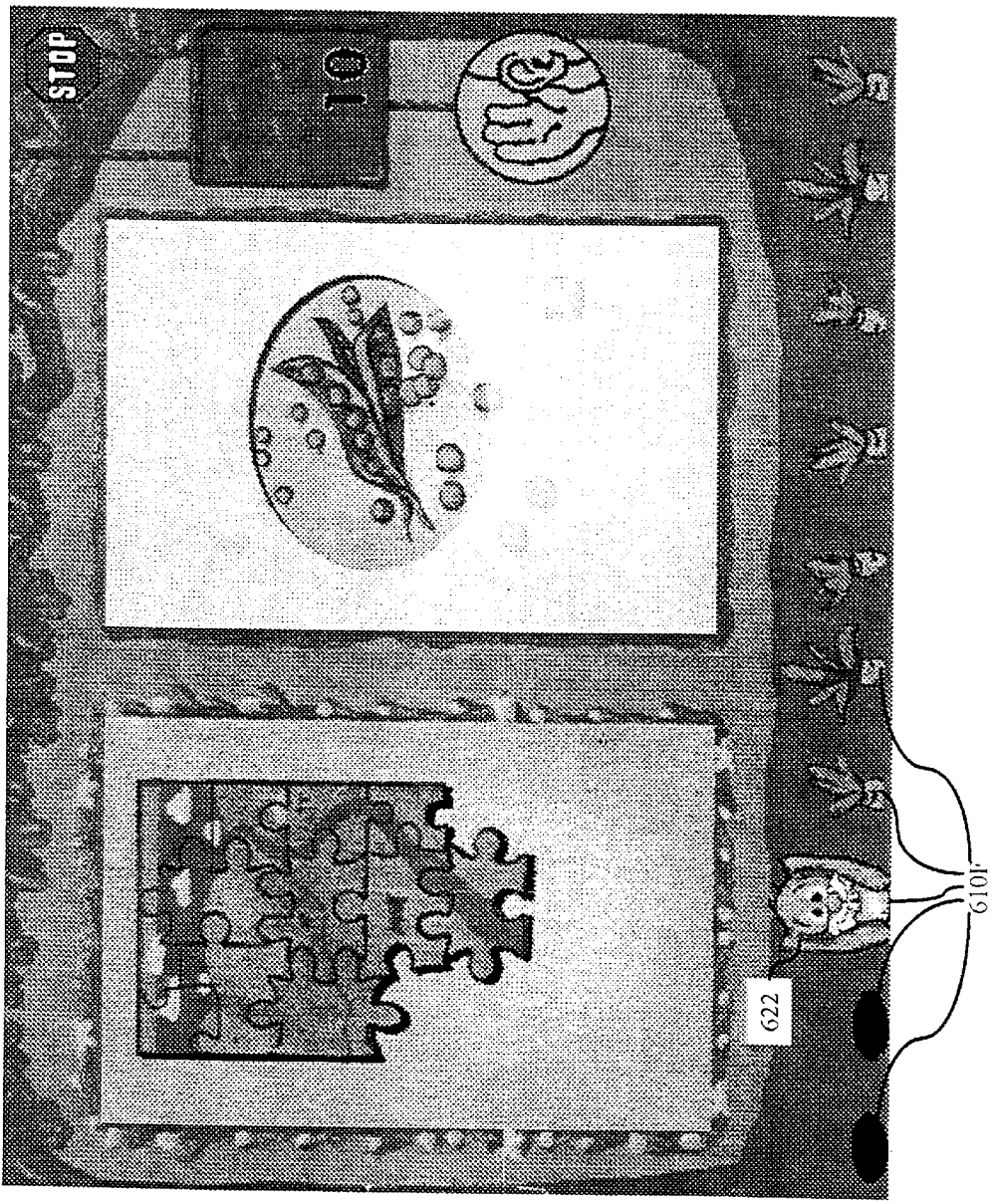

To avoid monotony and to maintain the user's interest in Phonic Words 110 (FIG. 81), progress indicators 610. are replaced with progress indicators 610C (FIG. 54) after the reward animation. Progress indicators 610C are shown as honey jars and the progress animation includes a honey bee 616 which flies from one honey jar into the next to eat the honey as shown in FIG. 55. The following other progress indicators provide variety and some surprise and enjoyment to the user when playing Phonic Words 1110. Progress indicators 610D (FIG. 56) spring up as flowers as a squirrel 618 moves from one of progress indicators 610D to the next. Progress indicators 610E (FIG. 57) are represented as lily pads and the progress animation includes a frog 620 which jumps from one of progress indicators 610E to the next. Progress indicators 610F (FIG. 58) are represented as carrots or holes in the ground and the progress animation includes a rabbit 622 which pulls a carrot from the ground and sits in the resulting hole when progressing from one of progress indicators 610F to the next.

Phoneme Identification 1112 (FIG. 81) uses discrete progress indicators 708 (FIG. 60) to indicate to the user progress toward a reward animation. Each of progress indicators 708 changes its state, e.g., from a representation of an unlit torch to a lit torch with a flame 712 (FIG. 61), in response to a correct response by the user. The change of state is animated to provide an appearance of smooth progress. For example, the torch lights smoothly, progressing from a small flame to a full size flame 712 and continues to flicker throughout use of Phoneme Identification 1112.

LCB 1114 (FIG. 81) uses discrete progress indicators 910 (FIG. 70) to indicate to the user progress toward a reward animation. Each of progress indicators 910 changes its state, e.g., from a blank representation to a representation of an item 916 (FIG. 71), in response to a correct response by the user. Item 916 comports with a theme, e.g., items found in an office. Progress indicators 910 (FIG. 72) include a computer, a desk, a fan, a file cabinet, a potted plant, a chair, a stapler (FIG. 73), a phone, and a waste-paper basket. Progress indicators 910 are component objects of an associated reward animation. Specifically, the associated reward animation includes the objects of progress indicators 910 floating in space (FIG. 74) and coming together (FIG. 75) to form a make-shift space vehicle (FIG. 76) which is flown out of the scene. The objects of progress indicators 910 are not ones ordinarily associated with space vehicles. Accordingly, elements of surprise and curiosity motivate the user to provide correct responses to stimuli to thereby earn objects as progress indicators 910 to see what type of space vehicle can be created therefrom.

Figure 80:
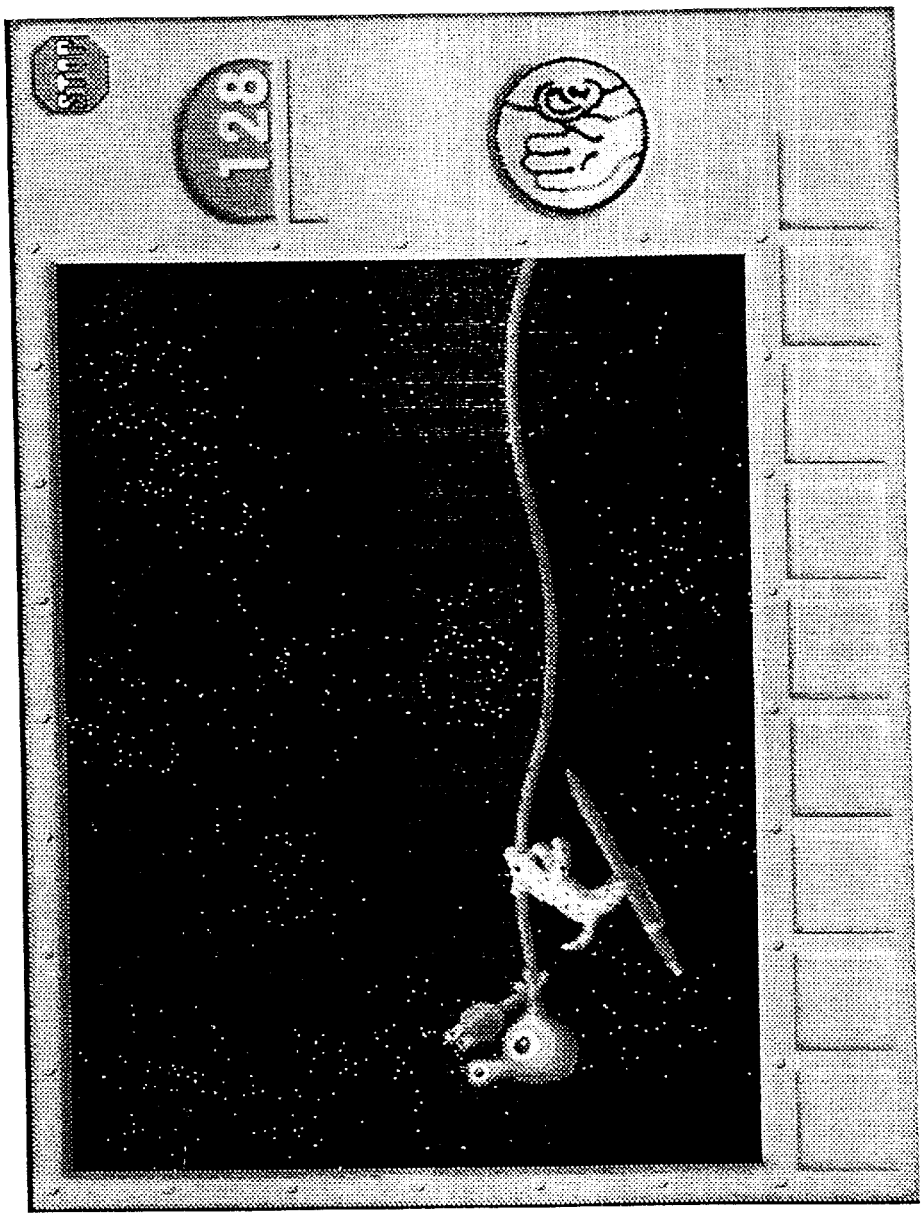

While progress indicators 910 include objects of a theme, it is possible that objects which are not so easily categorized according to a theme can be combined is a curious and surprising manner to form a space vehicle reward animation. For example, progress indicators 910B (FIG. 77) include sports objects such as a baseball, a cap, and a baseball glove and non-sports objects such as a ballpoint pen and a steam iron. Progress indicators 910B even include objects not found in reality and not easily recognized. These objects come together (FIG. 78) to form a space vehicle (FIG. 79) which is flown off the scene (FIG. 80).

Variable Ratio Reinforcement

The progress indicators described above are a fixed ratio reinforcement mechanism in that the reinforcement is provided in response to a fixed number of correct responses. Such mechanisms sometimes provide limited motivation. For example, if the user wishes to see flying object 102 (FIG. 4) fly into home 110, the user has only to provide one correct response to stimuli presented by Old MacDonald's Flying Farm. The user can provide the next correct response whenever the user wishes to see flying object 102 fly into home 110 again. Reward animations described above and more completely below provide a more entertaining reward but delay the reward until a number of correct responses are given by the user. Therefore, if the user wishes to see the space vehicle of FIGS. 74–76 come together and fly off the scene, the user must respond correctly to stimuli nine (9) times. Therefore, the user is motivated to provide nine (9) correct responses but loses that motivation once the reward animation is presented until the user wishes to see another space vehicle come together and fly off the scene.

Variable ratio reinforcement provides rewards to the user at random intervals. The random, unpredictable nature of variable ratio reinforcement provides a degree of surprise and excitement which motivates the user. Since the user doesn't know when the reward is coming, the user is motivated to provide as many correct responses as possible to thereby increases the likelihood that variable ratio reinforcement is presented to the user.

Phoneme Identification 1112 (FIG. 81) provides a good example of variable ratio reinforcement. As described above, each correct response by the user causes a torch of progress indicators 708 (FIG. 61) to light. In addition, at random intervals, one of progress indicators 708 is animated in a different manner. For example, a correct response by the user can cause an ice cream scoop 714 (FIG. 62) to spring up on a torch of progress indicators 708. Similarly, a cup of hot chocolate 716 (FIG. 64) can spring up on a torch of progress indicators 708 in response to a correct response by the user. Such unexpected rewards are sometimes referred to as nuggets. Other nuggets of Phoneme Identification 1112 include many other small animations including bouquets of flowers and apples. The diversity of such small animations adds to the surprise and entertainment and piques the user's curiosity to thereby motivate the user to provide additional correct responses to stimuli. Variable ratio reinforcement is, in this illustrative embodiment, randomly distributed with a uniform distribution and a mean appearance ratio of about 3%. In other words, nuggets appear approximately 3% of the time. Significantly greater appearance ratios than 3%, e.g., greater than 10%, don't motivate users as much and the effect becomes closer to that of reward animations in that the user knows a nugget is coming soon. Significantly lesser appearance ratios than 3%, e.g., less than 1%, don't motivate users as much since the appearance of a nugget is so rare that users don't expect a nugget any time soon enough to be motivated to reach the nugget.

Figure 10:
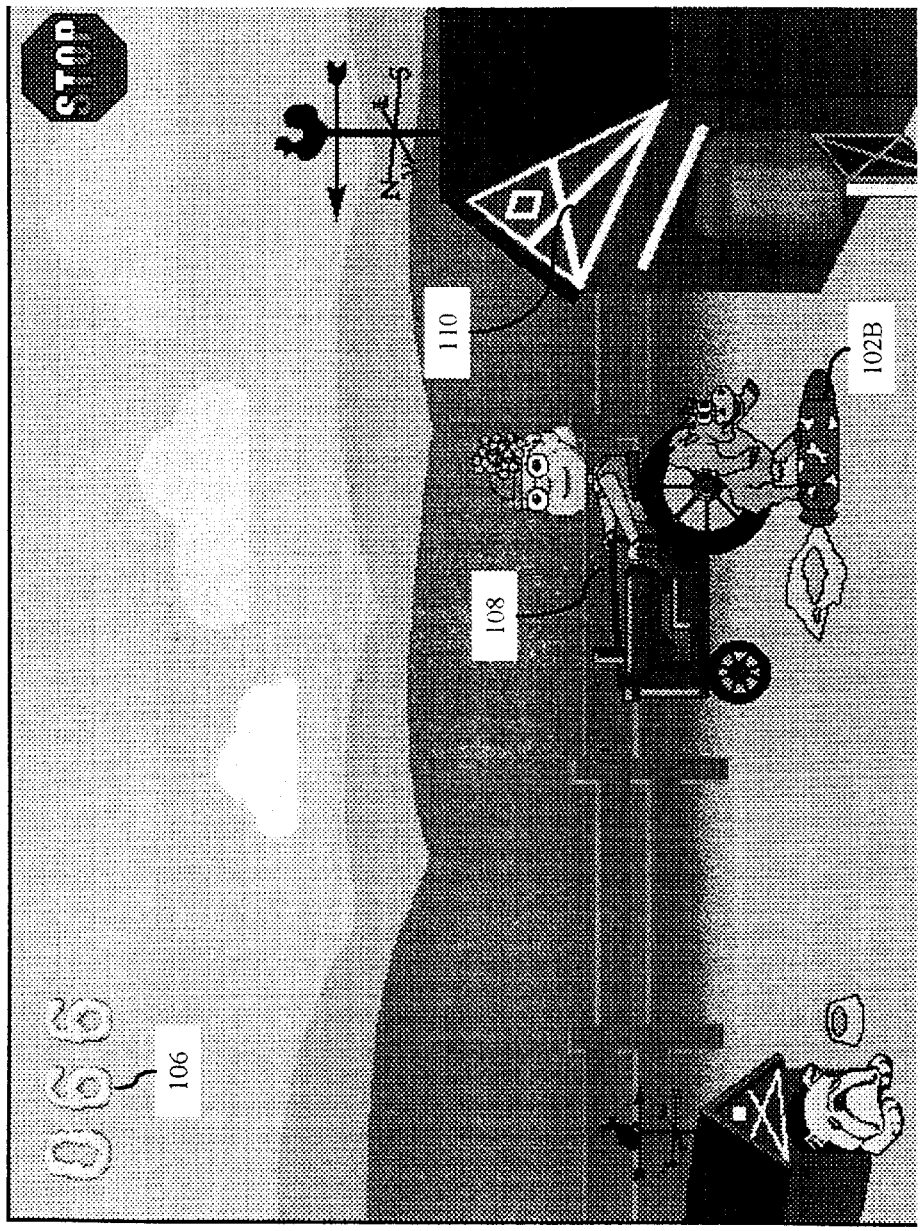
Figure 11:
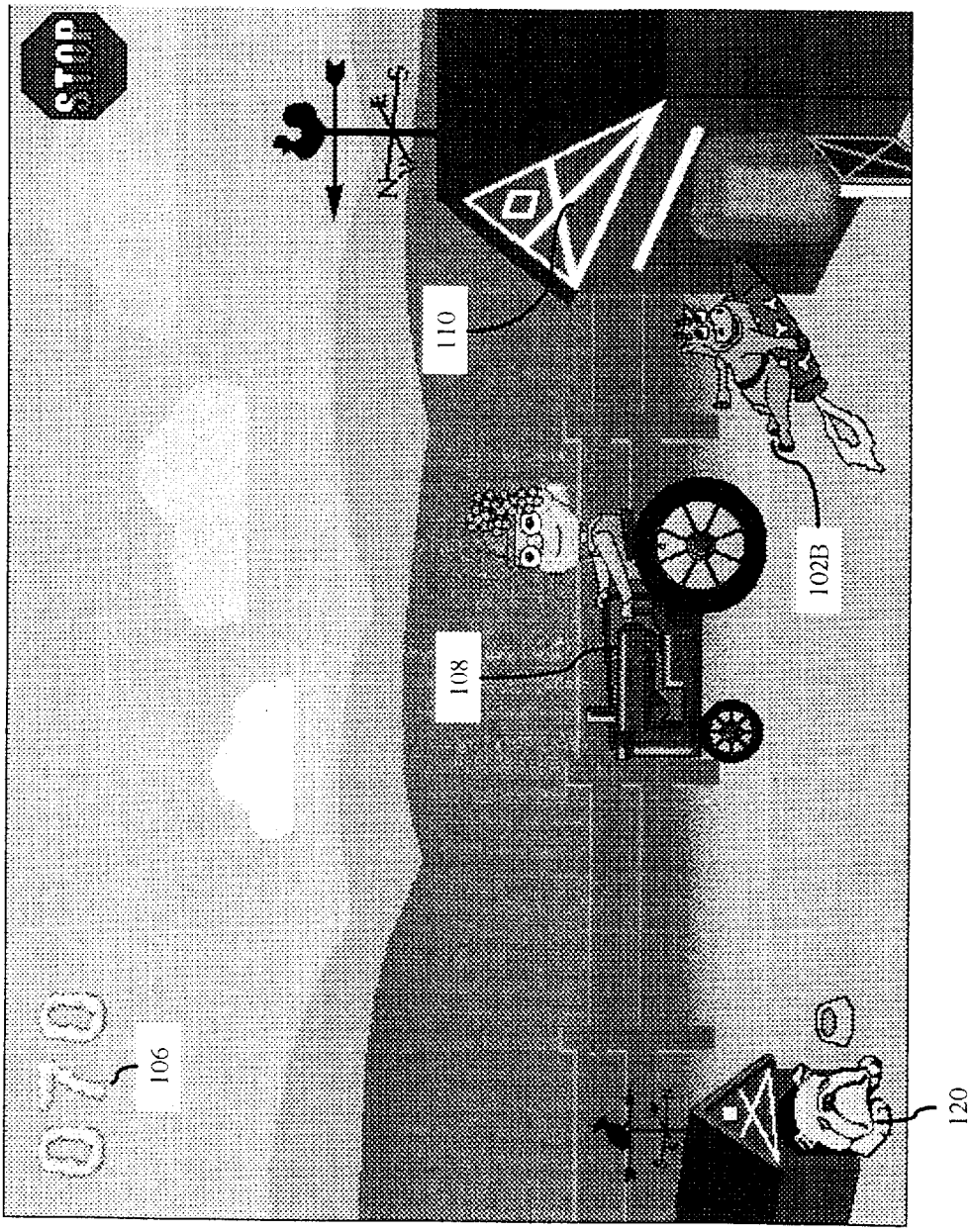

Old MacDonald's Flying Farm 1102 (FIG. 81) also uses variable ratio reinforcement to motivate users. Typically, flying object 102B (FIG. 9) flies into home 110 in response to a correct response by the user in the manner shown, i.e., with a rocket pack on the back of the cow. At random intervals, flying object 102B enters home 110 in different ways. For example, the cow jumps onto the rocket packet and "surfs" into home 110 as shown in FIG. 10. Alternatively, the cow of flying object 102B rolls over and reclines on the rocket pack to ride into home 110. as shown in FIG. 11 or lands outside home 110 and runs along the ground into home 110 with an accompanying "clumpity-clumpity" sound of hooves running on the ground.

Similarly, at higher levels of Old MacDonald's Flying Farm 1102 which are described further below, the normal feedback animation of a correct response is flying of a flying object 202 (FIG. 13) into a home 210 (FIG. 15) in the form of a chick suspended from a hot-air balloon flying under a mother hen. At random intervals, flying object 202 enters home 210 in different ways. For example, other chicks 212 can be already present under home 210, i.e., the mother hen.

Figure 72:
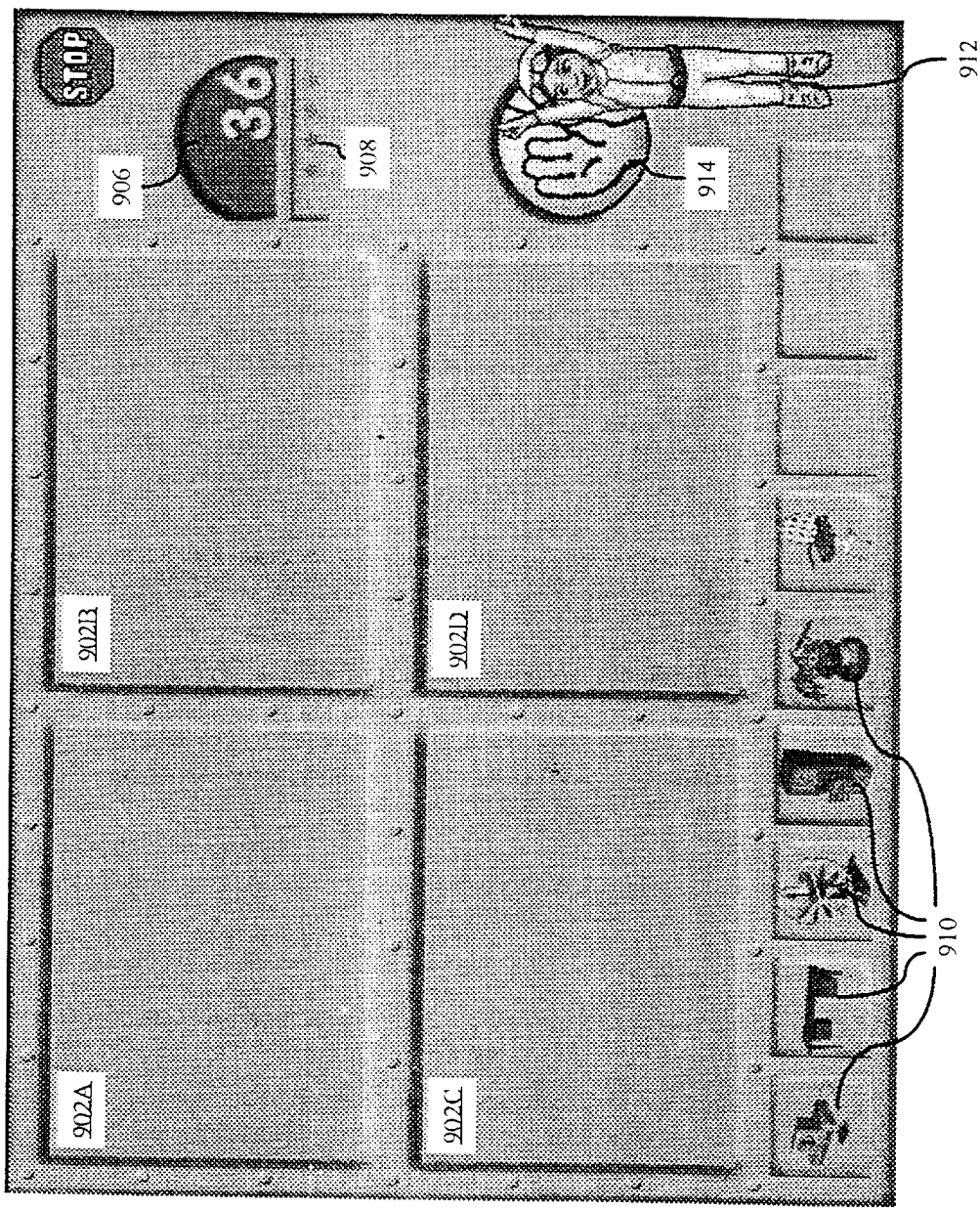
Figure 73:
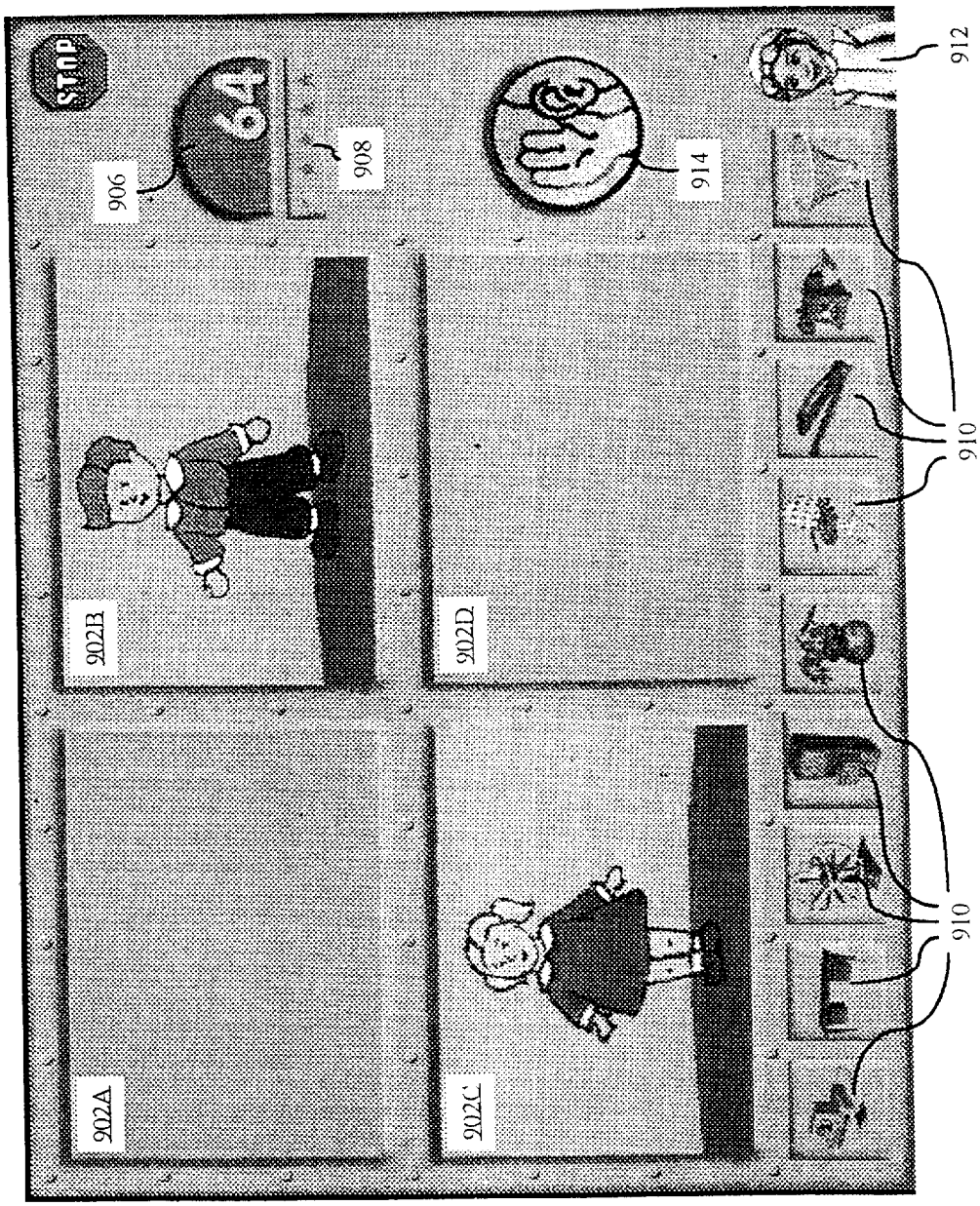
Figure 74:
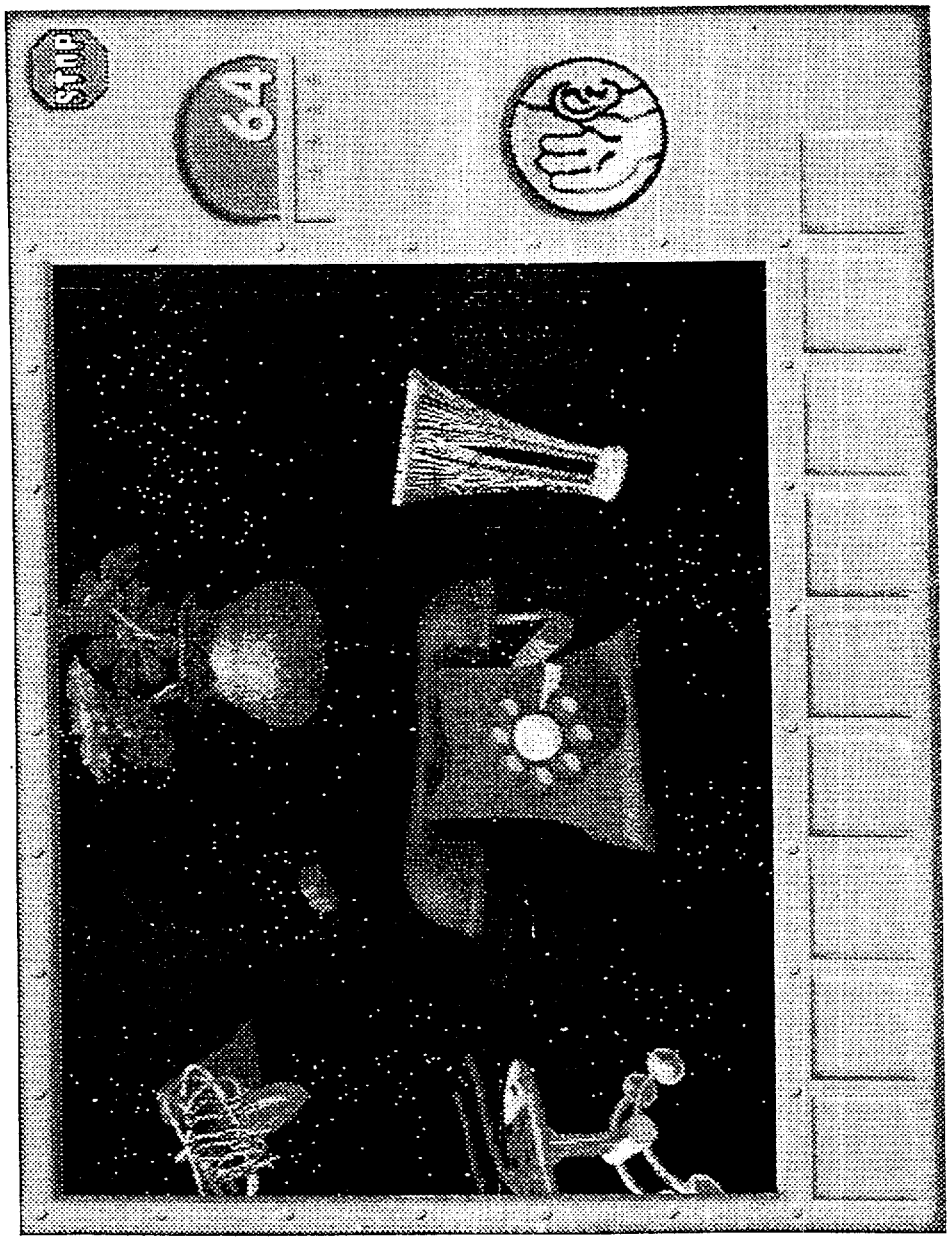
Figure 75:
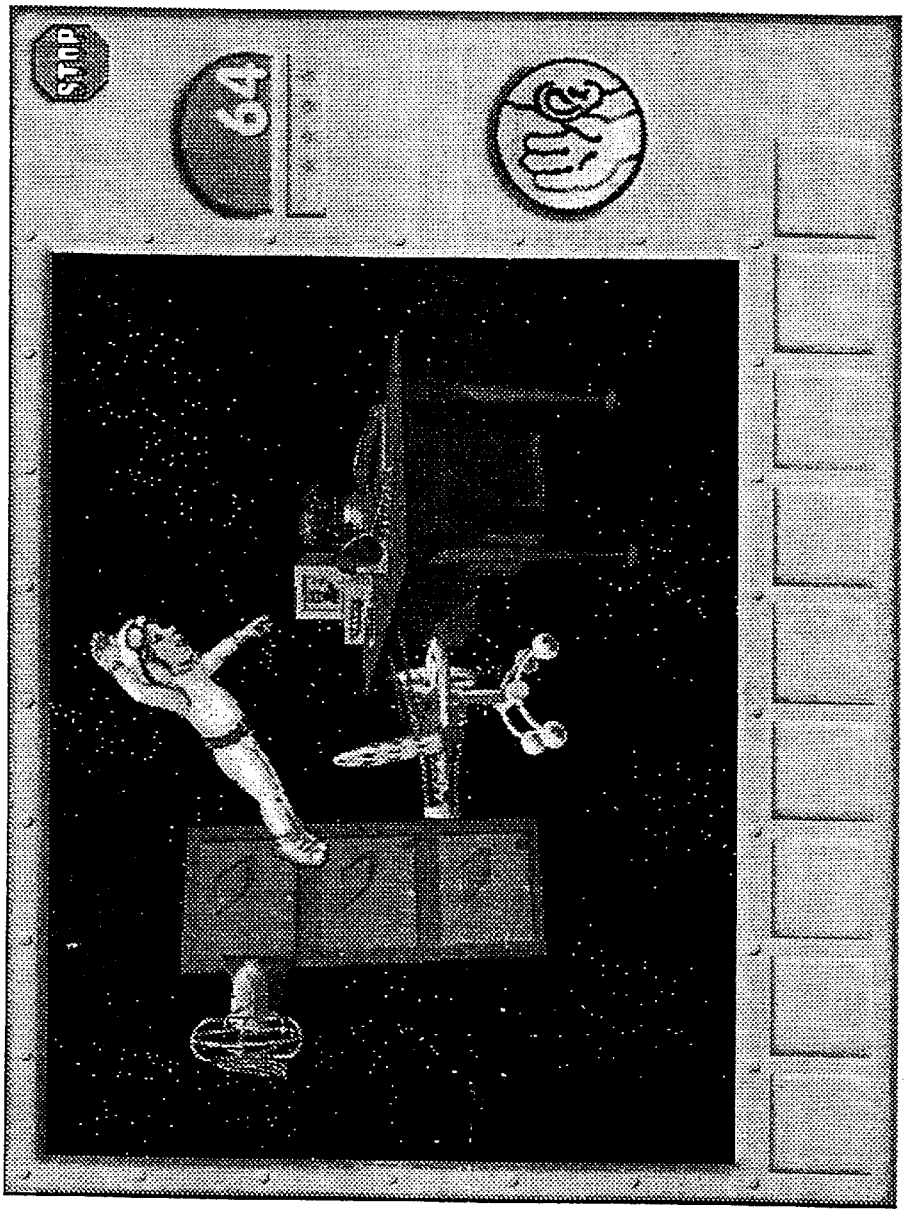
Figure 76:
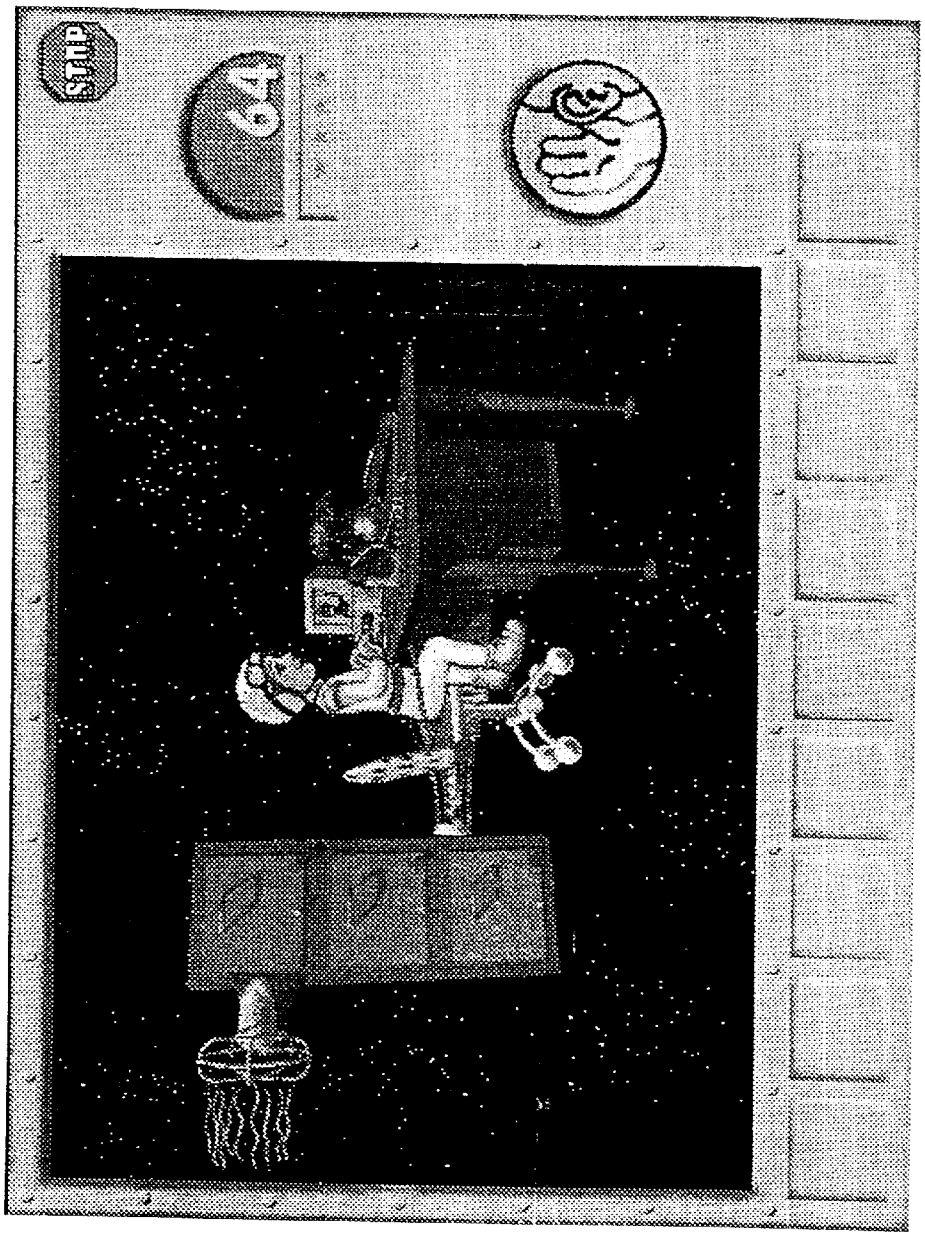
Figure 77:
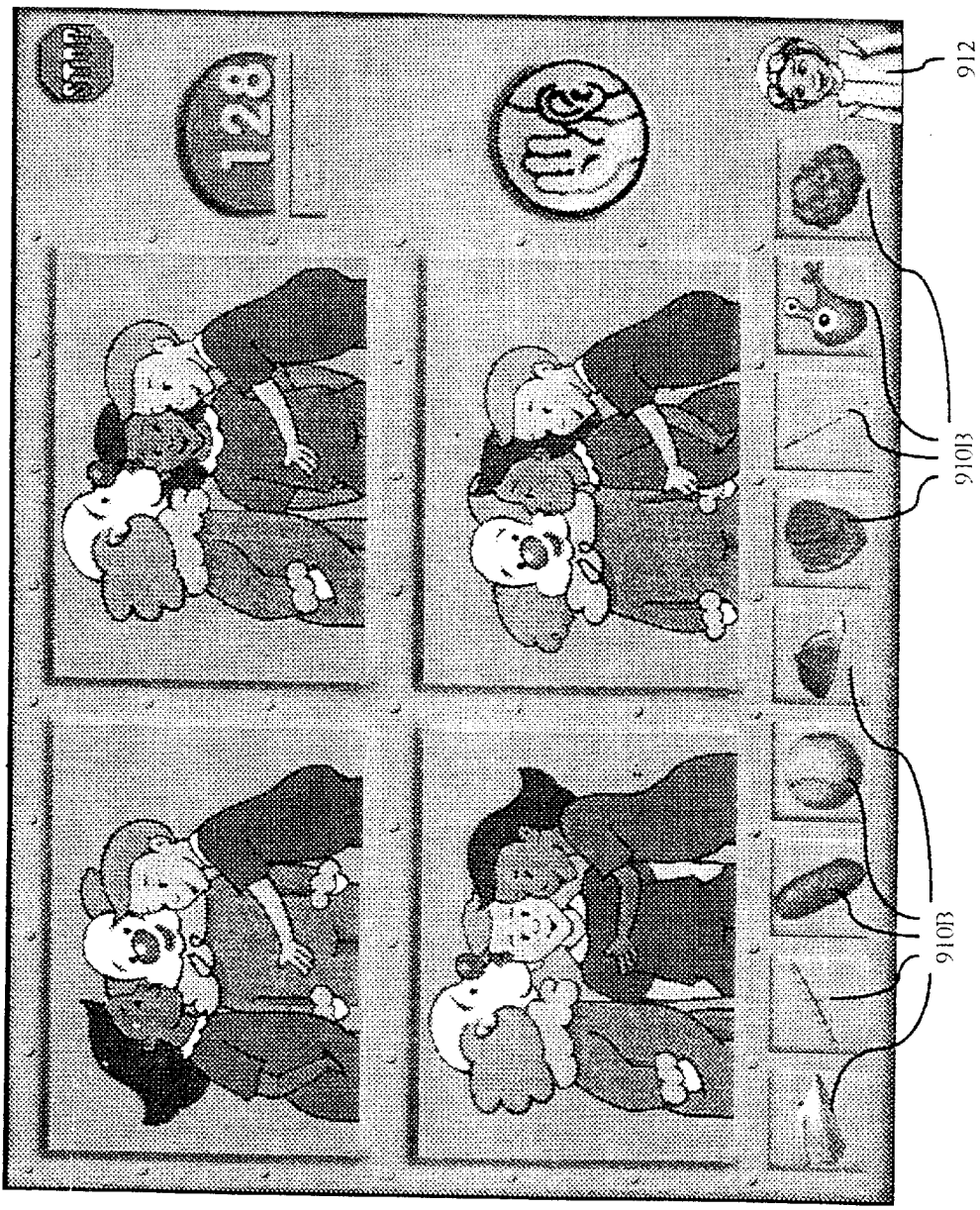
Figure 78:
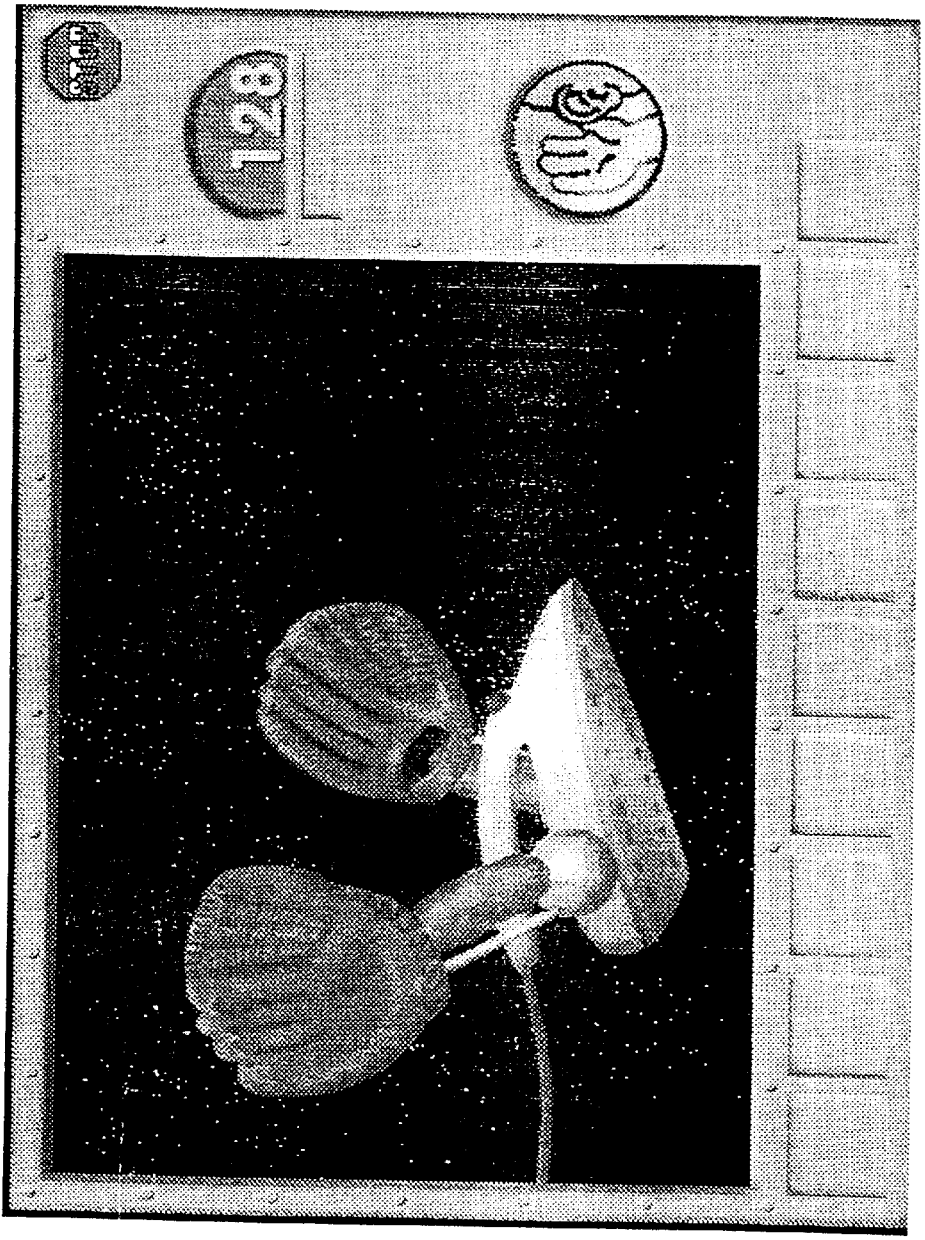
Figure 79:
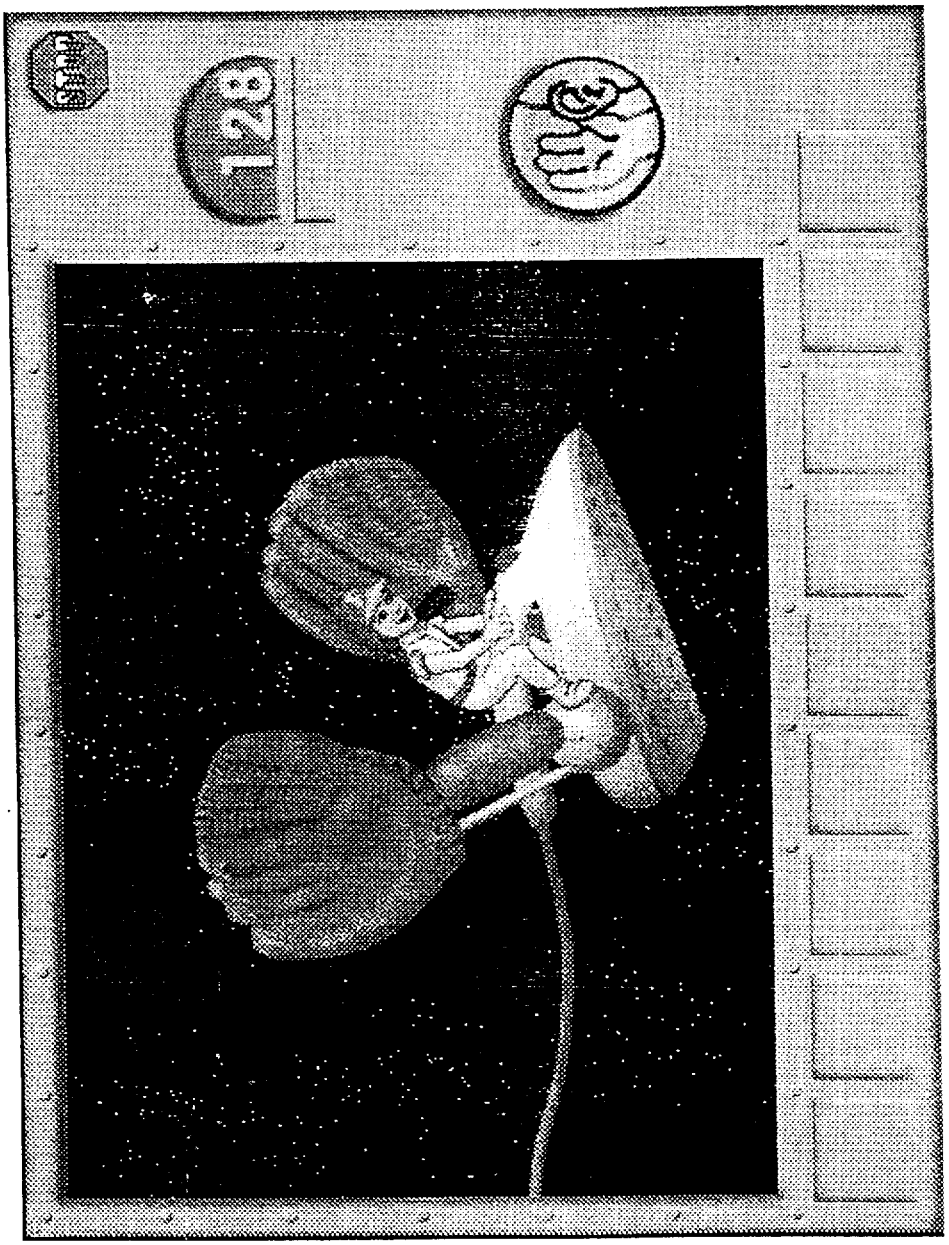

LCB 1114 (FIG. 81) also uses variable ratio reinforcement to further motivate users. A young girl astronaut 912 (FIG. 71) sits still while the user responds to stimuli presented by LCB 1114 and becomes the pilot of the space vehicle ultimately assembled from the objects earned by the user from correct responses as shown in FIGS. 75–76. At random intervals, astronaut 912 rises up in apparent zero-gravity as shown in FIG. 72 and spins and returns to her original position as shown in FIG. 73. To see astronaut 912 rise and spin again, the user has to respond to stimuli correctly some unknown, random number of times and the uncertainty of the number of times required to see astronaut 912 rise and spin provides motivation to the user to respond correctly and to do so quickly.

Reward Animations with Persistent Characters and Plots

As described above, each training exercise presents the user with a reward animation periodically. Each reward animation is designed to be entertaining such that the user is motivated to continue to respond correctly to stimuli to see the next reward animation. Entertainment value of reward animations comes from humor and surprise incorporated into the reward animations. The user's interest in reward animations is encouraged even further by inclusion in the reward animations of persistent characters and plots. The following examples are illustrative.

FIGS. 20–22 show individual screen views of a reward animation of Circus Sequence 1104 (FIG. 81). A character 320 (FIG. 20) in the form of a dog magician is about to perform the infamous sawing in half of another character 322, e.g., a monkey, lying in a box 324. In FIG. 21, character 320 is sawing character 322 in half through box 324, and character 320 separates the sawed halves of box 324 (and of character 322) in FIG. 22. This reward animation is entertaining in and of itself. However, characters 320 and 322, and the plot, persist and continue through a subsequent reward animation shown in FIGS. 23–26.

The user continues to use Circus Sequence 1104 until the user earns another reward animation. The reward animation of FIGS. 23–26 can immediately follow the reward animation of FIGS. 20–22 as the next reward animation earned by the user. Alternatively, one or more other reward animations can be earned between the reward-animations of FIGS. 20–22 and 23–26. However, since the reward animation of FIGS. 23–26 continues the persistent plot involving consistent characters of the reward animation of FIGS. 20–22, animation logic 1214 (FIG. 82) of Circus Sequence 1104 (FIG. 81) ensures that the reward animation of FIGS. 20–22 is presented to the user prior to presentation of the reward animation of FIGS. 23–26.

When another reward animation is earned by the user, character 320 (FIG. 23) waves his hands and wand and causes the feet 326 of character 322 to change to the feet of a pig. Character 320 continues to wave his hands and wand while feet 326 change further to feet 326B of a sheep (FIG. 24), feet 326C of an elephant (FIG. 25), and feet 326D of a woman (FIG. 26) at which point the sound of someone in the circus audience whistling is played and character 322 blushes. After the reward animation of FIGS. 23–26, the user sees that characters and plots in the reward animations persist and continue. As a result, the user becomes curious as to what happens next in the continuing plot and what happens next to the persistent, consistent character. The user is therefore motivated to earn another reward animation.

Figure 27:
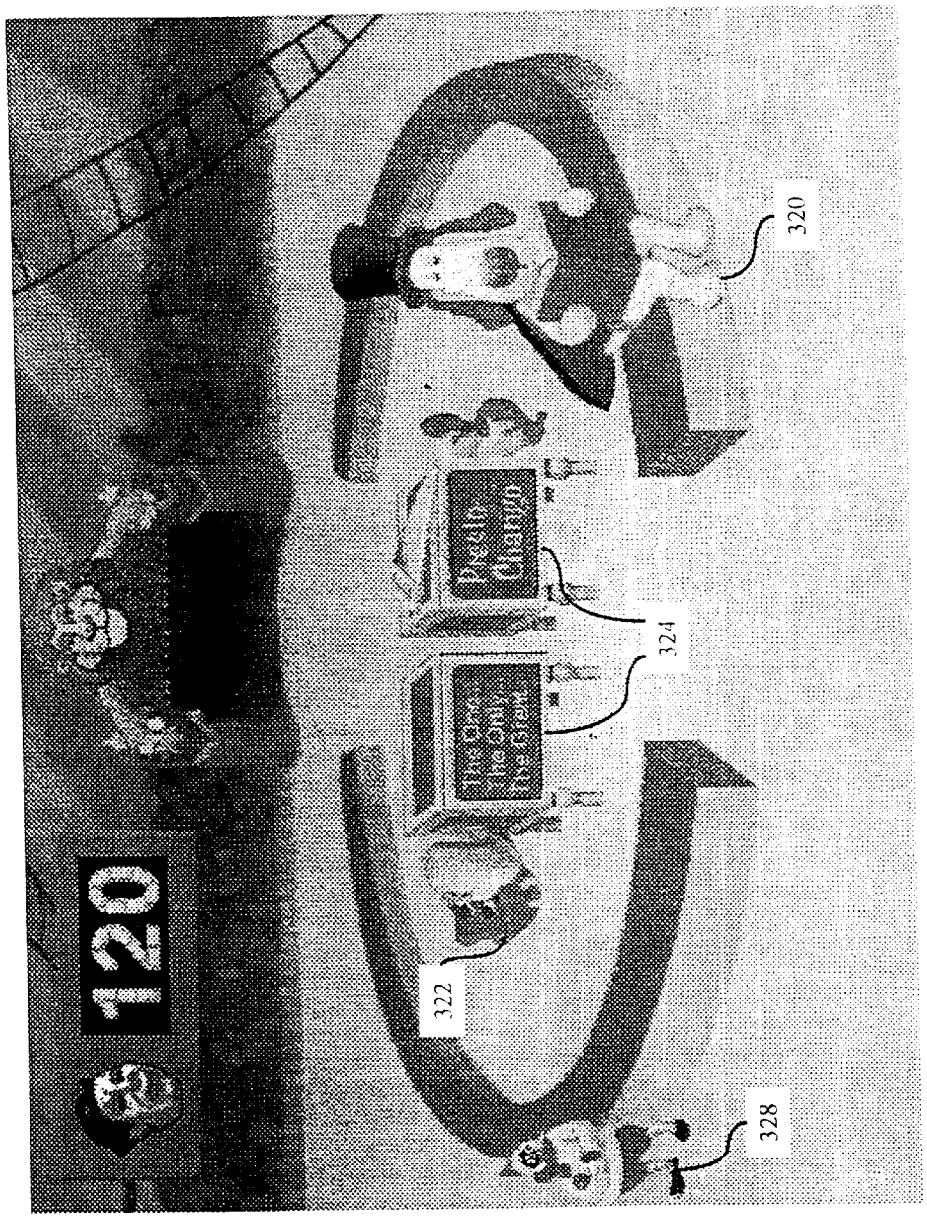
Figure 28:
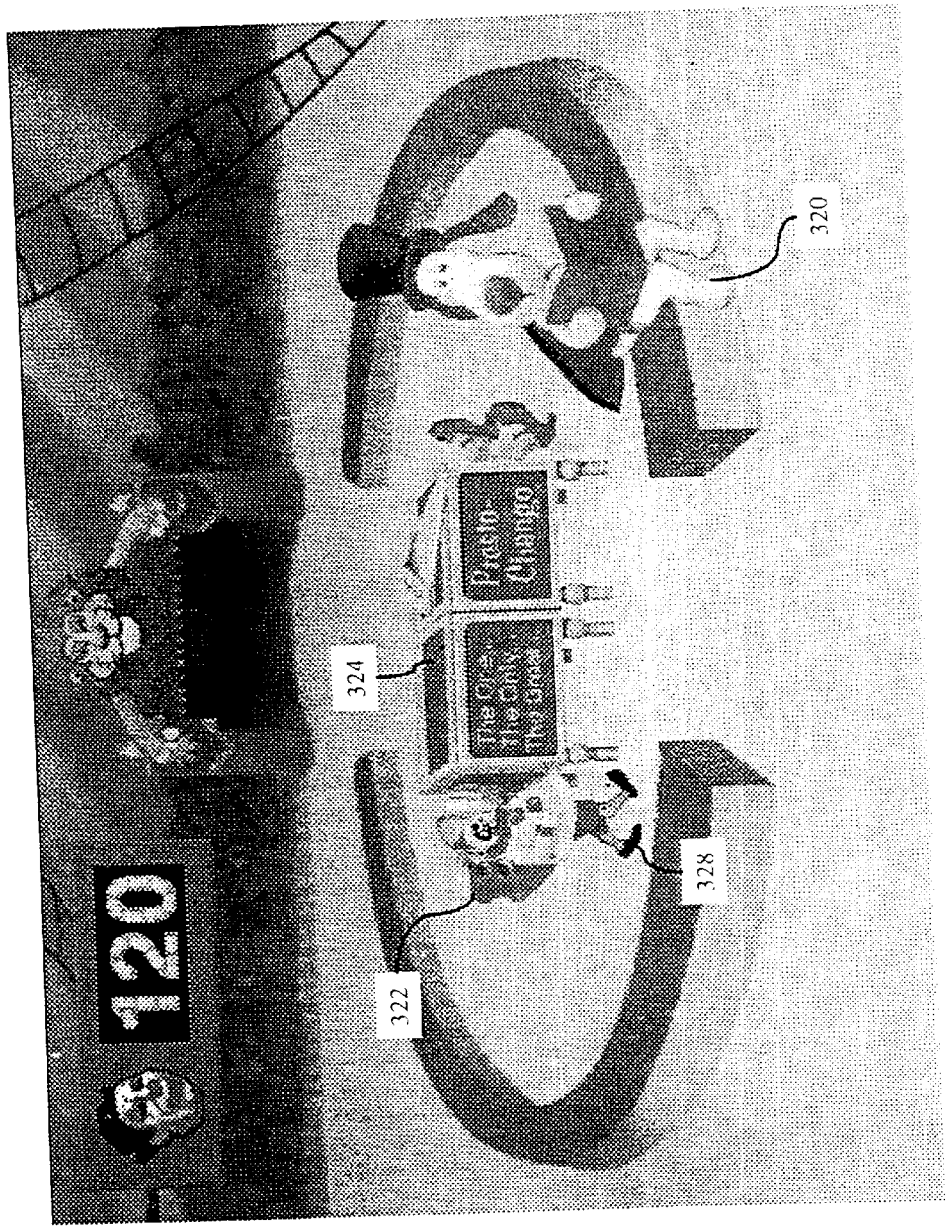
Figure 29:
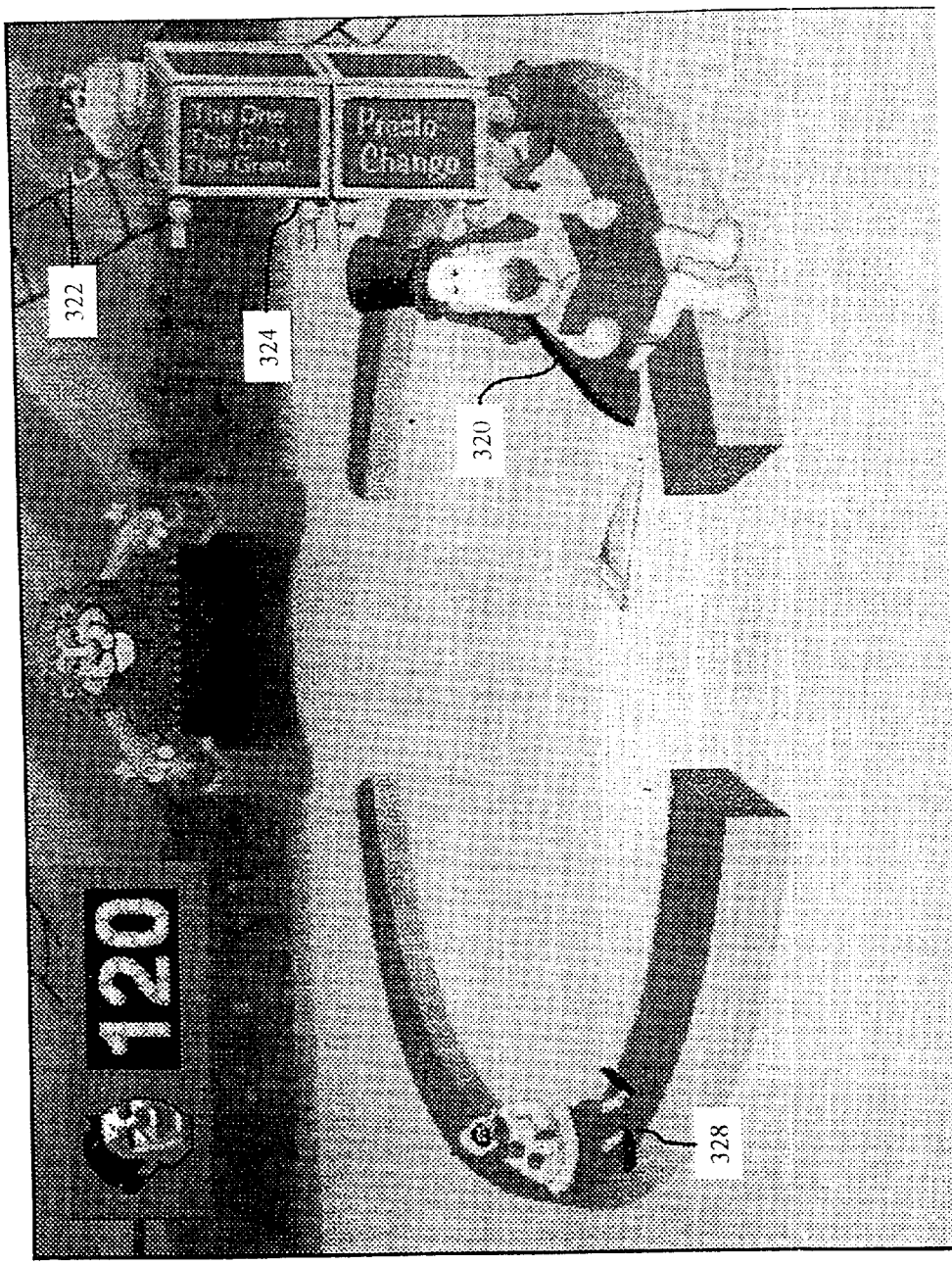
Figure 30:
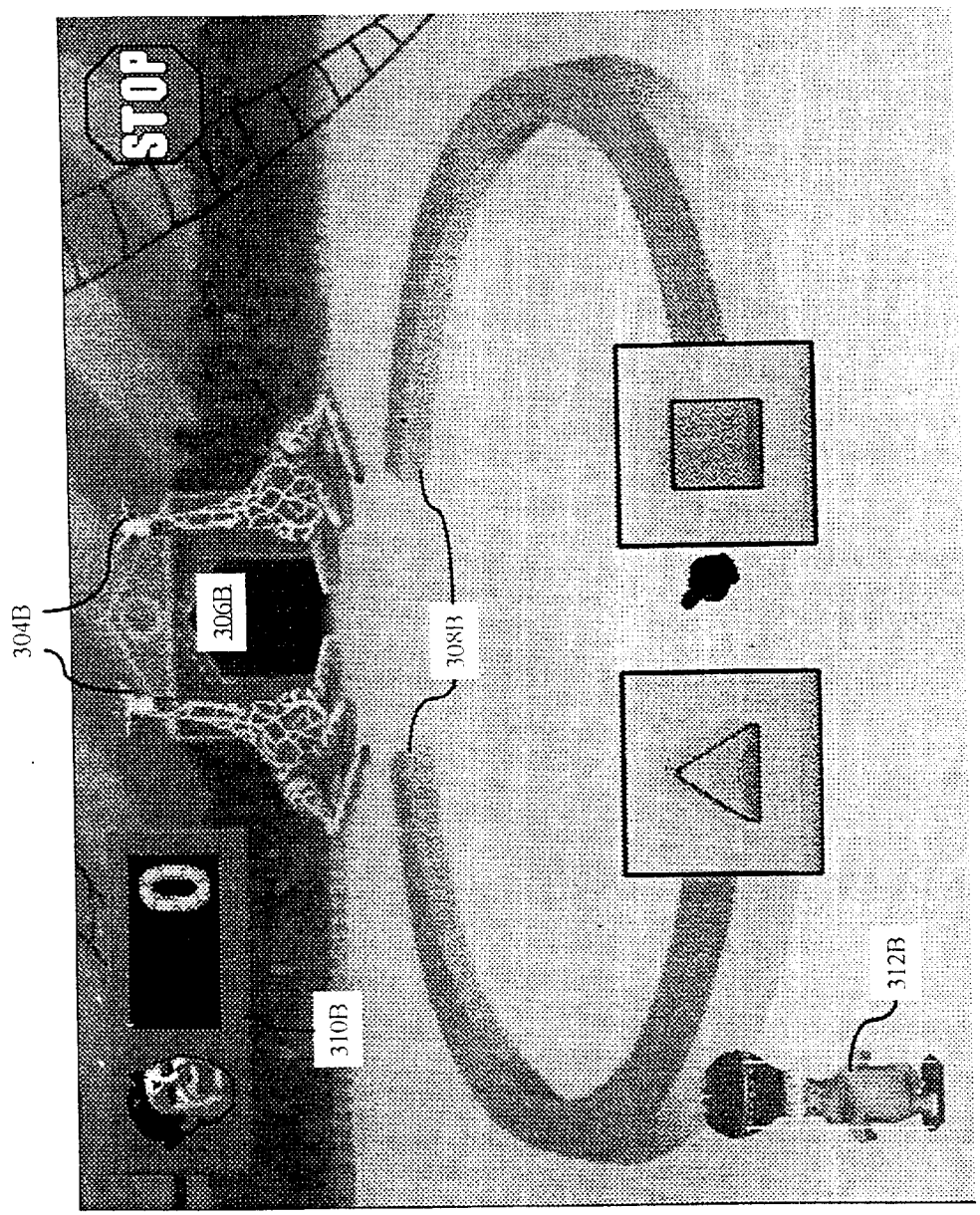
Figure 31:
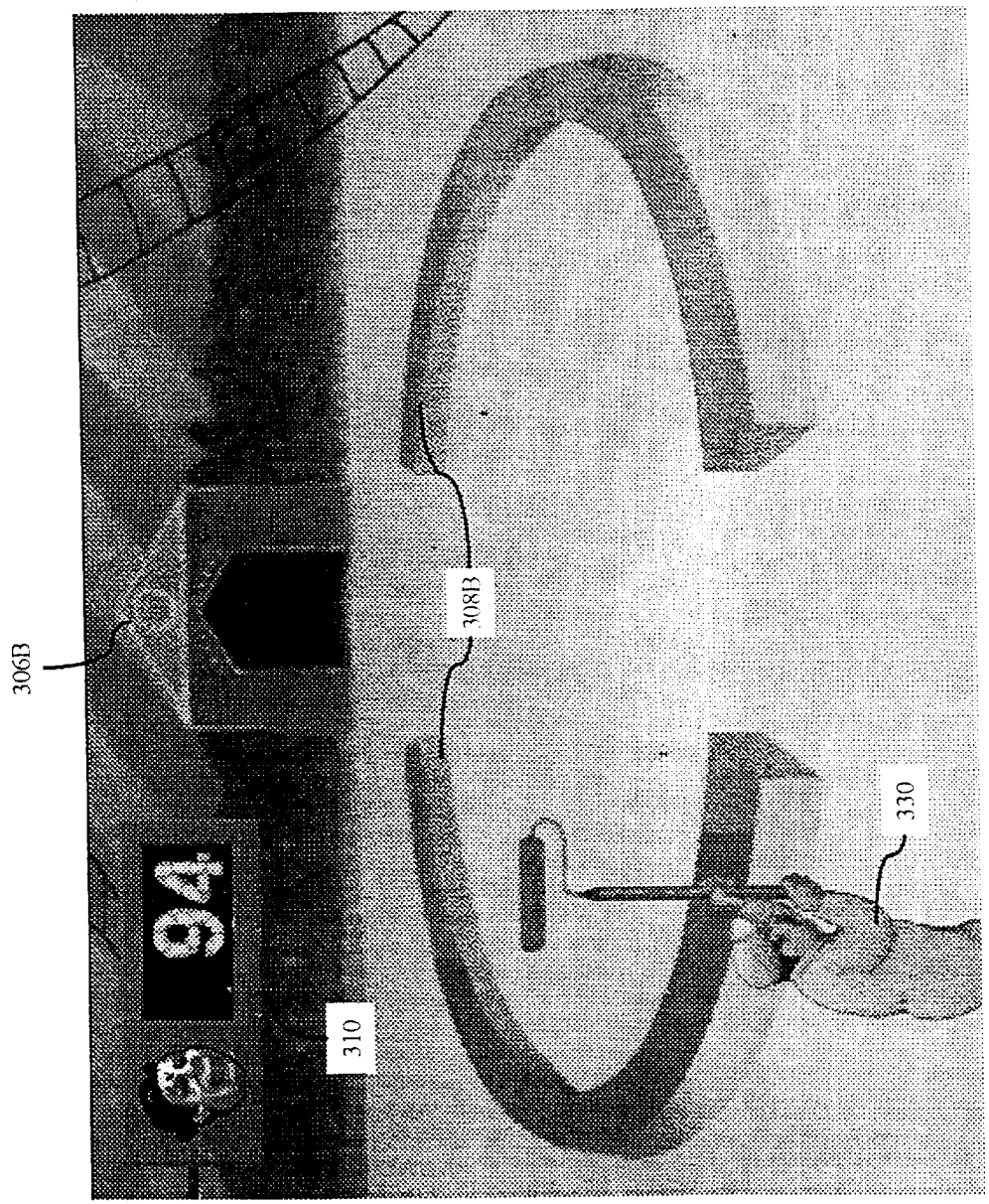
Figure 32:
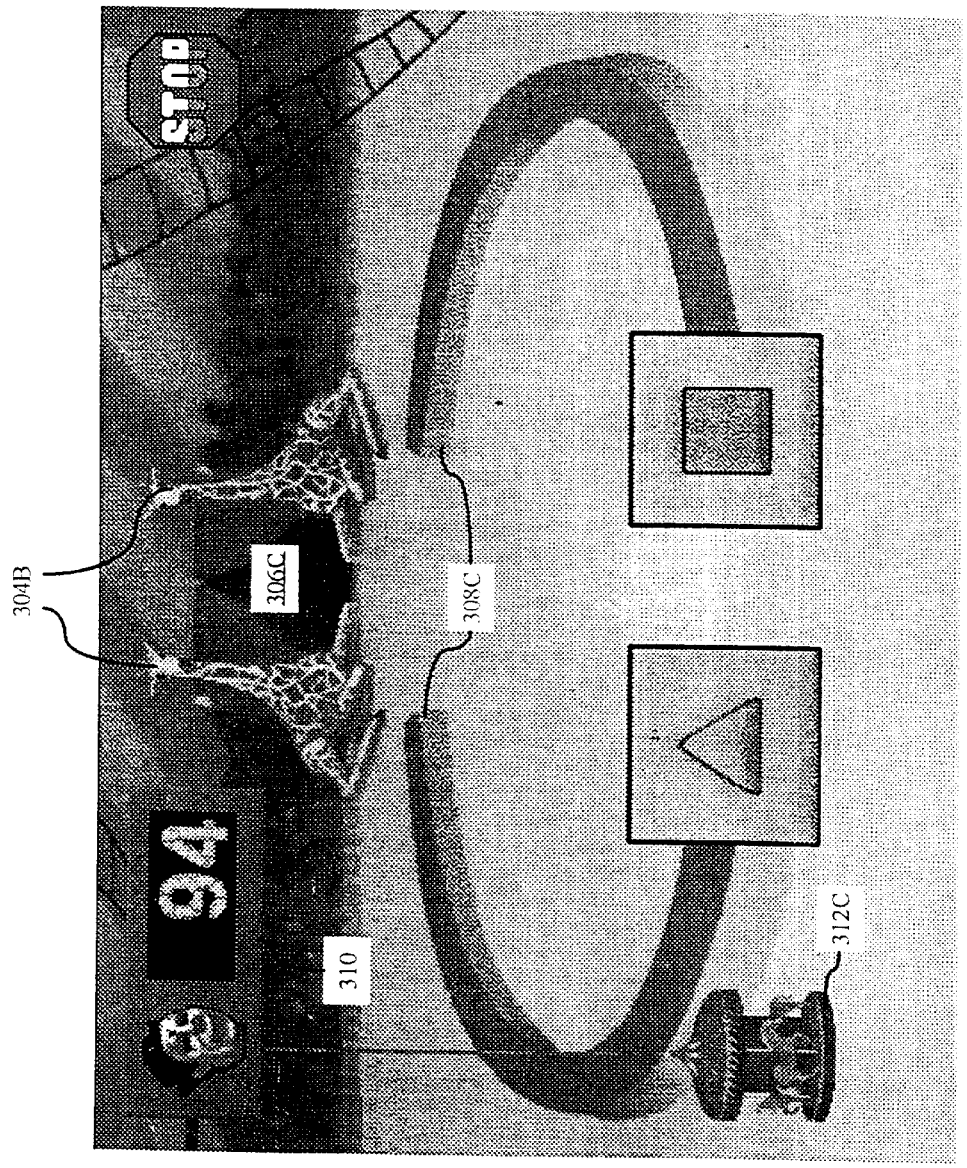
Figure 33:
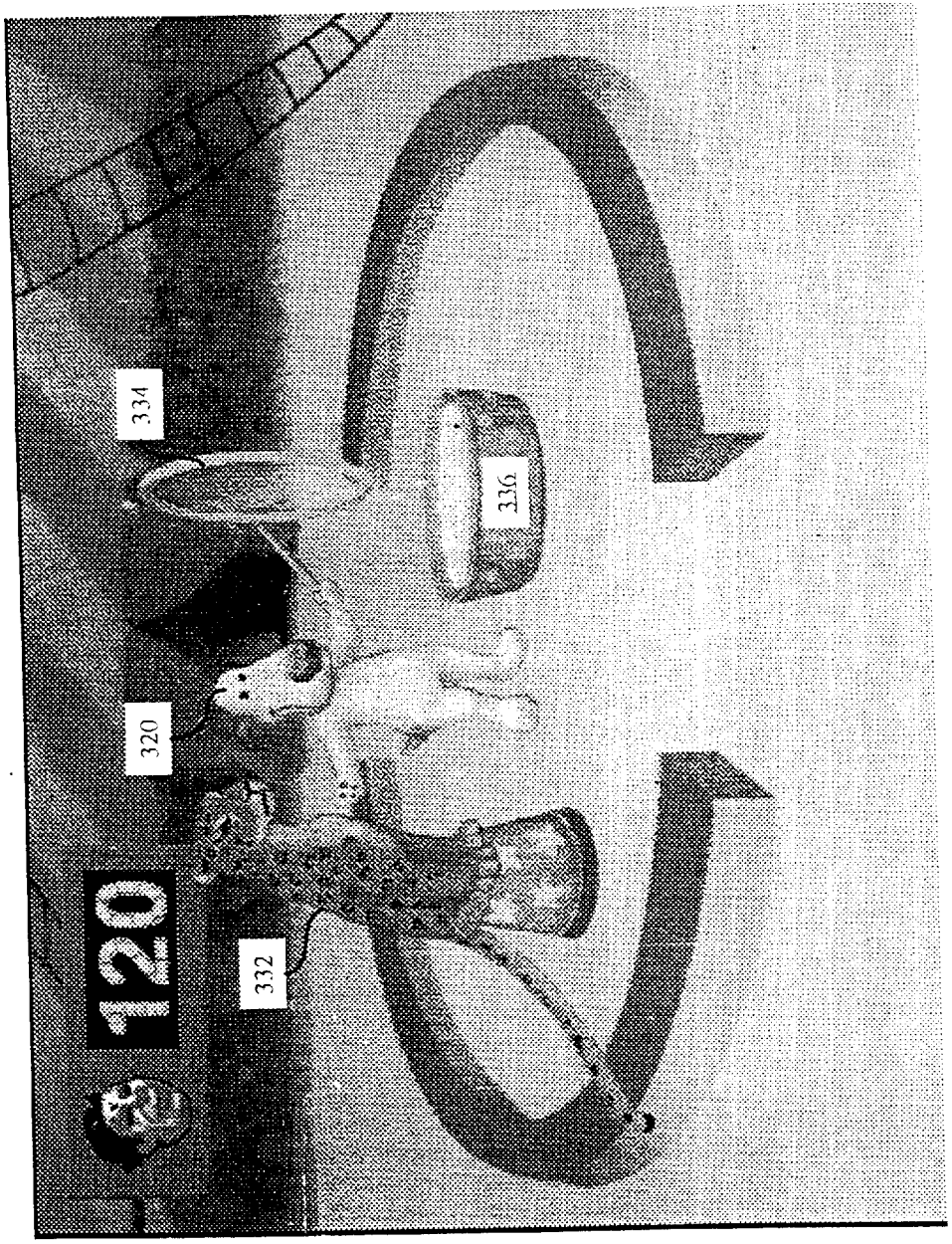

Upon subsequent earning of a reward animation by the user through correct responses to stimuli, the reward animation of FIGS. 27–29 continues the plot and characters of the reward animations of FIGS. 20–26. Specifically, character 320 (FIG. 27) reads a book on magic while a new character 328 enters the scene. Character 328, e.g., a clown, pushes the sawed halves of box 324 and character 322 together (FIG. 28) while character 320 continues to read. Character 322, now whole again, stands and walks off scene, still with a woman's feet, while character 320 reads and is oblivious to the happenings behind.

Thus, reward animations of FIGS. 20–22, 23–26, and 27–29 collectively form a single composite reward animation whose individual component animations are presented in series. The component reward animations of a composite reward animation can be presented contiguously, i.e., in immediately successive reward animation intervals, as earned by the user by correctly responding to stimuli, without interceding reward animations. Alternatively, component reward animations of a composite reward animation can be presented in reward animation intervals which are separated by one or more interceding reward animation intervals in which unrelated reward animations are presented to the user. For example, an unrelated reward animation can be presented to the user after the reward animation of FIGS. 23–26 and before the reward animation of FIGS. 27–29. However, it is preferred that component reward animations of a composite reward animation are presented is sufficient temporal proximity that the user can recollect the characters and plot of previously presented component reward animations such that the context of a currently presented component reward animation is fully appreciated.

Figure 34:
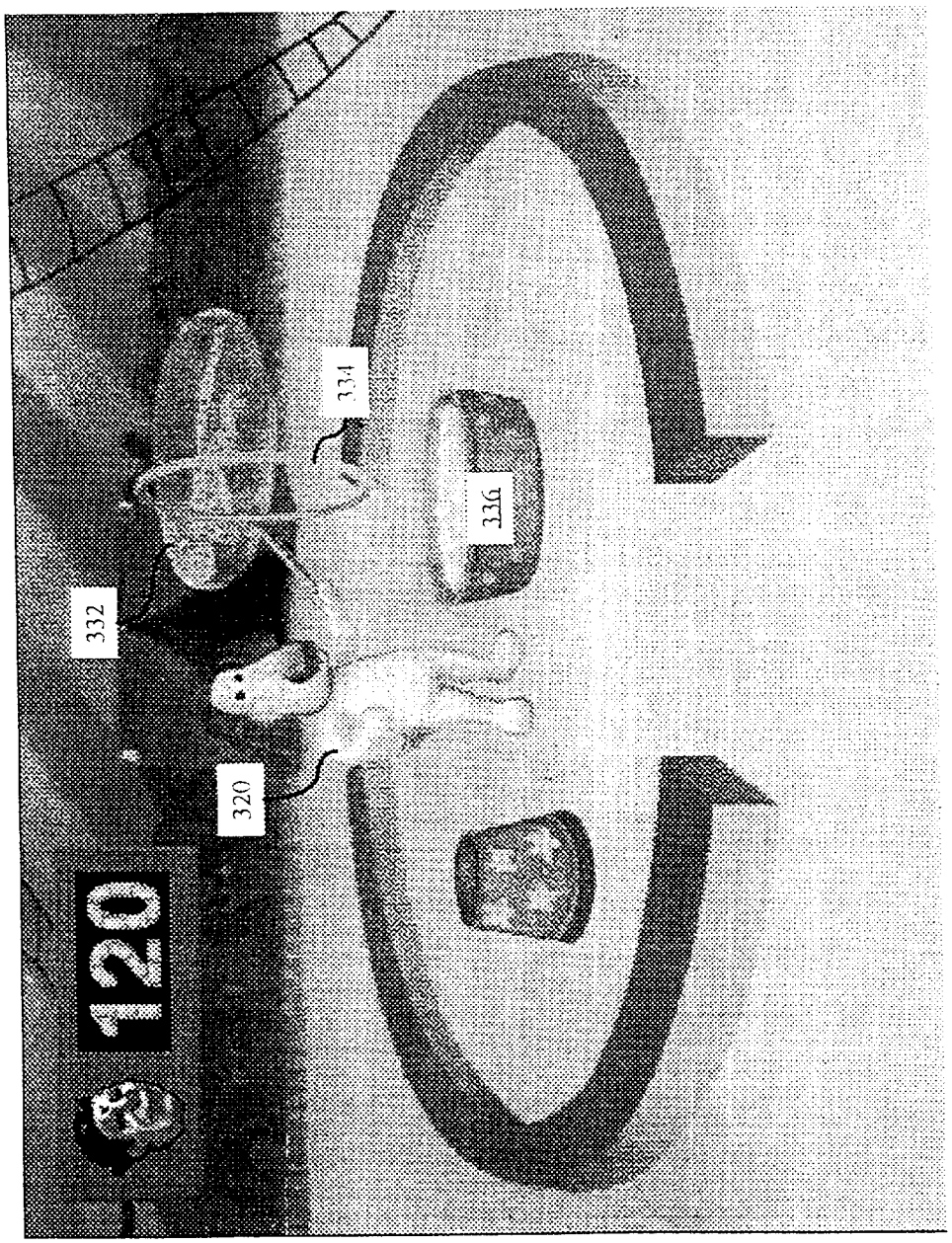

Whether contiguous or not contiguous, it is preferred that component reward animations of a composite reward animation are presented in sequence and that all earlier component reward animations are presented to the user as reward animations are earned prior to presentation of a subsequent component reward animation. For example, it is preferred that the reward animations of FIGS. 20–22 and 23–26 are presented to the user, with or without interceding unrelated reward animations, prior to presentation to the user of the reward animation of FIGS. 27–29 so that the user can fully appreciate the context of the latter reward animation Characters of reward animations can persist beyond a single plot. For example, in a reward animation having a distinct and unrelated plot to the reward animations of FIGS. 20–29, character 320 (FIG. 33) has trained another character 332, e.g., a leopard, to jump through a hoop 334 dipped in bubble solution 336. After jumping through hoop 334, character 332 is encapsulated in a bubble and flies about the circus (FIG. 34). Upon recognizing character 320, the user is reminded of the prior entertaining composite reward animation and anticipates subsequent reward animations continuing the plot of the reward animation of FIGS. 33–34 and subsequent reward animations which feature the persistent personality and appearance of character 320. with which the user is becoming familiar. Such anticipation further motivates the user to earn subsequent reward animations by responding promptly and correctly to stimuli presented by Circus Sequence 1104.

Achievement-Based Context Changes

The motivation mechanisms described above provide short term and medium term motivation for the user to respond quickly and promptly to stimuli presented by various training exercises. Longer range motivation is provided and freshness is added to the user's experience by periodically changing context based on achievement of the user. As described above, the training program of the user involves extended use of the training exercises described above over a period of weeks. The essence of each training exercise remains the same during the entire period such that language comprehension skills of the user are fully developed rather than merely tested. However, the visual context of various training exercises can change in accordance with the user's achievement without departing from the essence of such training exercises.

In this illustrative embodiment, each training exercise has a number of categories, a number of durations for each category, and a number of levels for each duration of each category. Each level includes parameters which control a degree of difficulty in the user's use of a particular training exercise. For example, each level can specify a duration of an inter-stimuli interval (ISI) which is shorter for higher degrees of difficulty. In other words, as the user performs better in responding to stimuli, the period between two stimuli is shortened to further challenge the user's ability to properly perceive the stimuli.

The adjustment of levels is described more completely in the Training Patent. Briefly, the user's level for a particular one of training exercises 1102–1114 (FIG. 81) is incremented each time the user responds to stimuli correctly a predetermined number of consecutive times, e.g., three (3). Each time the user responds incorrectly to stimuli, the user's level for the particular training exercise is reduced. Accordingly, each training exercise quickly adapts to the abilities of the user and challenges the user within the user's abilities without overwhelming the user with challenges beyond the user's ability. The level at which a particular training exercise challenges the user rises relatively quickly to the user's ability and oscillates about the level at which is the user is capable of responding correctly. When the level of the particular training exercise has dropped a predetermined number of times, e.g., eight (8), the training exercise switches to a different category. One result of this quickly adapting level mechanism is that users respond correctly to stimuli about 80% of the time regardless of the ability of the user. Progress of the user is measured in the level achieved rather than the percentage of correct responses.

Each duration is also associated with parameters which control a degree of difficulty in the user's ability to respond correctly to stimuli of a particular training exercise. For example, each duration can specify a duration of the stimuli themselves which shortens as difficulty increases. Thus, as a user masters accurate perception of a particular duration of stimuli, the stimuli are shortened to further challenge the user's perception thereof.

As described briefly above each of training exercises 1102–1114 (FIG. 81) switches between categories periodically. Each category specifies a specific perception of the user to train. For example, those training exercises which challenge and improve the user's ability to distinguish similarly sounding phoneme defines a pair of similarly sounding but distinct phonemes for each category. Such pairs include, for example, "ba" and "da," "si" and "sti," and "shu" and "chu." LCB 1114 includes categories which specify specific linguistic constructs such as negation, male/female pronouns, and past tense.

The level at which a user uses a particular training exercise changes relatively frequently in the manner described above. However, durations and categories change significantly less frequently. Therefore, changing of a duration represents a milestone in the achievement of the user. To provide an indication of long-term progress to the user, training exercise contexts change with a changing of the duration achieved by the user.

Figure 12:
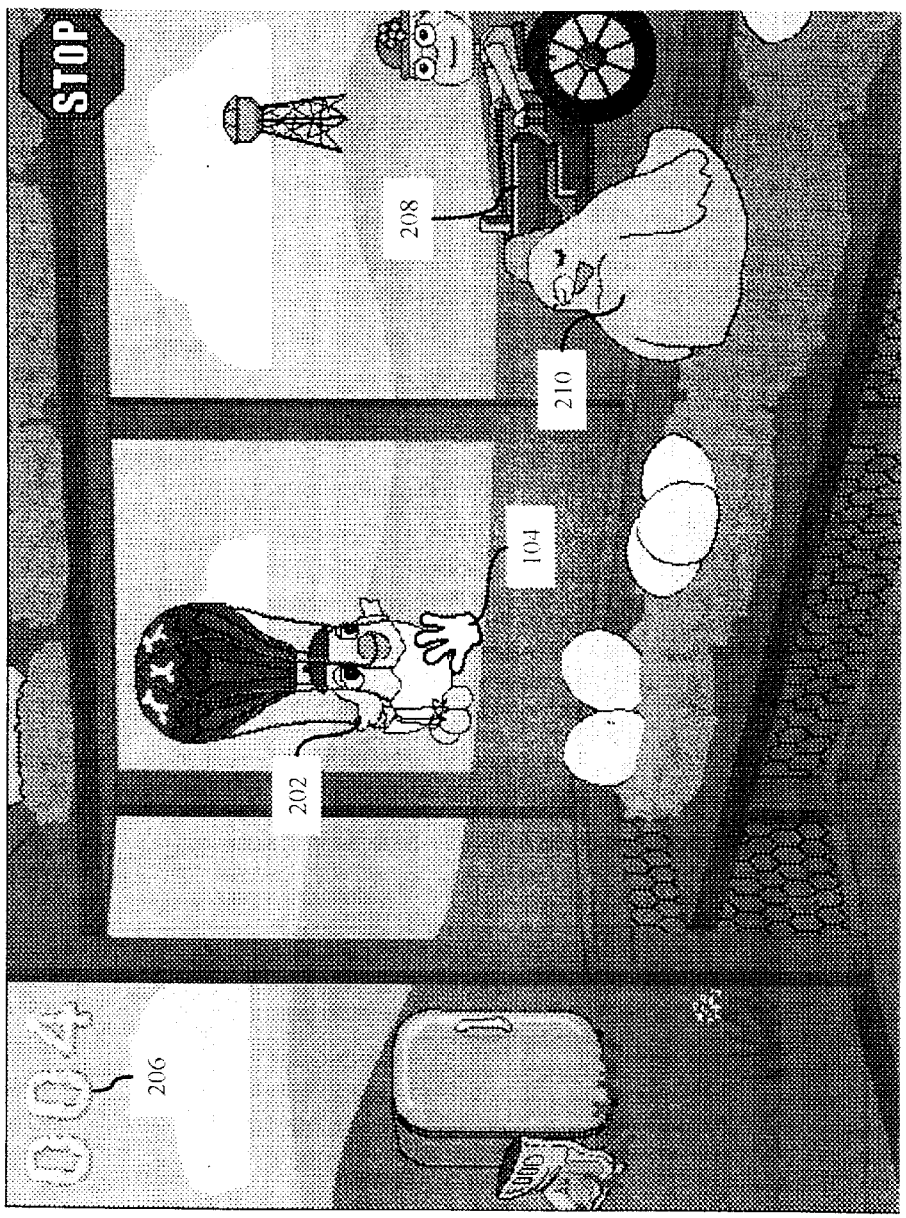
Figure 13:
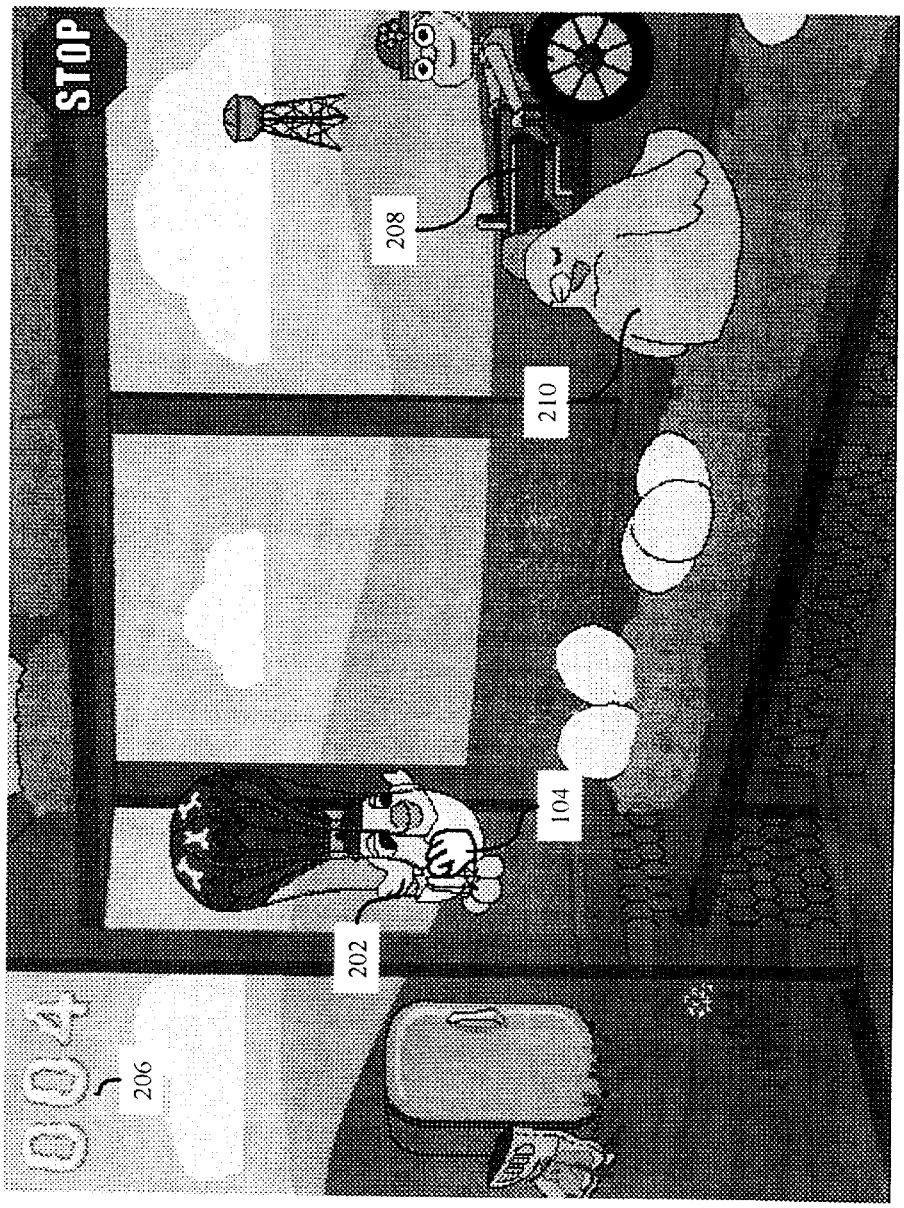
Figure 14:
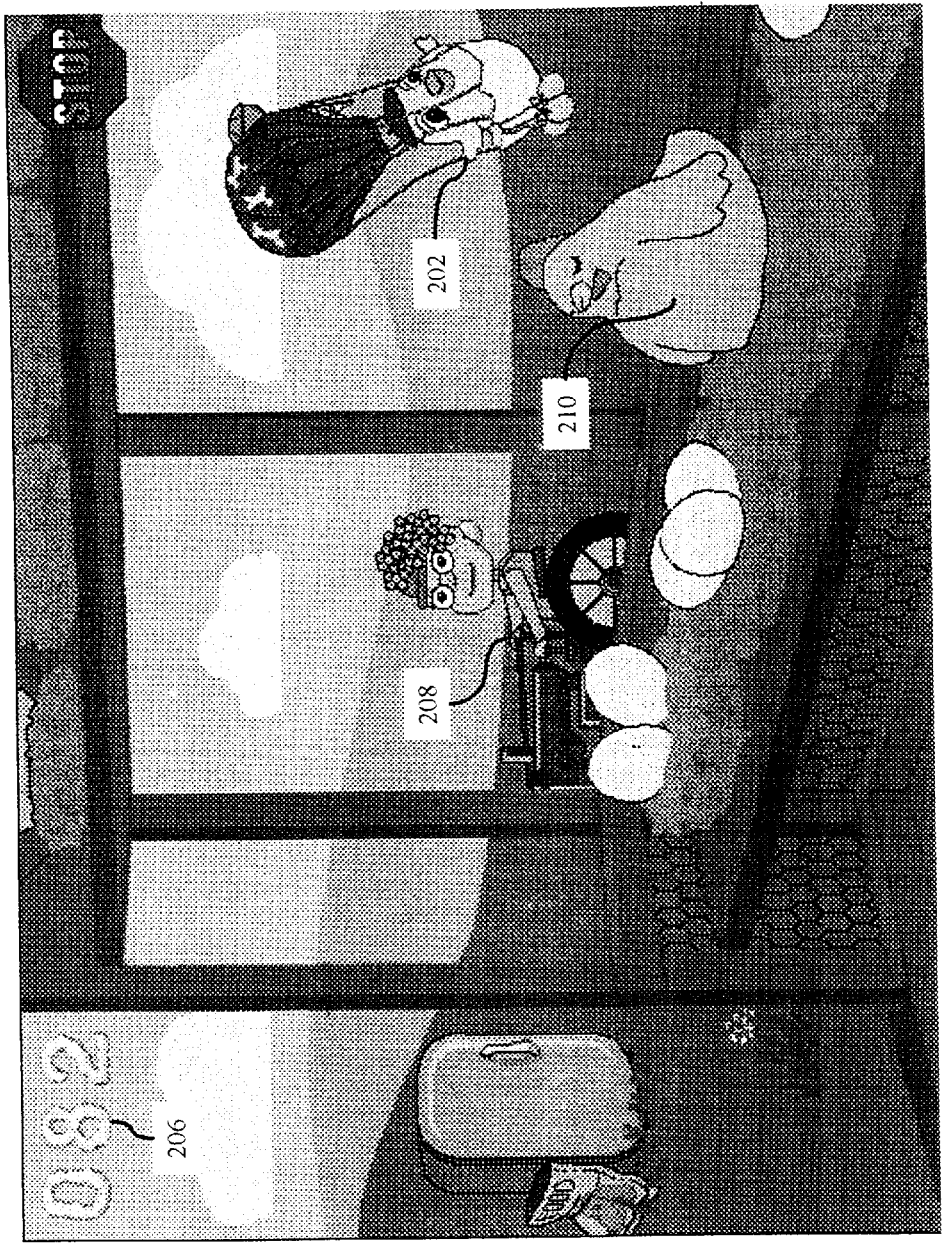
Figure 15:
Figure 16:
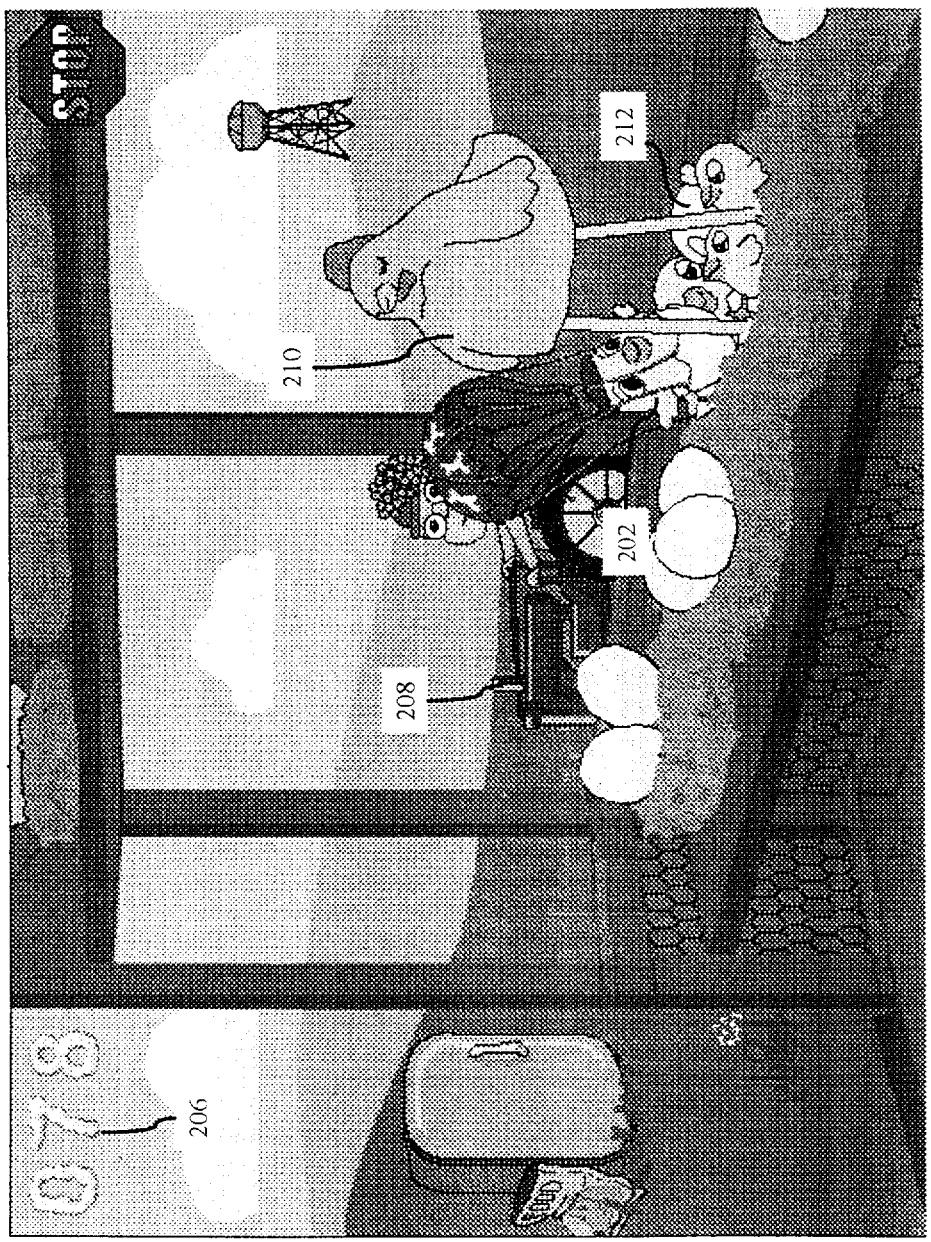

FIGS. 1–7 show screen views of Old MacDonald's Flying Farm 1102 at a particular duration. FIGS. 8–11 show play of Old MacDonald's Flying Farm 1102 at a different duration. In FIGS. 8–11, flying object 102 is replaced with flying object 102B. The cow and rocket pack of flying object 102B have different colors to indicate to the user that a new level of achievement has been reached. When a new category is selected, the context of Old MacDonald's Flying Farm 1102 changes more significantly. As shown in FIGS. 12–16, the barn yard of FIGS. 1–11 is replace with a chicken coup. Flying objects 102 and 102B, which are cows flying around by mean of rocket packs on their backs, are replaced with flying object 202, which is a chick flying around in half of an eggshell suspended from a hot-air balloon. Accordingly, home 110, which is a barn, is replaced with home 210, which is a mother hen. In one embodiment, a change in context is heralded by a scene change animation. For example, to change from the barn yard scene of FIG. 11 to the chicken coup of FIG. 12, the scene of FIG. 11 shrinks within a cloud-scalloped shaped border to reveal that the barn yard scene is a dream of a bulldog 120 which briefly wakes and returns to sleep to begin dreaming of the chicken coup scene of FIG. 12 which expands to fill the entirety of display screen 1022 (FIG. 81) as shown in FIG. 12. The scene change animation provides rewarding entertainment to the user and draws attention to the achievement of the user in progressing to the next category.

Circus Sequence 1104 (FIG. 81) provides achievement-based context in the form of a type of animal 304 (FIG. 17) at the entrance 306, the color of entrance 306 and the color of ring 308. Duration is indicated by the color of entrance 306 and ring 308, change of which is heralded by a scene change animation. For example, in a scene change animation shown in FIGS. 30–32, animals 304B (FIG. 30) are removed (FIG. 31) while a janitor character 330 paints ring 308B to have a new color. Entrance 306B is replaced with entrance 306C (FIG. 32) and animals 304B are replaced to create the new context. Category changes are heralded by a similar scene change animation in which one type of animal, e.g., animals 304B in the form of giraffes, replace a different type of animal, e.g., animal 304 (FIG. 17) in the form of a lion.

Phonic Match 1108 (FIG. 81) provides achievement-based context in the form of progress indicator 508 (FIG. 41), an associated reward animation, and point counter 506. At one category, progress indicator 508 is represented as an animated skating roadrunner wearing a top hat, the various reward animations involve the roadrunner skating in one form or another, and point counter 506 is represented as a lit billboard. The reward animations include animations of progress indicator 508 skating and being drenched by a car driving through a nearby puddle, being blown backwards and out of the scene by a fan, and getting into a car to be driven away rather than skating. At a higher category, progress indicator 508 is replaced with progress indicator 508B (FIG. 47) which is represented as a duck which spins in a progress animation and which incrementally moves down toward a beach chair. Reward animations include the beach chair falling backward and throwing progress indicator 508B into the distant background, progress indicator 508B jumping on the beach chair as if it were a trampoline and bouncing off scene, and progress indicator 508B swimming a back-stroke along the bottom edge of the scene.

Phoneme Identification 1112 (FIG. 81) provides achievement-based context in the form of a venue in which the training exercise is played. At one category, the venue is a snow field and characters such as characters 710A–B (FIG. 60) are shown facing one another on snow skis. At a higher category, the venue is an indoor arena (FIG. 67).

The context changes with changes in duration and category do not change the manner in which the respective training exercises are played. Instead, the changing context provides the user with an indication of progress through the various durations and categories of each training exercise.

Improvement of User Attention

Use of the training exercises described above has been shown to significantly improve attentiveness of users and the ability of users to focus on a task at hand. Specifically, standard measures of such attentiveness and cognitive flexibility such as the known Conner's rating scale have shown significant improvement in certain users. Such users include those with such disorders as attention deficit disorder (ADD), attention deficit disorder with hyperactive disorder (ADD/HD), appositional behavior, and conduct disorder. In particular, use of the training exercises above reduce pulsivity, distractability, and hyperactivity and simultaneously increase the user's ability to focus and sustain attention and to switch cognitive sets.

As described briefly above and more completely in the Training Patent, the level at which the user is challenged is relatively highly adaptive to the particular abilities of the user such that each user is able to respond correctly to about 80% of the stimuli. Such has particular advantage to training users with attention disorders. Since the level of difficulty adapts to the ability of the particular user, users with lesser ability are not frustrated with a significant lack of positive reinforcement. From a different perspective, users with unusually low levels of ability are given ample positive reinforcement with sufficient frequency to motivate such users to continue with the training exercises. Maintenance of interest in training exercises is essential in training users with attention disorders.

In addition, the motivation mechanisms described above use no negative reinforcement. The "thunk" audible feedback in response to an incorrect response by the user is primary to acknowledge to the user that a response has been received by the training exercise. Negative reinforcement tends to frustrate users with attention disorders such as those listed above. Incorrect responses generally result in no more than the absence of positive reinforcement in the form of motivation mechanisms described above.

The behavior of the training exercises described above also require activation of some sort by the user. Accordingly, nothing happens until the user indicates the user is ready to perceive stimuli. For example, Old MacDonald's Flying Farm 1102 (FIGS. 81 and 1) plays no phonemes for the user until the user grabs flying object 102 (FIG. 2). Until then, flying object 102 continues to fly about the farm scene. Similarly, Circus Sequence 1104 (FIG. 81) presents a listening button 302 (FIG. 17) to the user and does not present any up or down sweeps to the user until the user presses listening button 302 using conventional user interface techniques. Phonic Words 1110 (FIG. 81) also includes a listening button 612 (FIG. 48) which must generally be pressed by the user before Phonic Words 1110 will present any stimuli to the user. Phoneme Identification 1112. (FIG. 81) requires that the user press a similar listening button (FIG. 62) prior to presentation of any stimuli by Phoneme Identification 1112. LCB 1114 (FIG. 81) similarly includes a listening button 914 (FIG. 70) which the user must generally press before LCB 1114 presents any stimuli to the user.

As a result, the user is required to actively engage a particular training exercise before the training exercise will commence. The described training exercises therefore wait for the user to provide undivided attention before continuing with the training exercise. Such encourages attention of the user on the training exercise. In addition, use of each of the training exercises is limited to a range of time between a minimum duration, e.g., fifteen minutes, and a maximum duration, e.g., twenty minutes. The user therefore has a limited amount of time to accumulate points. If the user sits idle, the user loses unrecoverable time to accumulate points in the token economy toward real, physical rewards as described above. Therefore, the user is encouraged strongly to focus and to sustain attention to the training exercises during use thereof.

The nature of some of training exercises 1102–1114 commands undivided and sustained attention of the user. For example, Old MacDonald's Flying Farm 1102 requires that the user focus and attentively listen to repetitions of a phoneme to detect a slightly different phoneme. If the user loses attention momentarily, the user can miss the distinct phoneme and Old MacDonald's Flying Farm notes the incorrect response when the user fails to release flying object 102 (FIG. 2) within the predetermined amount of time following presentation of the distinct phoneme to the user.

To further improve the attention abilities of users, the training exercises described above provide frequent set switching, i.e., changing from task to another. In particular, each training exercise limits use to the range of times described above. Therefore, instead of prolonging use of one training exercise to more fully develop a particular ability as is done in conventional teaching systems, trainer 1100 (FIG. 81) develops a particular ability for a limited period of time and switches focus to another ability to thereby diversify focus of the user, i.e., to switch the mental set of the user. Such reduces the cognitive rigidity of the user.

To further reduce the cognitive rigidity of the user, each training exercise frequently switches categories during a session. Specifically, each training exercise switches categories upon occurrence of either (i) a predetermined number of responses, e.g., thirty (3), for a particular category or (ii) a predetermined proficiency for a particular category, e.g., eighty percent (80%) correct responses for any ten (10) contiguous stimuli. By limiting any one category to a maximum number of response, frustration of the user with categories with which the user struggles is avoided. By switching categories upon achievement of a predetermined degree of proficiency of the user, boredom with a particular category and with a particular training exercise is avoided. In addition, increasing the frequency with which categories change challenges and improves the user's ability to switch mental sets and therefore reduces cognitive rigidity.

These aspects of the training exercises described above significantly improve behavioral and cognitive abilities of users with such attention disorders as ADD, ADD/HD, appositional behavior, conduct disorder, and cognitive rigidity.

The above description is illustrative only and is not limiting. The present invention is limited only by the claims which follow.

What is claimed is:

1. A method for providing motivation to a user of a training process which, when executed, presents stimuli to the user wherein the stimuli are designed primarily to improve a cognitive ability of the user and measures the cognitive ability of the user by comparison of responses of the user to the stimuli to predetermined correct responses, the method comprising:

presenting a task for the user, completion of which requires that the user perform one or more steps;

determining a target number of steps within which the user is expected to complete the task;

representing to the user a progress indicator at a position which indicates a difference between the steps taken so far by the user and the target number of steps; and representing a progress animation which moves the progress indicator from the first-mentioned position to a subsequent position to indicate one or more additional steps taken by the user by:

animating movement the progress indicator to represent a continuous transition from the first position to the subsequent position; and animating the progress indicator independently of a change in position of the animating movement of the progress indicator.

2. The method of claim 1 further comprising:

determining that the user has completed the task in fewer than the target number of steps; and awarding the user bonus points upon such a determination.

3. The method of claim 2 wherein the bonus points are proportional to a difference between the target number of steps and a number of steps required by the user to complete the task.

4. A computer-readable storage medium on which is stored computer instructions which, when executed by a computer, cause the computer to provide motivation to a user of a training process which presents stimuli to the user wherein the stimuli are designed primarily to improve a cognitive ability of the user and measures the cognitive ability of the user by comparison of responses of the user to the stimuli to predetermined correct responses by:

presenting a task for the user, completion of which requires that the user perform one or more steps;

determining a target number of steps within which the user is expected to complete the task;

representing to the user a progress indicator at a position which indicates a difference between the steps taken so far by the user and the target number of steps; and representing a progress animation which moves the progress indicator from the first-mentioned position to a subsequent position to indicate one or more additional steps taken by the user by:

animating movement the progress indicator to represent a continuous transition from the first position to the subsequent position; and animating the progress indicator independently of a change in position of the animating movement of the progress indicator.

5. The computer-readable storage medium of claim 4 wherein the computer instructions, when executed, provide motivation to the user by also:

determining that the user has completed the task in fewer than the target number of steps; and awarding the user bonus points upon such a determination.

6. The computer-readable storage medium of claim 5 wherein the bonus points are proportional to a difference between the target number of steps and a number of steps required by the user to complete the task.

7. A computer system comprising:

a processor;

a memory coupled to the processor; and a motivation module which executes in the processor from the memory and which, when executed, provides motivation to a user of a training process which presents stimuli to the user wherein the stimuli are designed primarily to improve a cognitive ability of the user and measures the cognitive ability of the user by comparison of responses of the user to the stimuli to predetermined correct responses by:

presenting a task for the user, completion of which requires that the user perform one or more steps;

determining a target number of steps within which the user is expected to complete the task;

representing to the user a progress indicator at a position which indicates a difference between the steps taken so far by the user and the target number of steps; and representing a progress animation which moves the progress indicator from the first-mentioned position to a subsequent position to indicate one or more additional steps taken by the user by:

animating movement the progress indicator to represent a continuous transition from the first position to the subsequent position; and animating the progress indicator independently of a change in position of the animating movement of the progress indicator.

8. The computer system of claim 7 wherein the motivation module, when executed, provides motivation to the user by also:

determining that the user has completed the task in fewer than the target number of steps; and awarding the user bonus points upon such a determination.

9. The computer system of claim 8 wherein the bonus points are proportional to a difference between the target number of steps and a number of steps required by the user to complete the task.

* * * * *